(12) United States Patent
Atarashi et al.

(10) Patent No.: US 8,369,380 B2
(45) Date of Patent: Feb. 5, 2013

(54) TRANSMITTER, RECEIVER, AND MOBILE COMMUNICATION SYSTEM

(75) Inventors: Hiroyuki Atarashi, Yokohama (JP);
Teruo Kawamura, Yokosuka (JP);
Yoshikazu Goto, Yokosuka (JP);
Mamoru Sawahashi, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 474 days.

(21) Appl. No.: 11/909,986

(22) PCT Filed: Mar. 24, 2006

(86) PCT No.: PCT/JP2006/306033
§ 371 (c)(1),
(2), (4) Date: Mar. 2, 2009

(87) PCT Pub. No.: WO2006/109539
PCT Pub. Date: Oct. 19, 2006

(65) Prior Publication Data
US 2009/0185602 A1      Jul. 23, 2009

(30) Foreign Application Priority Data
Apr. 1, 2005    (JP) .................. 2005-106914

(51) Int. Cl.
*H04B 1/00* (2006.01)
(52) U.S. Cl. ........ 375/146; 375/130; 375/140; 375/259; 375/316; 375/141
(58) Field of Classification Search .................. 375/146, 375/130, 140, 259, 316, 141
See application file for complete search history.

(56) References Cited

U.S. PATENT DOCUMENTS

| | | | |
|---|---|---|---|
| 5,583,853 A | 12/1996 | Giallorenzi et al. | |
| 6,002,711 A | 12/1999 | Moon | |
| 6,535,502 B1 * | 3/2003 | Brink | 370/345 |
| 6,760,321 B2 * | 7/2004 | Shamsunder | 370/342 |
| 7,023,792 B1 * | 4/2006 | Onodera | 370/203 |
| 7,103,026 B2 * | 9/2006 | Hall et al. | 370/335 |
| 7,139,237 B2 * | 11/2006 | Nangia et al. | 370/208 |
| 7,372,889 B2 * | 5/2008 | Atarashi et al. | 375/130 |
| 8,107,411 B2 | 1/2012 | Atarashi et al. | |
| 2002/0039355 A1 * | 4/2002 | Yun et al. | 370/318 |
| 2002/0097697 A1 * | 7/2002 | Bae et al. | 370/335 |

(Continued)

FOREIGN PATENT DOCUMENTS

| | | |
|---|---|---|
| EP | 1009110 A2 | 6/2000 |
| EP | 1445873 A2 | 8/2004 |

(Continued)

OTHER PUBLICATIONS

H. Atarashi et al., "Broadband Packet Wireless Access Appropriate for High-speed and High-capacity Throughput", IEEE VTC2001-Spring, pp. 566-570, May 2001 (5 pages).

(Continued)

*Primary Examiner* — Kenneth Lam
(74) *Attorney, Agent, or Firm* — Osha Liang LLP

(57) ABSTRACT

A transmitter includes: spread code multiplying means that multiplies a symbol indicating a reference signal by spread code to generate a chip sequence after spreading; chip pattern generation means that generates a chip pattern by performing chip repetition a predetermined repetition number of times on the chip sequence after spreading; and multiplying means that multiplies a signal having the chip pattern by a phase specific to the transmitter.

4 Claims, 56 Drawing Sheets

U.S. PATENT DOCUMENTS

| | | | |
|---|---|---|---|
| 2002/0118765 | A1 | 8/2002 | Nangia et al. |
| 2002/0172180 | A1 | 11/2002 | Hall et al. |
| 2003/0083090 | A1* | 5/2003 | Huh et al. ............... 455/522 |
| 2004/0085918 | A1 | 5/2004 | Shamsunder |
| 2004/0116077 | A1* | 6/2004 | Lee et al. ............... 455/101 |
| 2004/0156386 | A1* | 8/2004 | Atarashi et al. ............ 370/441 |
| 2004/0190600 | A1* | 9/2004 | Odenwalder ............ 375/147 |
| 2009/0303929 | A1 | 12/2009 | Yamamoto et al. |

FOREIGN PATENT DOCUMENTS

| | | |
|---|---|---|
| JP | 2003-244763 A | 8/2003 |
| JP | 2003-319009 A | 11/2003 |
| JP | 2004-297756 A | 10/2004 |
| JP | 2005-252886 A | 9/2005 |
| JP | 2005-348235 A | 12/2005 |
| KR | 1997-0004386 | 1/1997 |
| KR | 2004-0071652 A | 8/2004 |
| TW | I226587 | 1/2005 |
| WO | 01/37506 A1 | 5/2001 |
| WO | 03/034632 A2 | 4/2003 |
| WO | 2008/053930 A1 | 5/2008 |

OTHER PUBLICATIONS

M. Schnell et al, "A Promising New Wideband Multiple-Access Scheme for Future Mobile Communications Systems", European Transaction on Telecommunications, vol. 10, No. 4, pp. 417-427, Jul./Aug. 1999 (11 pages).

Y. Goto et al., "Variable Spreading and Chip Repetition Factors (VSCRF)-CDMA in Reverse Link for Broadband Wireless Access", The Technical Report of IEICE, RCS2003-67, pp. 91-98, Jun. 2003 (8 pages).

Y. Goto et al., "Variable Spreading and Chip Repitition Factors (VSCFR)-CDMA in Reverse Link for Broadband Wireless Access", Proceedings of PIMRC 2003, IEEE, pp. 254-259, Sep. 2003 (6 pages).

Taiwanese Office Action for Application No. 095110725, mailed on Feb. 17, 2009. (16 pages).

esp@cenet Patent Abstract for Japanese Publication No. 2003319009, publication date Nov. 7, 2003. (1 page).

esp@cenet Patent Abstract for Japanese Publication No. 2003244763, publication date Aug. 29, 2003. (1 page).

Japanese Office Action for Patent Application No. 2007-001855 dated Aug. 24, 2010, partial English Translation thereof (5 Pages).

"CDM-based Multiplexing Method of Multiple ACK/NACK and CQI for E-UTRA Uplink", R1-062742, 3GPP, Oct. 2006, URL, http://ftp.3gpp.org/tsg_ran/WG1_RL1/TSGR1_46bis/Docs/R1-062742.zip.

Korean Office Action for Application No. 10-2007-7023557, mailed on Feb. 24, 2012 (9 pages).

Yoshikazu Goto, et al., "Investigations on Packet Error Rate of Variable Spreading and Chip Repetition Factors (VSCRF)-CDMA Wireless Access in Reverse Link Multi-cell Environment," IEICE Technical Report, vol. 104, No. 123, Jun. 11, 2004, pp. 49-54, 6 pages.

Yoshikazu Goto, et al., "Variable Spreading and Chip Repetition Factors (VSCRF)-CDMA in Reverse Link for Broadband Wireless Access," IEICE Technical Report, vol. 103, No. 128, Jun. 11, 2004, pp. 91-98, 8 pages.

Yoshikazu Goto, et al., "Performance of Frequency Domain Equalizer for Variable Spreading and Chip Repetition Factors (VSCRF)-CDMA in Reverse Link Broadband Packet Wireless Access," IEICE Technical Report, vol. 104, No. 399, Oct. 22, 2004, pp. 135-140, 6 pages.

International Search Report issued in PCT/JP2006/306033 dated Jun. 20, 2006, 5 pages.

Extended European Search Report for Application No. 06729981.8, mailed on Aug. 2, 2012 (8 pages).

* cited by examiner

FIG.5

| INTERFERENCE SUPPRESSION EFFECT | SPREADING (SF) | | CHIP REPETITION (CRF) |
|---|---|---|---|
| MULTIPATH INTERFERENCE | LARGE | >> | SMALL |
| MULTIPLE ACCESS INTERFERENCE | MEDIUM | << | LARGE |
| SAME CHANNEL INTERFERENCE (FROM SURROUNDING CELL) | LARGE | < | LARGE (NO SPECTRUM COLLISION) |
| | | >> | SMALL (THERE IS SPECTRUM COLLISION) |

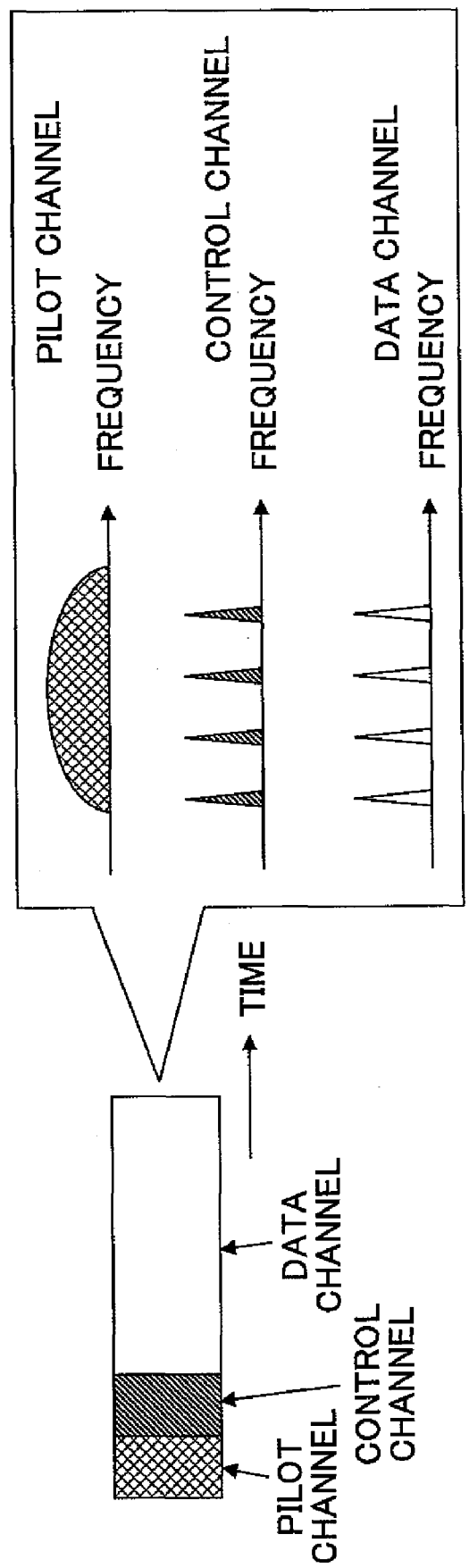

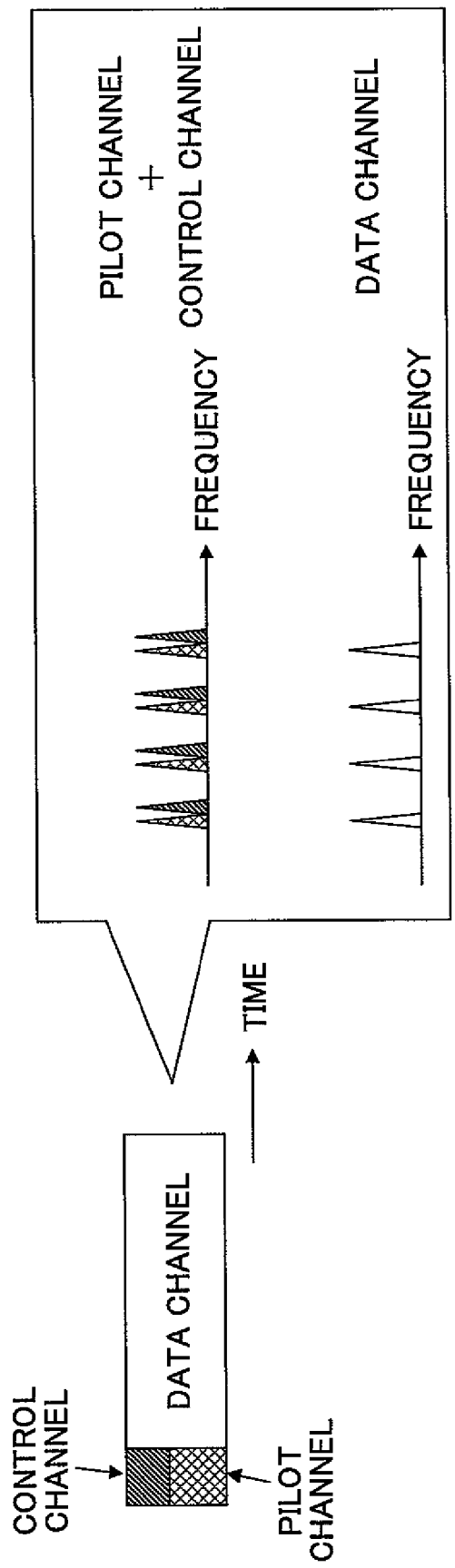

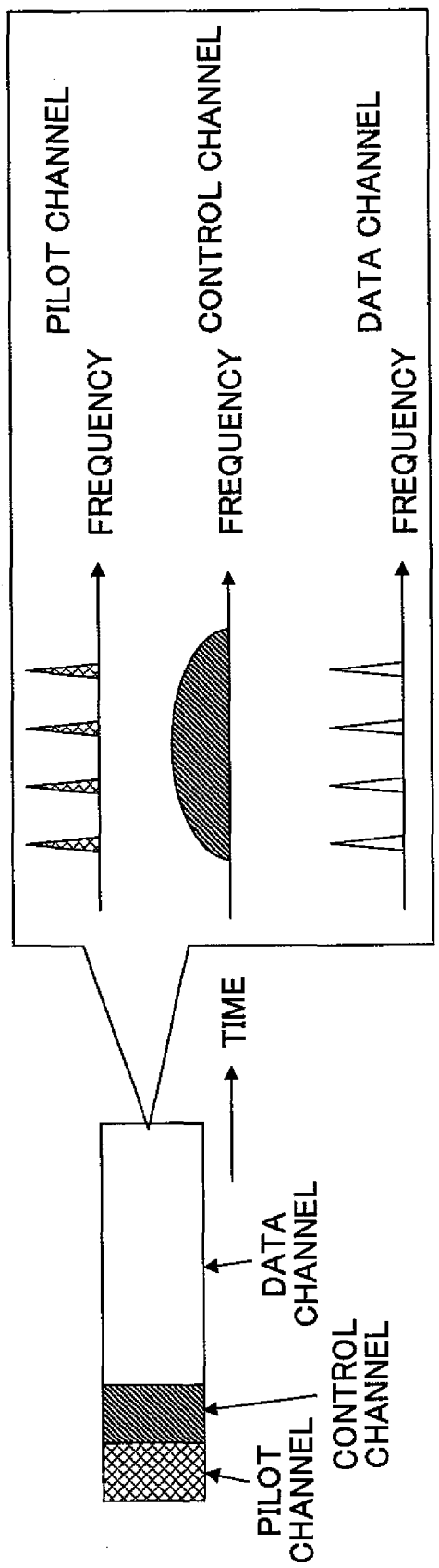

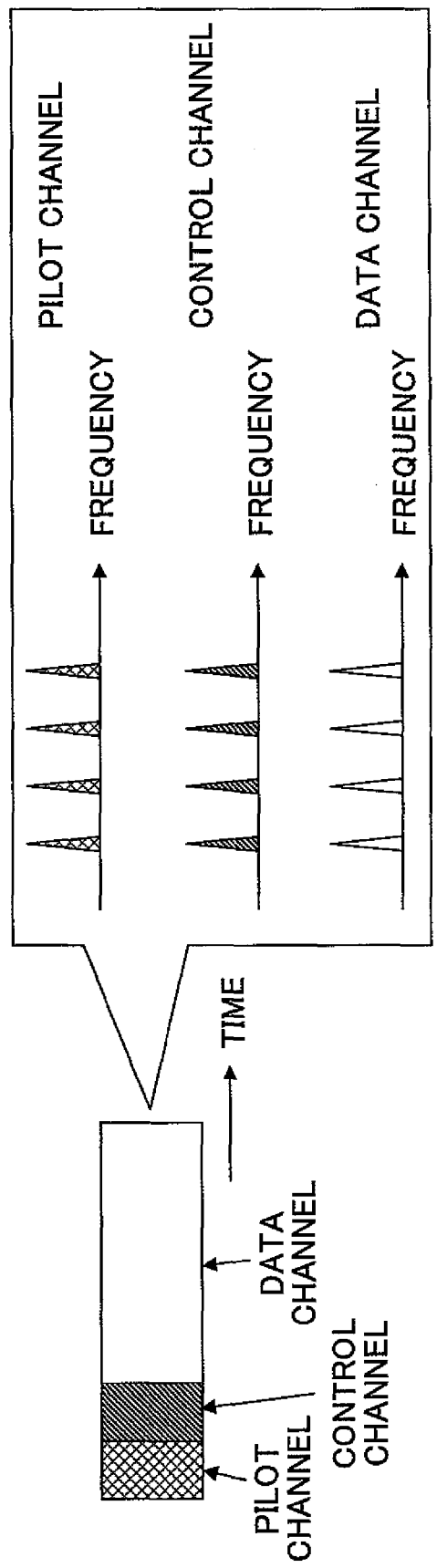

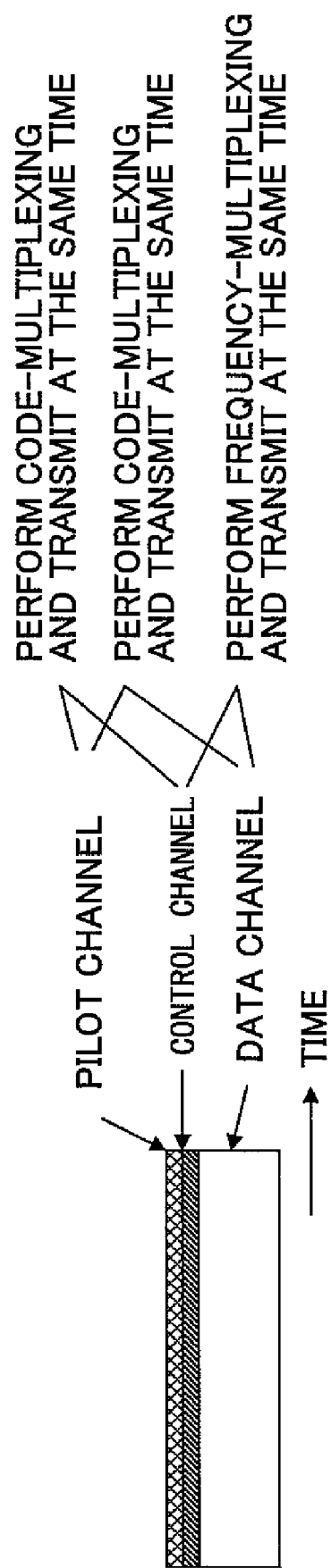

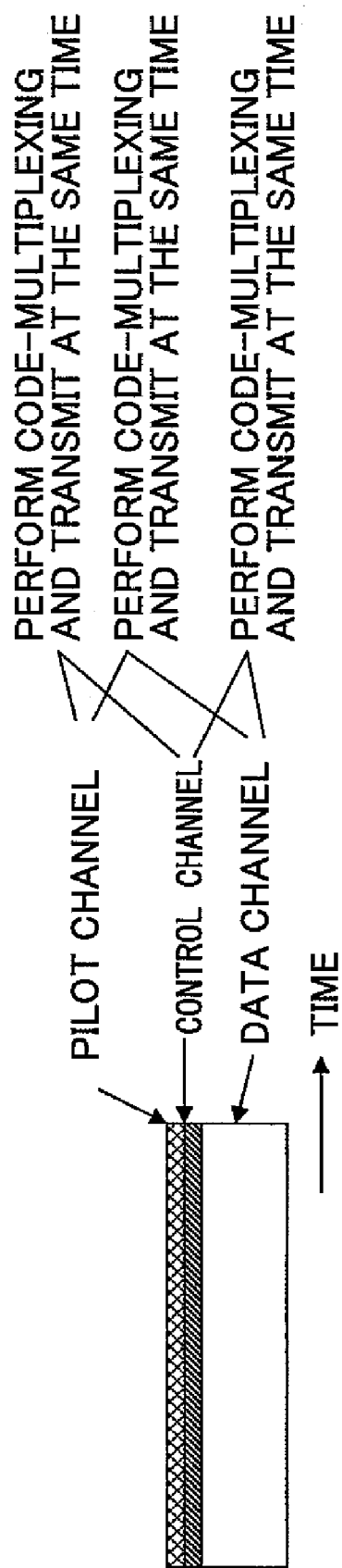

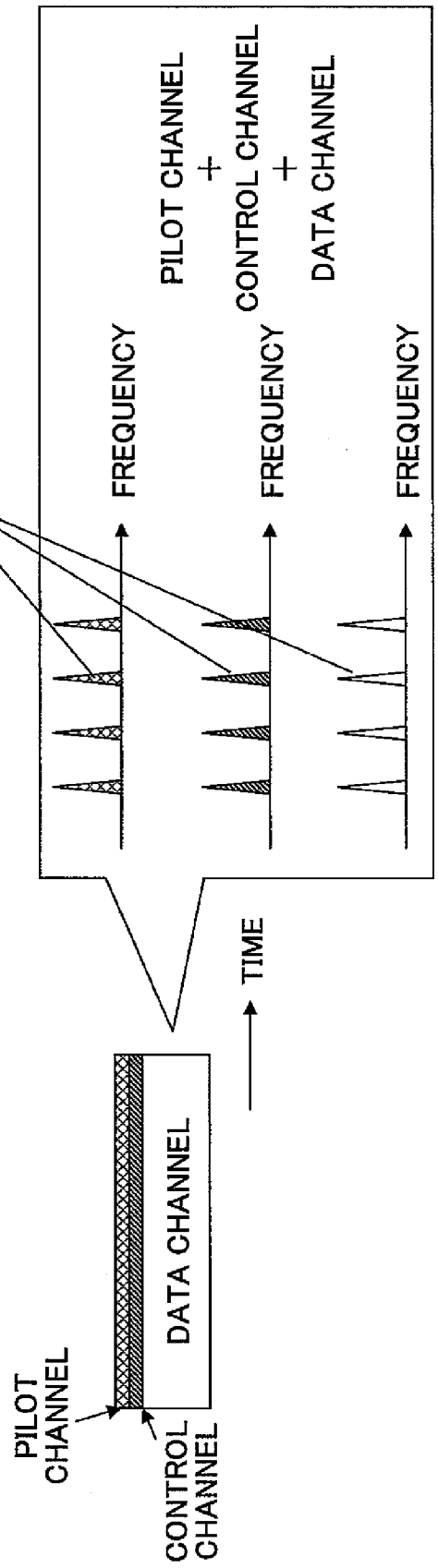

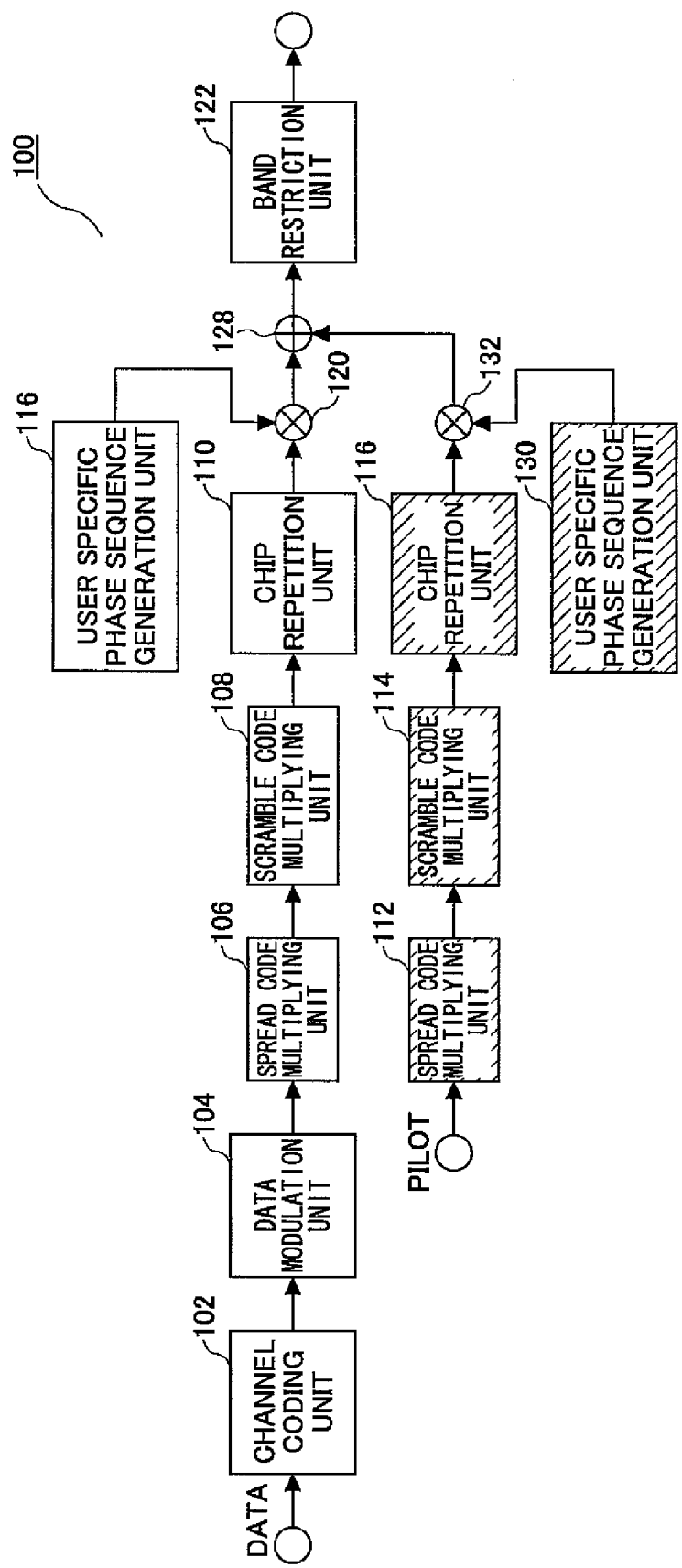

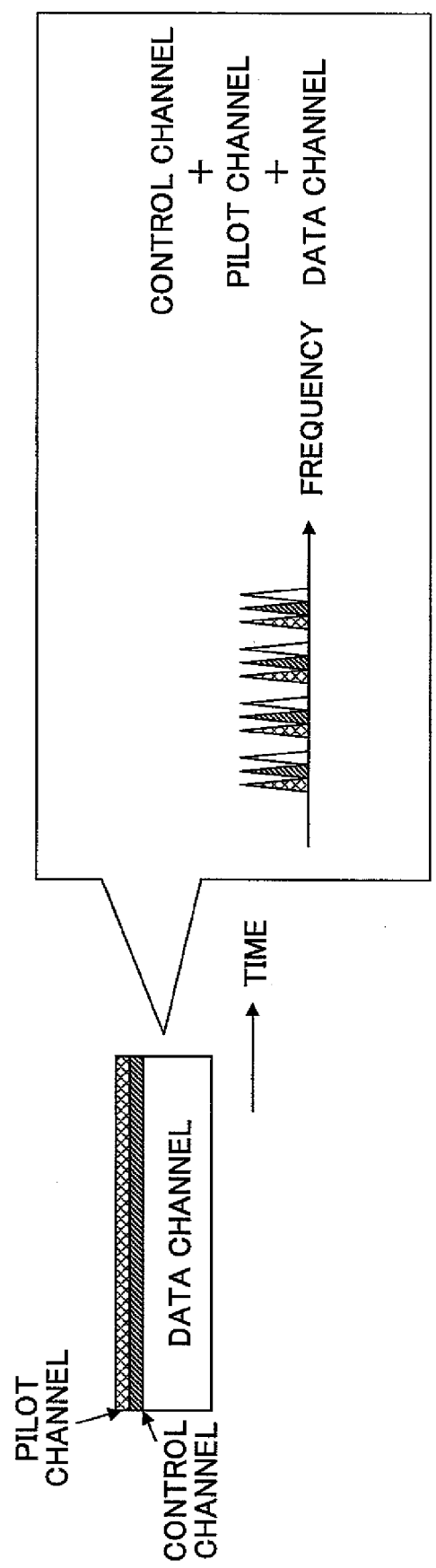

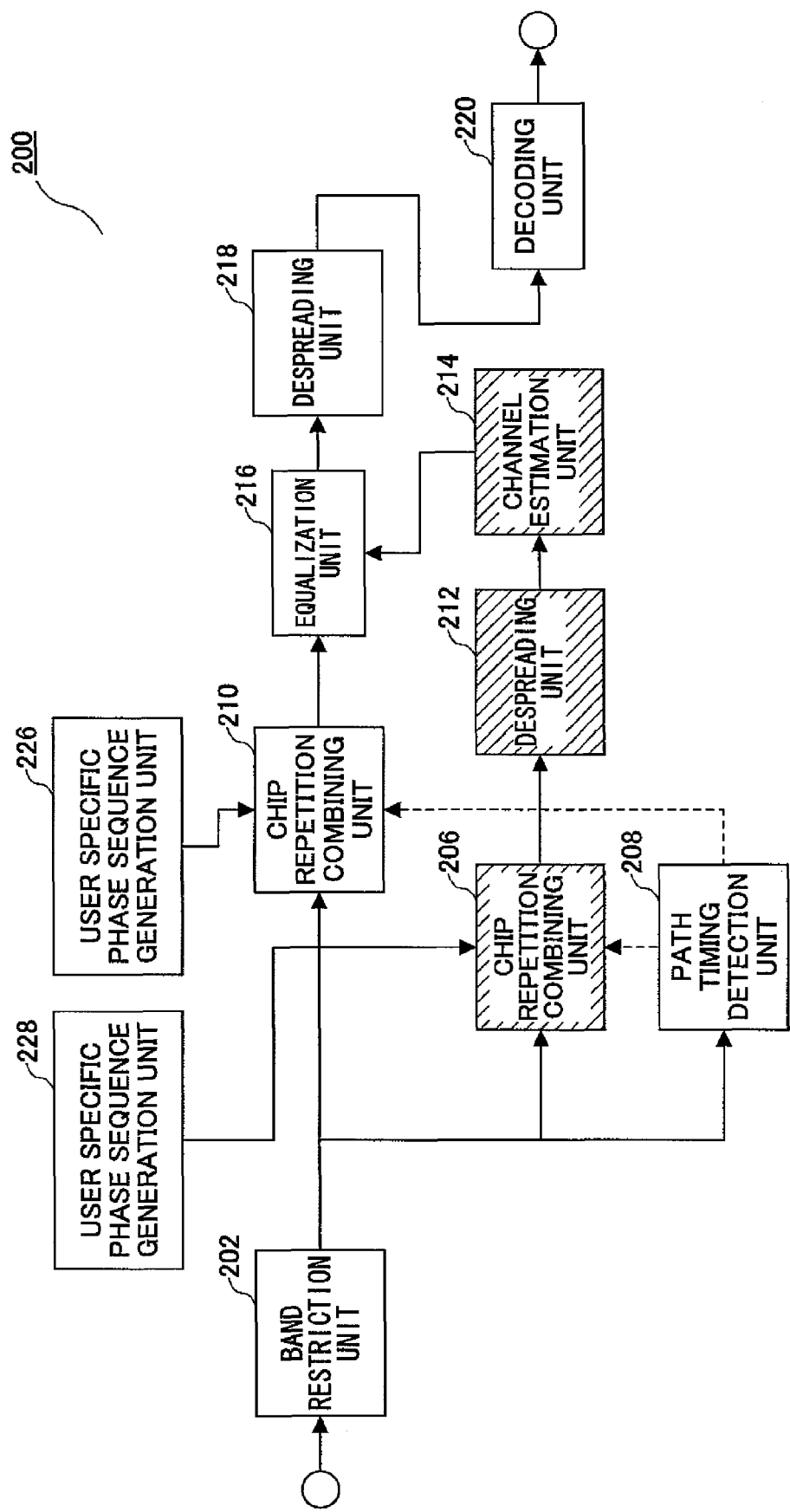

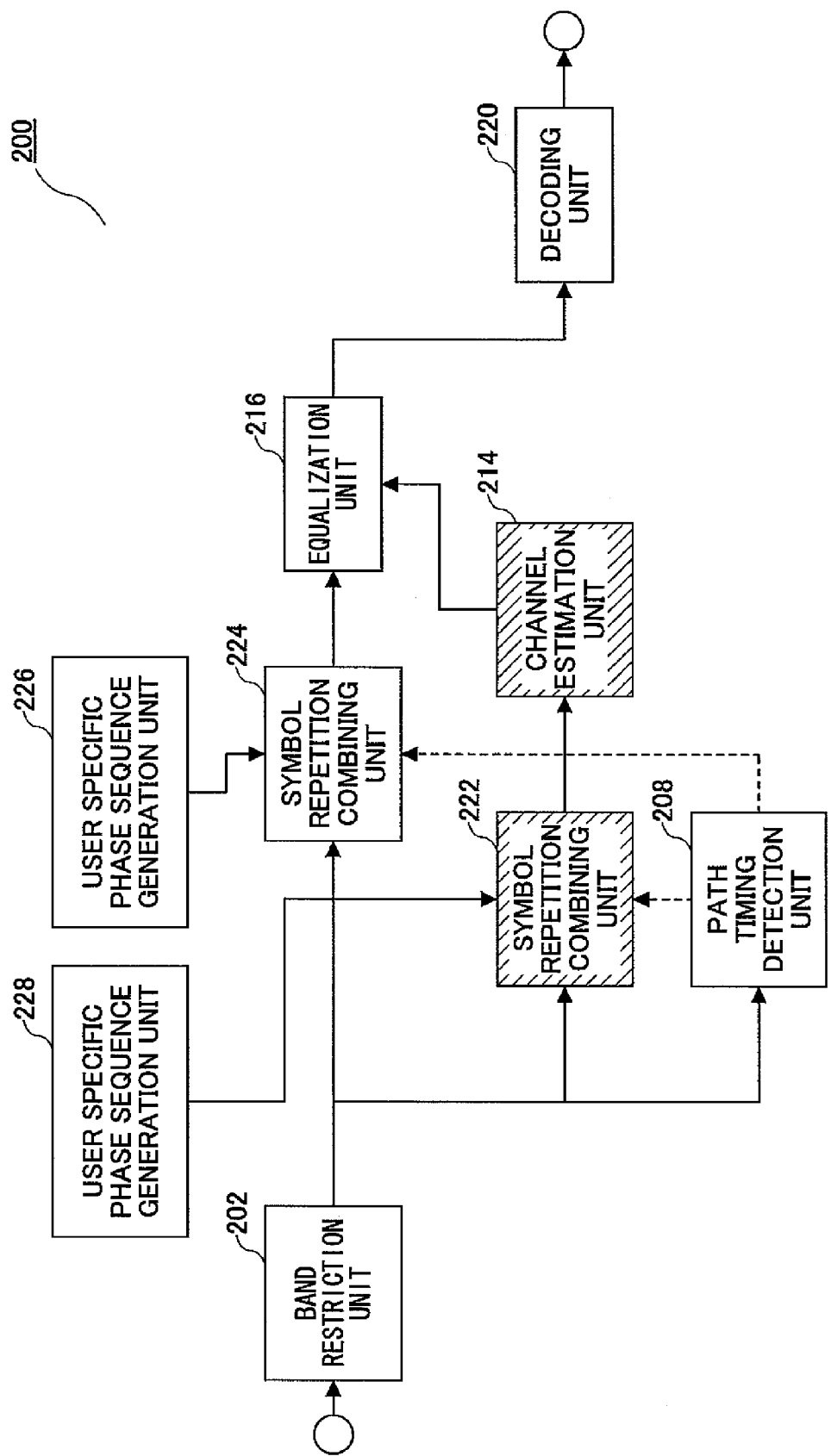

TRANSMITTER, RECEIVER, AND MOBILE COMMUNICATION SYSTEM

TECHNICAL FIELD

The present invention relates to a transmitter, a receiver and a mobile communication system.

BACKGROUND ART

Developments of the fourth generation mobile communication scheme that is a mobile communication scheme of a next generation of IMT-2000 (International Mobile Telecommunication 2000) are being progressed. In the fourth generation mobile communication schemer it is desired to support from multi-cell environments such as cellular systems to isolated-cell environments such as hot spots or indoor areas, and further desired to increase frequency use efficiency in both cell environments.

As a candidate of a radio access scheme applied for a link (to be referred to as "uplink") directed from a mobile station to a base station in the fourth generation mobile communication scheme, DS-CDMA (Direct Sequence-Code Division Multiple Access) is promising. In the direct sequence-code division multiple access, a transmission signal is multiplied by spread code so that it is transmitted while being spread into a wideband signal (refer to non-patent document 1, for example).

However, since the DS-CDMA is a radio access scheme suitable for a multi-cell environment, the following problems are worrisome. That is, in an isolated-cell environment such as a hot spot area and an indoor area where influence of other-cell interference is normally small, there are few advantages in decreasing the other-cell interference by using spreading. Therefore, in DS-CDMA, in order to realize frequency use efficiency similar to that of TDMA, it is necessary to accommodate many signals.

For example, when each mobile station transmits a transmission signal by multiplying the transmission signal by spread code of a spreading factor SF, information transmission speed becomes 1/SF. Thus, for realizing the frequency use efficiency the same as that of TDMA, it is necessary to accommodate SF signals of the mobile station in DS-CDMA. However, in an actual radio propagation environment in an uplink, influence of multiple access interference (MAI) in which signals from each mobile station interfere with each other become dominant due to difference of propagation conditions from each mobile station to the base station (variation of propagation delay time and propagation path, for example). As a result, the frequency use efficiency normalized by the spreading factor is decreased to about 20%-30%.

On the other hand, as a radio access scheme that can reduce the above-mentioned MAI, IFDMA (Interleaved Frequency Division Multiple Access) is being studied (refer to the non-patent document 2, for example). In the IFDMA, information symbols are rearranged by applying symbol repetition to the information symbols such that a symbol pattern is generated, and they are transmitted by multiplying the transmission signal by a phase specific to the mobile station.

For example, as shown in FIG. 1, a data modulated symbol sequence is converted to blocks each for every Q symbols, and compression and SRF times repetition is performed. Accordingly, comb-shaped frequency spectrum can be generated. In addition, in IFDMA, by generating the symbol pattern and by performing multiplication of the phase specific to the mobile station, signals from each mobile station can be placed such that they do not overlap with each other on a frequency axis. Thus, MAI can be reduced.

VSCRF (Variable Spreading and Chip Repetition Factors)-CDMA is proposed as an radio access scheme based on symbol repetition of IFDMA (refer to non-patent document 3, for example). In the VSCRF-CDMA, chip repetition is applied to chips obtained by spreading the data modulated symbol sequence, and spreading factor for so-called time spreading and a chip repetition factor are adaptively updated according to cell configuration, a number of simultaneously accessing users, and propagation channel conditions.

The spreading and the chip repetition in the VSCRF-CDMA are described with reference to FIG. 2. A data modulated symbol sequence as a modulated transmission signal is multiplied by spread code of a spreading factor SF so that a chip sequence after spreading is generated. Next, the chip sequence after spreading is converted into blocks each for every Q chips for performing chip repetition, and compression and CRF (Chip Repetition Factors) times repetition are performed.

The chip sequence after the chip repetition shows a frequency spectrum on the frequency axis. Since the chip sequence is a signal having a chip pattern, the frequency spectrum becomes a comb-shaped spectrum.

In addition, by providing phase rotation specific to each user to the sequence after chip repetition, it becomes possible to assign a different comb-shaped frequency spectrum to each user so that signals of each user can be made orthogonal in the frequency domain.

For example, the sequence is multiplied by a phase vector $s^{(k)}$ specific to the user in order to assign comb-shaped frequency spectrums that are orthogonal among simultaneously accessing users. As shown in FIG. 3, a component of $s^{(k)}$ is represented as the following equation, $$s_t^{(k)} = \exp[-j \cdot \Phi^{(k)} \cdot t]$$

wherein $\Phi^{(k)}$ indicates a phase specific to a user and is represented by the following equation.

$$\Phi^{(k)} = k \times 2\pi / (Q \cdot CRF \cdot Tc)$$

In the equation, k indicates a user number, t=0, 1, 2, ..., CRF×(Q−1).

As a result, since signals among CRF users at the maximum do not interfere with each other, that is, since there is no multiple interference, it becomes possible to receive signals of each user with high quality.

[Non-patent document 1] H. Atarashi, S. Abeta, and M. Sawahashi, "Broadband packet wireless access appropriate for high-speed and high-capacity throughput," IEEE VTC2001-Spring, pp. 566-570. May 2001

[Non-patent document 2] M. Schnell, I. Broek, and U. Sorger, "A promising new wideband multiple-access scheme for future mobile communication systems," European Trans, on Telecommun (ETT), vol. 10, no. 4, pp. 417-427, July/August 1999

[Non-patent document 3] Goto, Kawamura, Atarashi, Sawahashi, "Uplink Variable Spreading and Chip Repetition Factors (VSCRF)-CDMA broadband radio access", IEICE Technical Report, RCS2003-67, July, 2003.

DISCLOSURE OF THE INVENTION

Problem to be Solved by the Invention

However, the above-mentioned background art includes following problems.

In the VSCRF-CDMA, there is a problem in that the sequence after chip repetition does not have tolerance to multipath interference. The multipath interference is interference caused by multipath propagation of the own signal.

In addition, in a cellular system, in a case where there is a neighboring cell using a same frequency band, there is a problem of receiving a large same channel interference when comb-shaped frequency spectrums used between the cells are the same as shown in FIG. 4.

As mentioned above, the VSCRF-CDMA has a feature shown in FIG. 5 by controlling spreading and chip repetition. That is, for the multipath interference, although interference suppression effect can be made large by controlling the spreading factor, interference suppression effect is small even by controlling chip repetition.

As to multiple access interference, although there is interference suppression effect by controlling the spreading factor, interference suppression effect can be made large by controlling chip repetition.

In addition, for the same channel interference, interference suppression effect can be made large by controlling the spreading factor, and interference suppression effect can be made large by controlling chip repetition when there is no spectrum collision, but interference suppression effect is small when there is spectrum collision.

On the other hand, when receiving a transmitted signal, it is necessary to estimate variations of amplitude and phase due to fading variation in a radio propagation path to realize synchronous detection modulation, and it is necessary to estimate link status of radio propagation path such as SINR (Signal-to-Interference plus noise power ratio), number of paths, delay spread, Doppler frequency and the like. But, there is a problem in that a reference signal used for that purposes, such as a pilot signal and a pilot channel, may receive the above-mentioned interference.

An object of the present invention is to provide a transmitter, a receiver and a mobile communication system that can reduce interference that affects the reference signal, and that can improve estimation accuracy of variation of amplitude and phase, and estimation accuracy of link status.

Means for Solving the Problem

To solve the above-mentioned problem, a transmitter of the present invention includes:

spread code multiplying means that multiplies a symbol sequence forming a reference signal by spread code to generate a chip sequence after spreading;

chip pattern generation means that generates a chip pattern by performing chip repetition a predetermined repetition number of times on the chip sequence after spreading; and multiplying means that multiplies a signal having the chip pattern by a phase specific to the transmitter.

By configuring the transmitter like this, interference received by a reference signal that is, for example, a pilot channel can be decreased.

Another transmitter of the present invention includes:

symbol pattern generation means that generates a symbol pattern by performing symbol repetition a predetermined repetition number of times on a symbol sequence forming a reference signal; and multiplying means that multiplies a signal having the symbol pattern by a phase specific to the transmitter.

By configuring the transmitter like this, interference received by a reference signal that is, for example, a pilot channel can be decreased.

A receiver of the present invention includes:

chip repetition combining means that recombines a reference signal on which chip repetition is performed to generate a spread chip sequence;

despreading means that multiplies the chip sequence by spread code to generate a symbol sequence forming a reference signal before spreading; and channel estimation means that performs channel estimation based on the symbol sequence.

By configuring the receiver like this, estimation accuracy of variation of amplitude and phase, and estimation accuracy of link status can be improved.

Another receiver of the present invention includes:

symbol repetition combining means that recombines a reference signal on which symbol repetition is performed to generate a symbol sequence that forms the reference signal; and channel estimation means that performs channel estimation based on the symbol sequence.

By configuring the receiver like this, estimation accuracy of variation of amplitude and phase, and estimation accuracy of link status can be improved.

A mobile communication system of the present invention is a mobile communication system including a transmitter and a receiver, and the transmitter includes:

spread code multiplying means that multiplies a symbol sequence forming a reference signal by spread code to generate a chip sequence after spreading;

chip pattern generation means that generates a chip pattern by performing chip repetition a predetermined repetition number of times on the chip sequence after spreading; and multiplying means that multiplies a signal having the chip pattern by a phase specific to the transmitter, and the receiver includes:

chip repetition combining means that recombines a reference signal on which chip repetition is performed to generate a spread chip sequence;

despreading means that multiplies the chip sequence by spread code to generate a symbol sequence forming a reference signal before spreading; and channel estimation means that performs channel estimation based on the symbol sequence.

By configuring the system like this, interference received by a reference signal that is, for example, a pilot channel can be decreased in the transmitter, and estimation accuracy of variation of amplitude and phase and estimation accuracy of link status can be improved in the receiver.

Another mobile communication system of the present invention is a mobile communication system including a transmitter and a receiver, and the transmitter includes:

symbol pattern generation means that generates a symbol pattern by performing symbol repetition a predetermined repetition number of times on a symbol sequence forming a reference signal; and multiplying means that multiplies a signal having the symbol pattern by a phase specific to the transmitter, and the receiver includes:

symbol repetition combining means that recombines a reference signal on which symbol repetition is performed to generate a symbol sequence that forms the reference signal; and channel estimation means that performs channel estimation based on the symbol sequence.

By configuring the system like this, interference received by a reference signal that is, for example, a pilot channel can be decreased in the transmitter, and estimation accuracy of variation of amplitude and phase and estimation accuracy of link status can be improved in the receiver.

Effect of the Invention

As mentioned before, according to an embodiment of the present invention, a transmitter, a receiver and a mobile communication system that can reduce interference that affects the reference signal, and that can improve estimation accuracy of variation of amplitude and phase, and estimation accuracy of link status can be realized.

BRIEF DESCRIPTION OF THE DRAWINGS

FIG. 5 is a schematic diagram showing characteristics of VSCRF-CDMA;
FIG. 9C is a schematic diagram showing multiplexing of a pilot channel, a control channel and a data channel;
FIG. 11B is a schematic diagram showing multiplexing of a pilot channel, a control channel and a data channel;
FIG. 15D is a schematic diagram showing multiplexing of a pilot channel, a control channel and a data channel;
FIG. 15E is a schematic diagram showing multiplexing of a pilot channel, a control channel and a data channel;
FIG. 22A is a schematic diagram showing multiplexing of a pilot channel, a control channel and a data channel;
FIG. 23A is a schematic diagram showing multiplexing of a pilot channel, a control channel and a data channel;
FIG. 23B is a schematic diagram showing multiplexing of a pilot channel, a control channel and a data channel;
FIG. 25 is a block diagram showing a configuration of a transmitter according to an embodiment of the present invention.

FIG. 29B is a schematic diagram showing multiplexing of a pilot channel, a control channel and a data channel;

FIG. 30 is a block diagram showing a configuration of a receiver according to an embodiment of the present invention;

FIG. 31 is a block diagram showing a configuration of a receiver according to an embodiment of the present invention.

DESCRIPTION OF REFERENCE SIGNS 100 transmitter
200 receiver

PREFERRED EMBODIMENTS FOR CARRYING OUT THE INVENTION

Next, embodiments of the present invention are described in detail with reference to figures.

By the way, in all diagrams for explaining the embodiments, same reference symbols are used for components having same functions, and repeated descriptions are not provided.

First, the method of multiplexing a pilot channel into a packet frame is described with reference to FIGS. 6A, 6B and 6C as a time multiplexing pilot channel configuration, a code multiplexing pilot channel configuration and a frequency multiplexing pilot channel configuration respectively.

Figure 1:
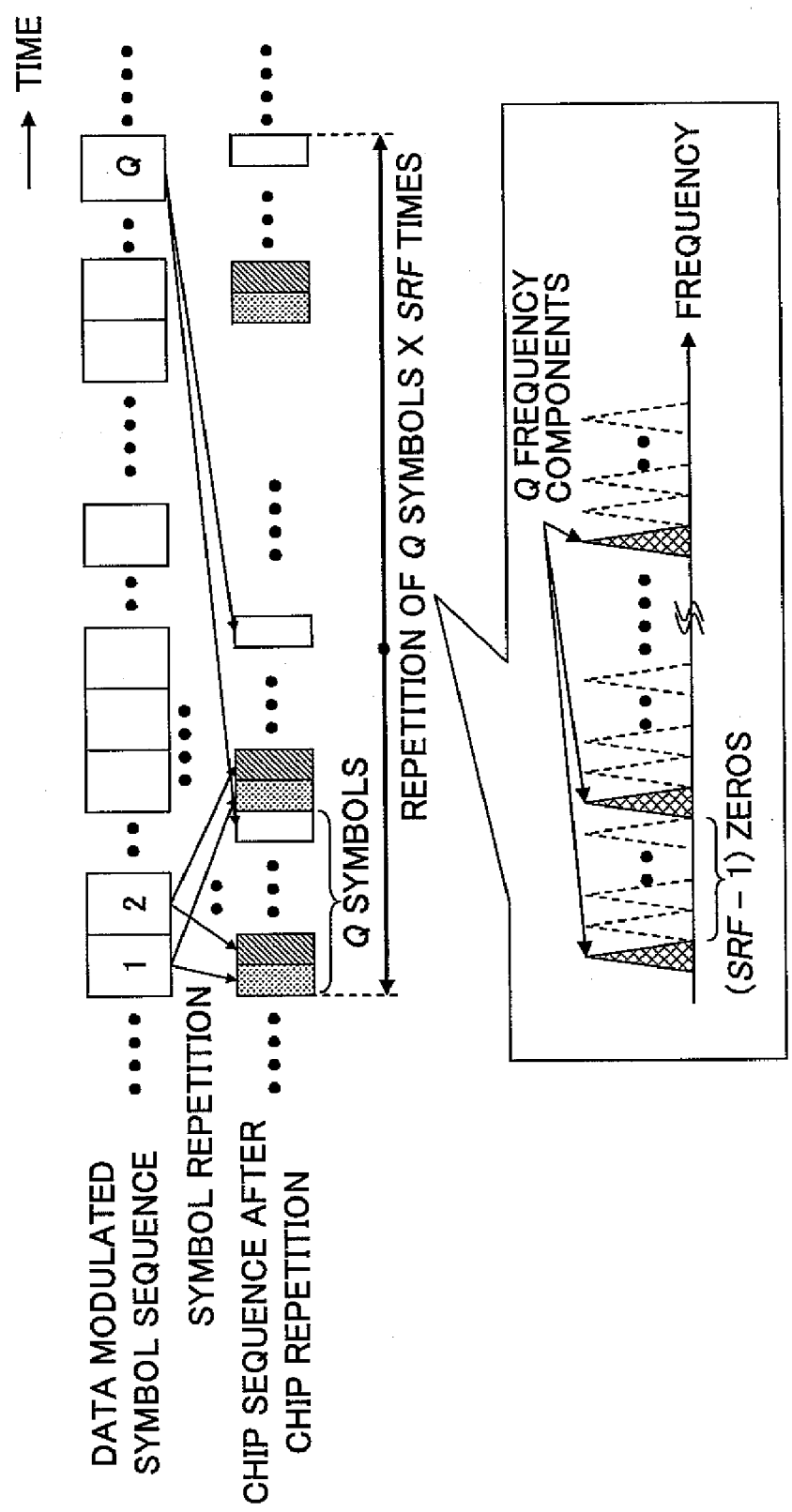
FIG. 1 is a schematic diagram showing IFDMA.
Figure 2:
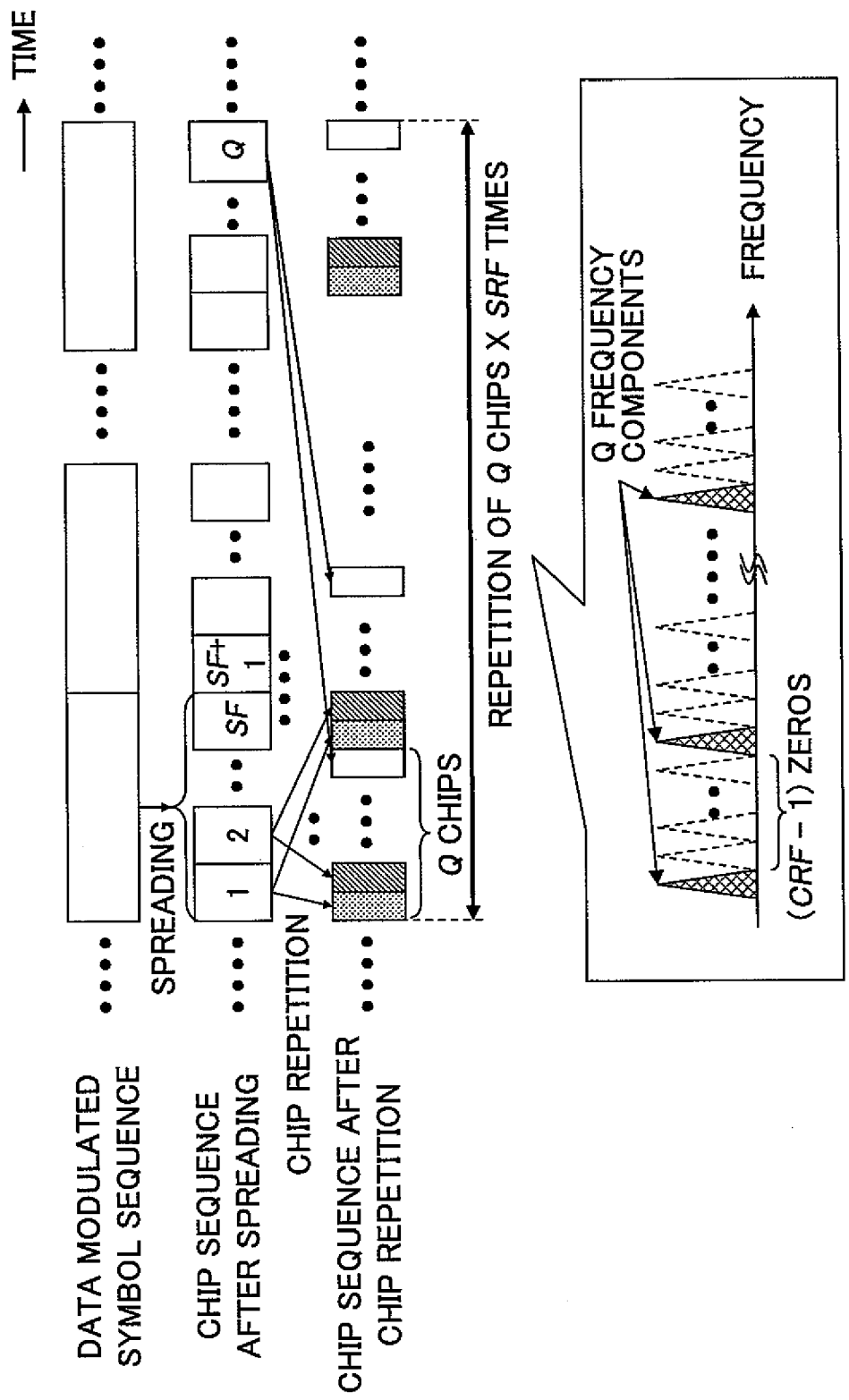
FIG. 2 is a schematic diagram showing VSCRF-CDMA.
Figure 3:
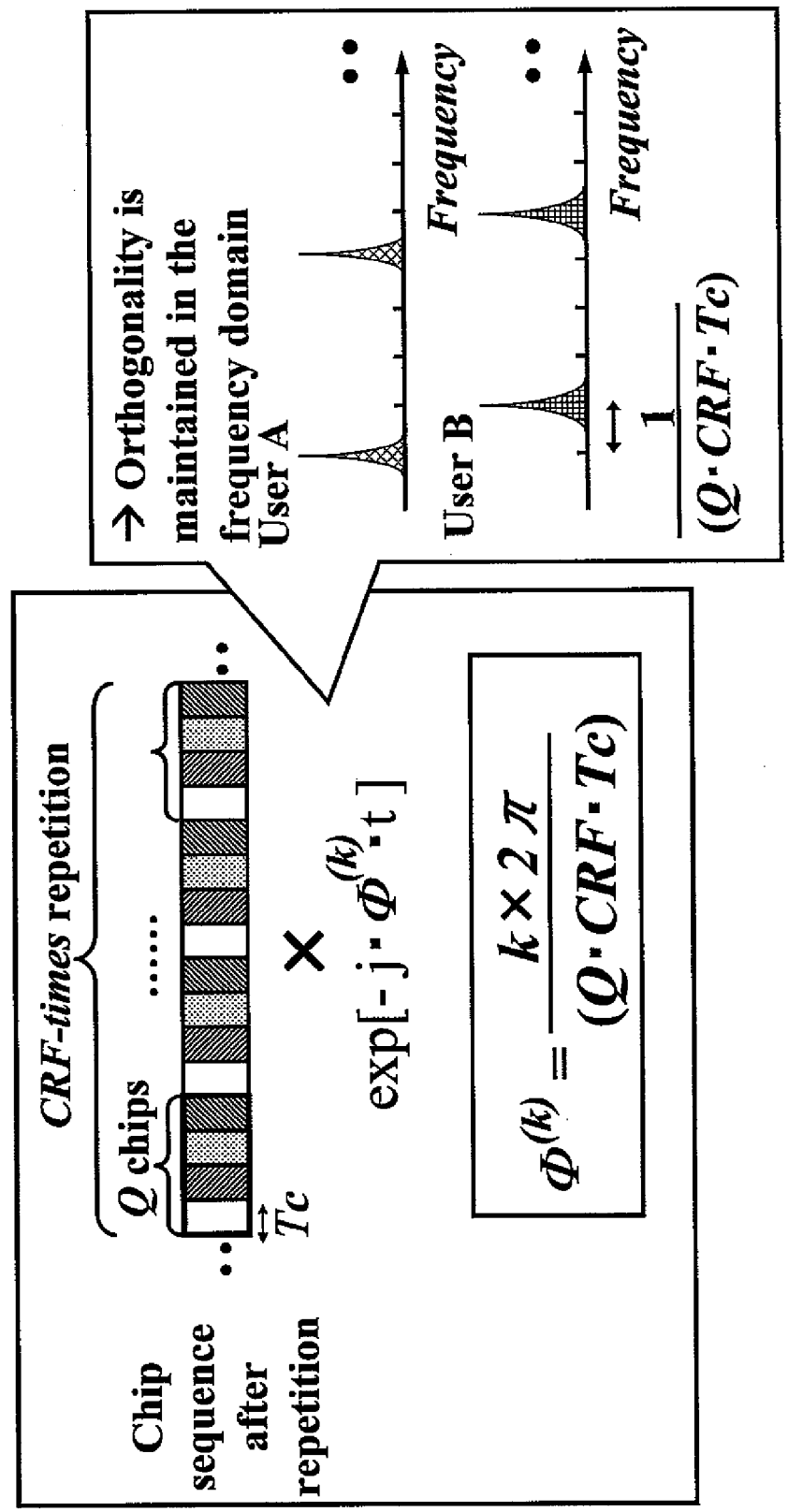
FIG. 3 is a schematic diagram showing VSCRF-CDMA.
Figure 4:
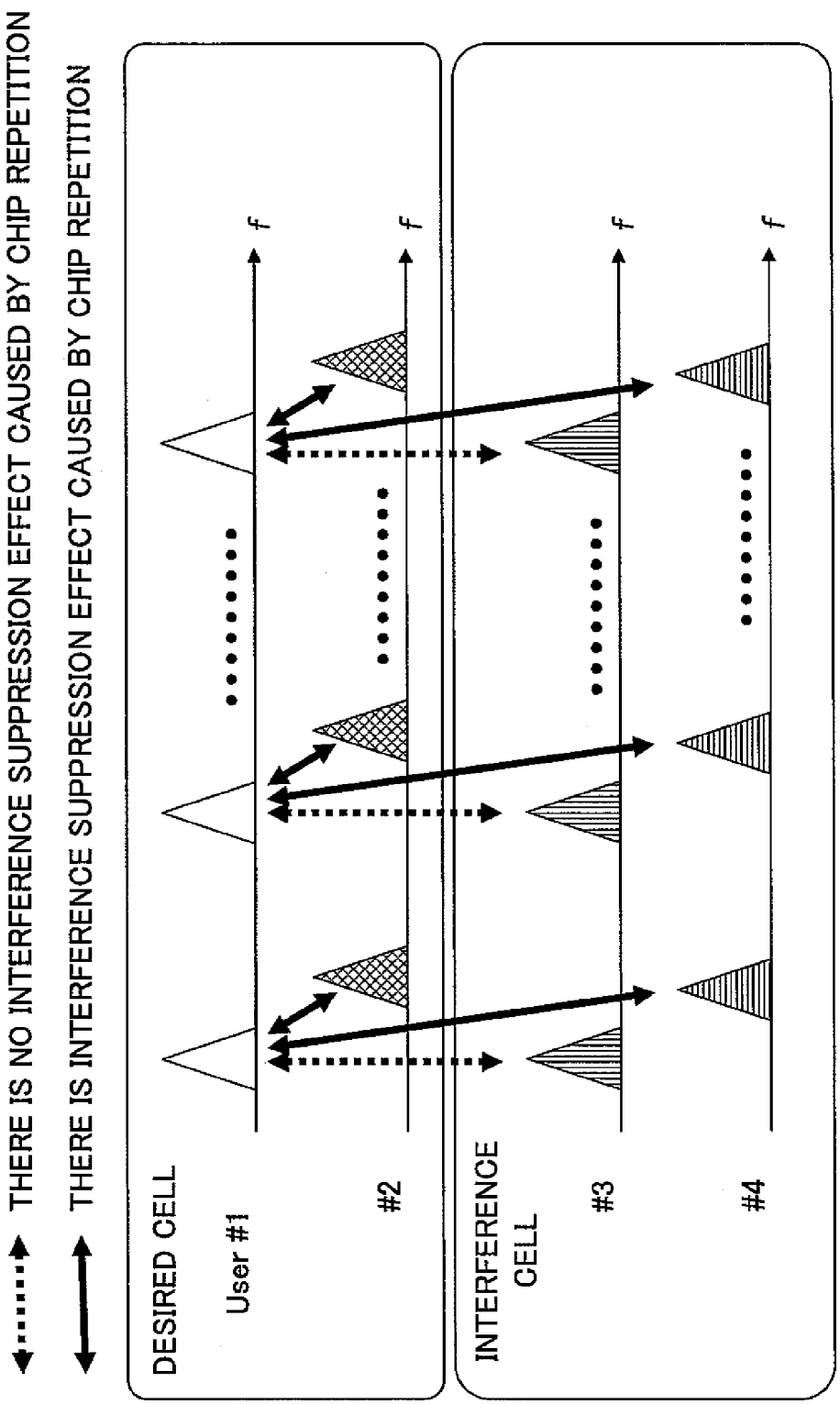
FIG. 4 is a schematic diagram showing multipath interference in VSCRF-CDMA.
Figure 6A:
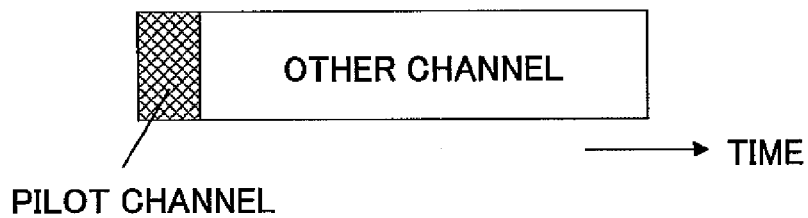
FIG. 6A is a schematic diagram showing multiplexing of a pilot channel into a packet frame.

In the time multiplexing pilot channel configuration, as shown in FIG. 6A, the pilot channel to which chip repetition or symbol repetition is applied is time-multiplexed. By configuring in this way, since the pilot channel can be made independent from other channels with respect to time, effect from other channels that are a data channel and a control channel, for example, can be decreased.

Figure 6B:
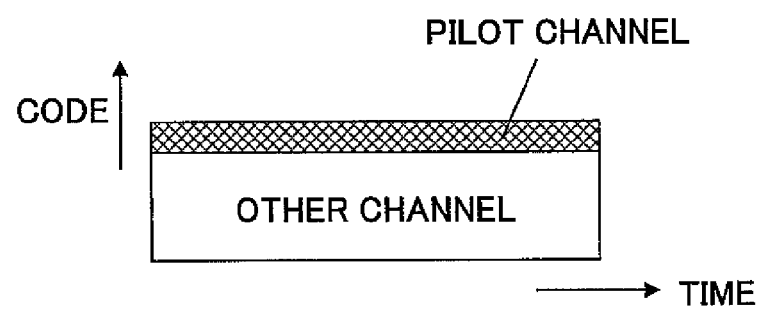
FIG. 6B is a schematic diagram showing multiplexing of a pilot channel into a packet frame.

Next, in the code multiplexing pilot channel configuration, as shown in FIG. 6B, the pilot channel to which chip repetition is applied is assigned orthogonal code different from that of other channels so that code multiplexing is performed. By configuring in this way, since it is spread over time and frequency, averaging effect for interference and noise can be increased.

Figure 6C:
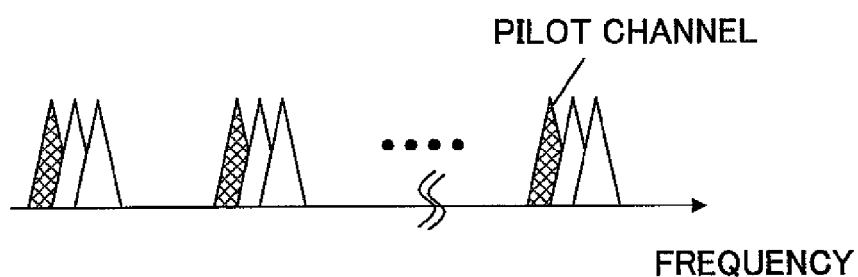
FIG. 6C is a schematic diagram showing multiplexing of a pilot channel into a packet frame.

Next, in the frequency multiplexing pilot channel configuration, as shown in FIG. 6C, the pilot channel, to which chip repetition or symbol repetition is applied, is frequency-multiplexed. By configuring in this way, since the pilot channel can be made independent with respect to frequency, influence of interference from other channels such as a data channel and a control channel can be decreased.

The mobile communication system of an embodiment of the present invention includes a transmitter and a receiver. In the following, the transmitter and the receiver are described.

Figure 7:
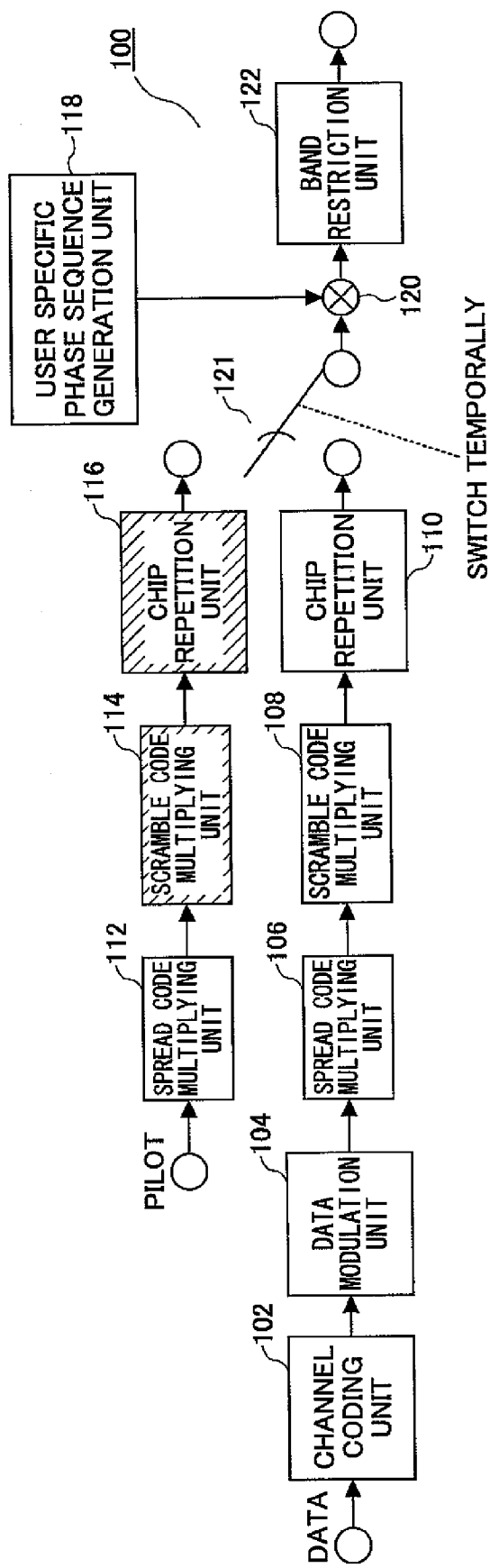
FIG. 7 is a block diagram showing a configuration of a transmitter according to an embodiment of the present invention.

The transmitter of a first embodiment of the present invention is described with reference to FIG. 7.

The transmitter 100 in the present embodiment time-multiplexes a pilot channel to which chip repetition is applied in the VSCRF-CDMA using spreading and chip repetition.

The transmitter 100 includes a channel coding unit 102 to which a data symbol sequence is supplied, a data modulation unit 104 connected to the channel coding unit 102, a spread code multiplying unit 106 connected to the data modulation unit 104, a scramble code multiplying unit 108 connected to the spread code multiplying unit 106, a chip repetition unit 110 connected to the scramble code multiplying unit 108, a spread code multiplying unit 112 receiving a pilot symbol sequence forming a reference signal such as a pilot signal or a pilot channel, a scramble code multiplying unit 114 connected to the spread code multiplying unit 112, a chip repetition unit 116 as a chip pattern generation means connected to the scramble code multiplying unit 114, a multiplying unit 120 switchably connected to the chip repetition unit 110 or the chip repetition unit 116 by a switch 121 as a switch means, and a user specific phase sequence generation unit 118 and a band restriction unit 122 each connected to the multiplying unit 120.

Channel coding is performed in the channel coding unit 102 on the data symbol sequence for which error correction code such as turbo code and convolution code are applied, so that the data symbol sequence is supplied to the data modulation unit 104. In the data modulation unit 104, modulation processing is performed on the channel-coded data and it is supplied to the spread code multiplying unit 106. In the spread code multiplying unit 106, the modulated data is multiplied by spread code so that a spread chip sequence is generated and is supplied to the scramble code multiplying unit 108. In the scramble code multiplying unit 108, the spread chip sequence is multiplied by scramble code and is supplied to the chip repetition unit 110.

In the chip repetition unit 110, chip repetition is performed every predetermined chips for the chip sequence which has been multiplied by the scramble code, so that a chip pattern is generated and it is supplied to the multiplying unit 120. In the multiplying unit 120, the chip pattern is multiplied by a user specific phase vector that is supplied by the user specific phase sequence generation unit 118, and it is supplied to the band restriction unit 122. In the band restriction unit 122, band restriction is performed on the chip pattern which has been multiplied by the phase.

On the other hand, the pilot symbol sequence that forms a reference signal such as a pilot signal or a pilot channel is multiplied by spread code in the spread code multiplying unit 112, so that a spread chip sequence is generated and it is supplied to the scramble code multiplying unit 114. In the scramble code multiplying unit 114, the spread chip sequence is multiplied by the scramble code and it is supplied to the chip repetition unit 116.

In the chip repetition unit 116, chip repetition is performed every predetermined chips on the chip sequence which has been multiplied by the scramble code, so that it is supplied to the multiplying unit 120. In the multiplying unit 120, the chip pattern is multiplied by a user specific phase vector that is supplied by the user specific phase series generation unit 118, and it is supplied to the band restriction unit 122. In the band restriction unit 122, band restriction is performed on the chip pattern which has been multiplied by the phase.

The switch 121 temporally switches between the chip repetition unit 110 and the chip repetition unit 116. By configuring in this way, since transmission of the pilot channel to which chip repetition is applied is made independent from transmission of other channels with respect to time, influence of interference from other channels such as a data channel and a control channel to the pilot channel can be decreased.

Figure 8A:
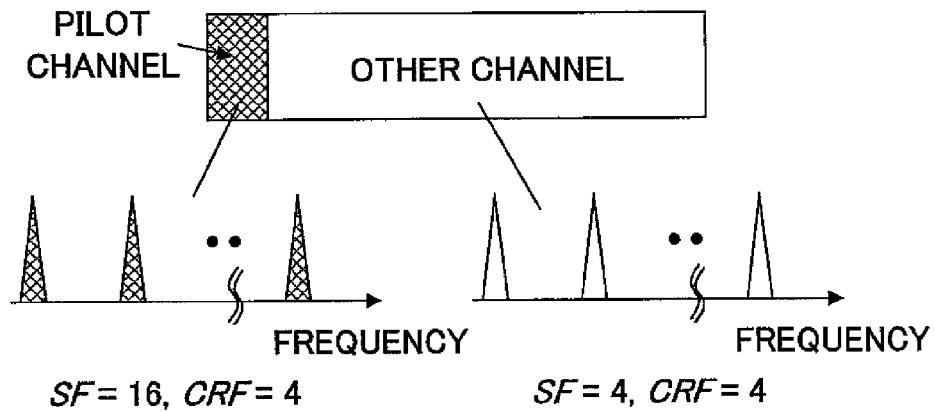
FIG. 8A is a schematic diagram showing application of chip repetition and spreading to a pilot channel.

Next, methods for applying chip repetition and spreading to the pilot channel in the transmitter 100 in the present embodiment are described with reference to FIGS. 8A, 8B and 8C.

First, a configuration in which chip repetition factors are the same between the pilot channel and other channel is described with reference to FIG. 8A. In this case, the chip repetition units 110 and 116 perform chip repetition using the same chip repetition factor.

For example, for a pilot channel, the spread code multiplying unit 112 performs spreading using a spreading factor SF=16, and the chip repetition unit 116 performs chip repetition of a chip repetition factor CRF=4 times. On the other hand, for the other channels, the spread code multiplying unit 106 performs spreading using a spreading factor SF=4, and the chip repetition unit 110 performs chip repetition of a chip repetition factor CRF=4 times.

Accordingly, by using the same chip repetition factors, since the pilot channel can be made orthogonal to signals of other users, interference received by a reference signal that is the pilot channel, for example, can be decreased. Accordingly, in the receiver, estimation can be performed with small influence of multiple access interference.

Next, a configuration in which a chip repetition factor of the pilot channel is smaller than a chip repetition factor of other channels is described with reference to FIG. 8B. In this case, the chip repetition unit 116 performs chip repetition using a chip repetition factor smaller than a chip repetition factor that is used in chip repetition performed by the chip repetition unit 110.

Figure 8B:
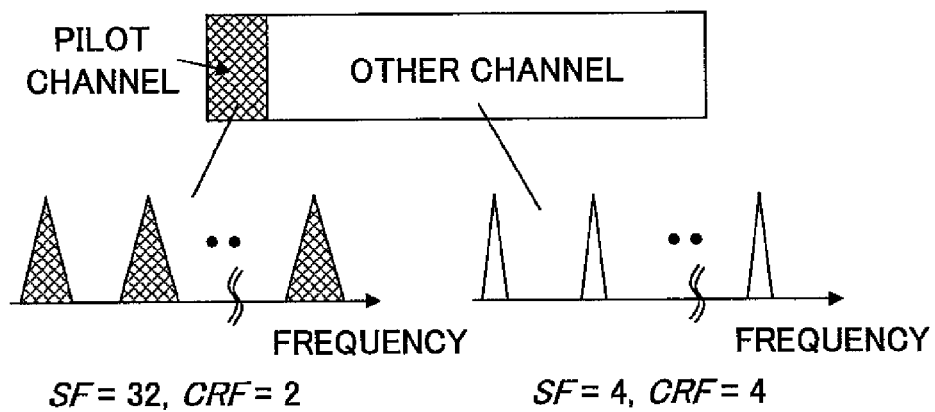
FIG. 8B is a schematic diagram showing application of chip repetition and spreading to a pilot channel.

For example, as shown in FIG. 8B, for a pilot channel, the spread code multiplying unit 112 performs spreading using a spreading factor SF=32, and the chip repetition unit 116 performs chip repetition of a chip repetition factor CRF=2 times. On the other hand, for the other channels, the spread code multiplying unit 106 performs spreading using a spreading factor SF=4, and the chip repetition unit 110 performs chip repetition of a chip repetition factor CRF=4 times.

Accordingly, by using a chip repetition factor, for a pilot channel, that is smaller than the chip repetition factor of other channels, tolerance to multipath interference can be improved so that interference received by a reference signal such as a pilot channel can be decreased. Accordingly, estimation accuracy in the receiver can be improved. Although a case where the chip repetition factor of the pilot channel is 2 is described in this example, only spreading may be performed without applying chip repetition.

Next, a configuration in which a chip repetition factor for the pilot channel is greater than a chip repetition factor for other channels is described with reference to FIG. 8C. In this case, the chip repetition unit 116 performs chip repetition using a chip repetition factor greater than a chip repetition factor that is used in chip repetition performed by the chip repetition unit 110.

Figure 8C:
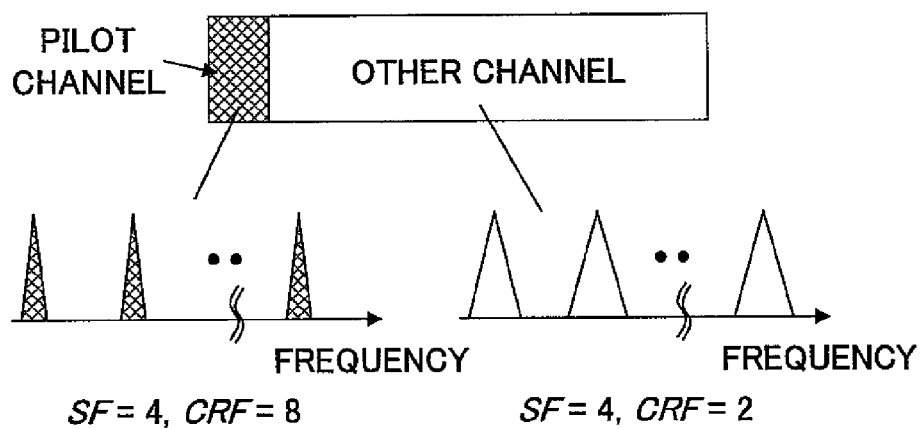
FIG. 8C is a schematic diagram showing application of chip repetition and spreading to a pilot channel.

For example, as shown in FIG. 8C, for a pilot channel, the spread code multiplying unit 112 performs spreading using a spreading factor SF=4, and the chip repetition unit 116 performs chip repetition of a chip repetition factor CRF=8 times. On the other hand, for the other channels, the spread code multiplying unit 106 performs spreading using a spreading factor SF=4, and the chip repetition unit 110 performs chip repetition of a chip repetition factor CRF=2 times. Accordingly, by using a chip repetition factor, for a pilot channel, that is greater than a chip repetition factor of other channels, more pilot channels can be multiplexed.

By changing the spreading factor and the chip repetition factor in this way, suppression effect for each interference can be changed. That is, at least one of the spread code multiplying unit 112 and the chip repetition unit 116 changes suppression effect for each interference by changing at least one of the spreading factor and the chip repetition factor. In other words, at least one of the spread code multiplying unit 112 and the chip repetition unit 116 changes at least one of the values of the spreading factor and the chip repetition factor according to desired suppression effect for each interference.

Next, in a case when the above-mentioned "other channel" is formed by "control channel" or "data channel", multiplexing of the channel and the "pilot channel" is described.

First, cases in which a pilot channel is time-multiplexed and a control channel is time-multiplexed, to a data channel to which chip repetition is applied are described with reference to FIGS. 9A-9E.

Figure 9A:
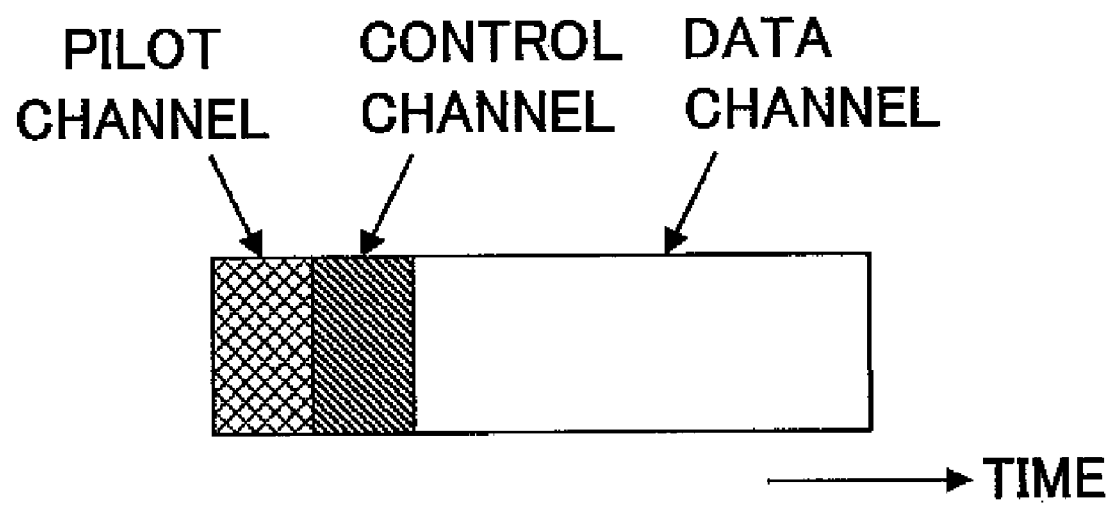
FIG. 9A is a schematic diagram showing multiplexing of a pilot channel, a control channel and a data channel.

As shown in FIG. 9A, in this case, the pilot channel and the control channel are time-multiplexed. Further, as to this multiplexing method, there are four types of multiplexing methods according to whether chip repetition is performed. In the following, these four types of multiplexing methods are described.

Figure 9B:
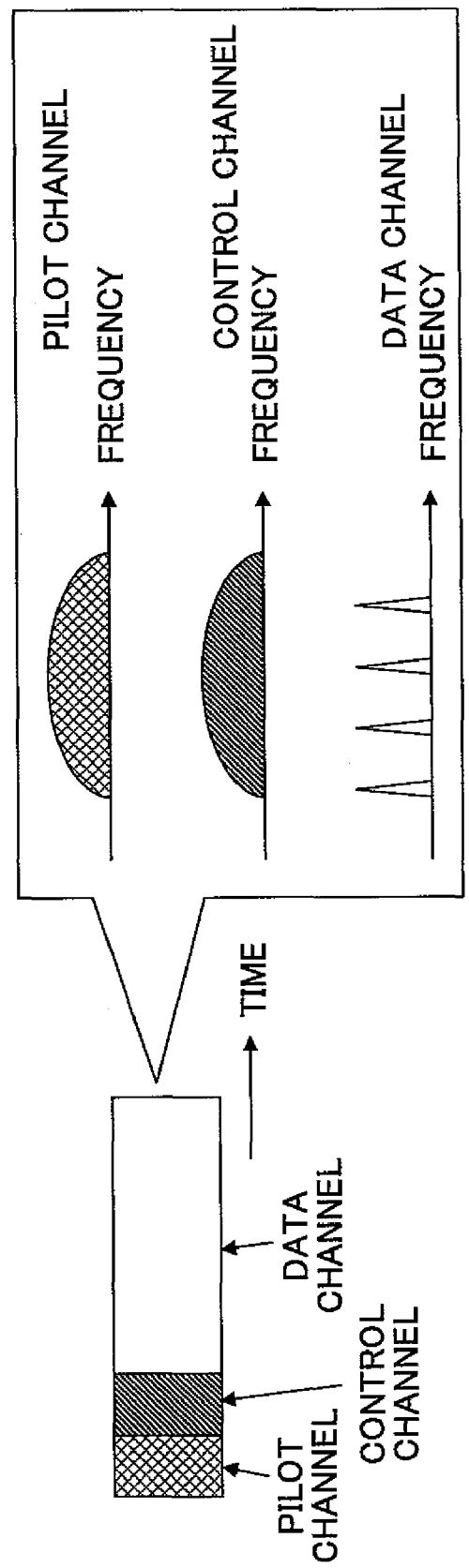
FIG. 9B is a schematic diagram showing multiplexing of a pilot channel, a control channel and a data channel.

As shown in FIG. 9B, when chip repetition is not performed for the pilot channel and the control channel, a frequency spectrum indicating a chip sequence after spreading is formed for each of the pilot channel and the control channel, and a comb-shaped frequency spectrum is formed for the data channel.

When chip repetition is not performed for the pilot channel and chip repetition is performed for the control channel, as shown in FIG. 9C, a frequency spectrum indicating a chip sequence after spreading is formed for the pilot channel, and a comb-shaped frequency spectrum is formed for each of the control channel and the data channel.

Figure 9D:
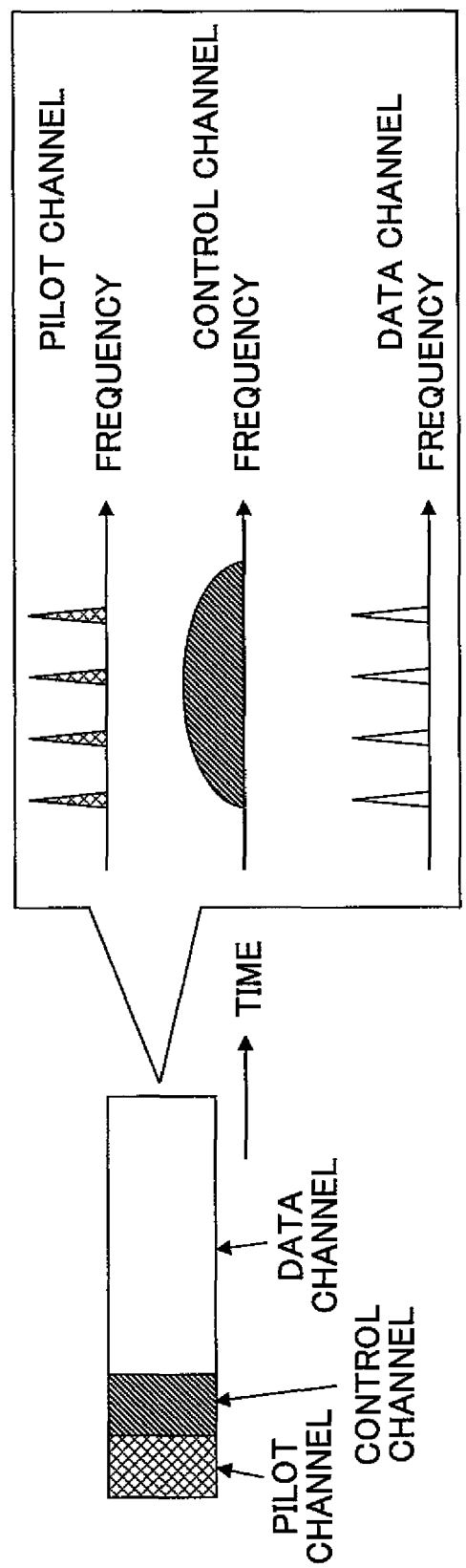
FIG. 9D is a schematic diagram showing multiplexing of a pilot channel, a control channel and a data channel.

As shown in FIG. 9D, when chip repetition is performed for the pilot channel and chip repetition is not performed for the control channel, a frequency spectrum indicating a chip sequence after spreading is formed for the control channel, and a comb-shaped frequency spectrum is formed for each of the pilot channel and the data channel.

Figure 9E:
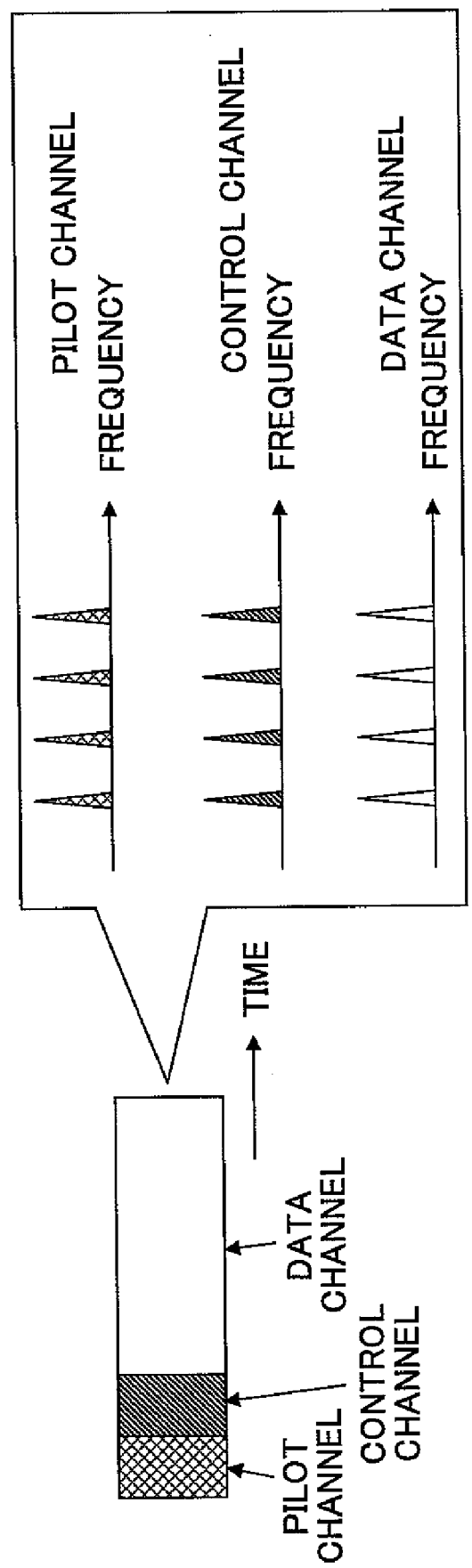
FIG. 9E is a schematic diagram showing multiplexing of a pilot channel, a control channel and a data channel.

As shown in FIG. 9E, when chip repetition is performed for the pilot channel and the control channel, a comb-shaped frequency spectrum is formed for each of the pilot channel, the control channel and the data channel.

Next, cases are described with reference to FIGS. 10A-10C in which, to a data channel to which channel repetition is applied, a pilot channel is time-multiplexed and a control channel is frequency-multiplexed, that is, a sub-carrier different from the data channel is assigned.

Figure 10A:
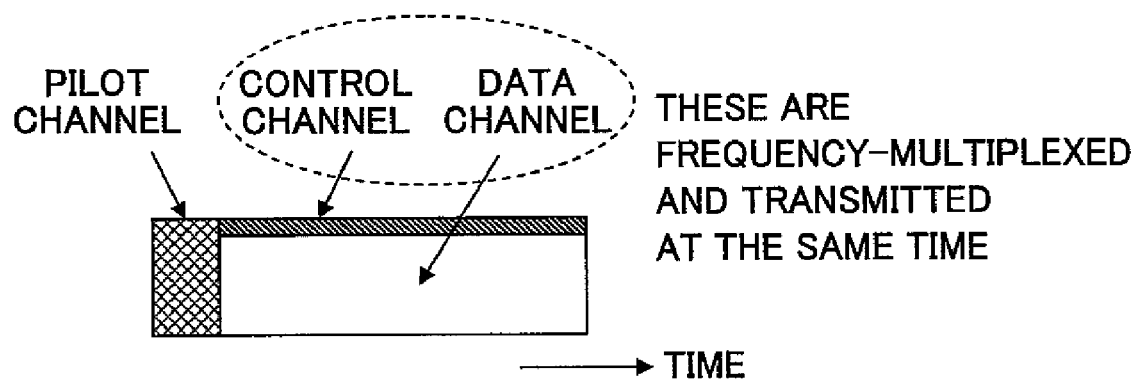
FIG. 10A is a schematic diagram showing multiplexing of a pilot channel, a control channel and a data channel.

In this case, as shown in FIG. 10A, the pilot channel and the control channel are time-multiplexed. The control channel and the data channel are frequency-multiplexed so as to be transmitted at the same time. In addition, as to this multiplexing method, there are two types of multiplexing methods according to whether chip repetition is performed. In the following, these two types of multiplexing methods are described.

Figure 10B:
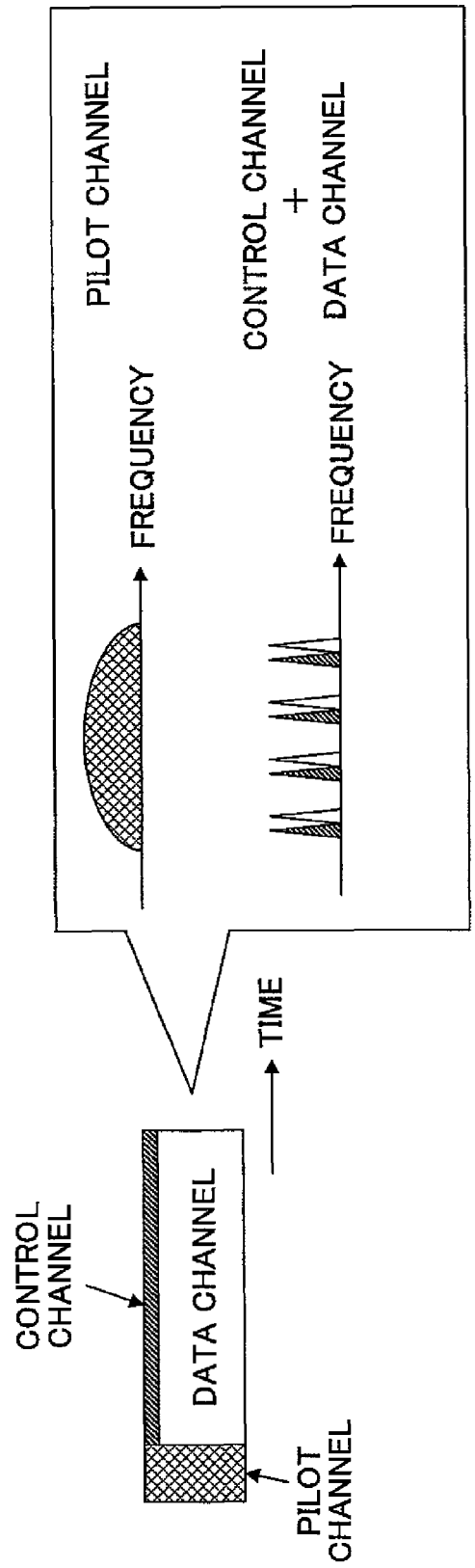
FIG. 10B is a schematic diagram showing multiplexing of a pilot channel, a control channel and a data channel.

As shown in FIG. 10B, when chip repetition is not performed for the pilot channel and chip repetition is performed for the control channel, a frequency spectrum indicating a chip sequence after spreading is formed for the pilot channel, and comb-shaped frequency spectrums in which sub-carrier sets different with each other are assigned are formed for the control channel and the data channel.

Figure 10C:
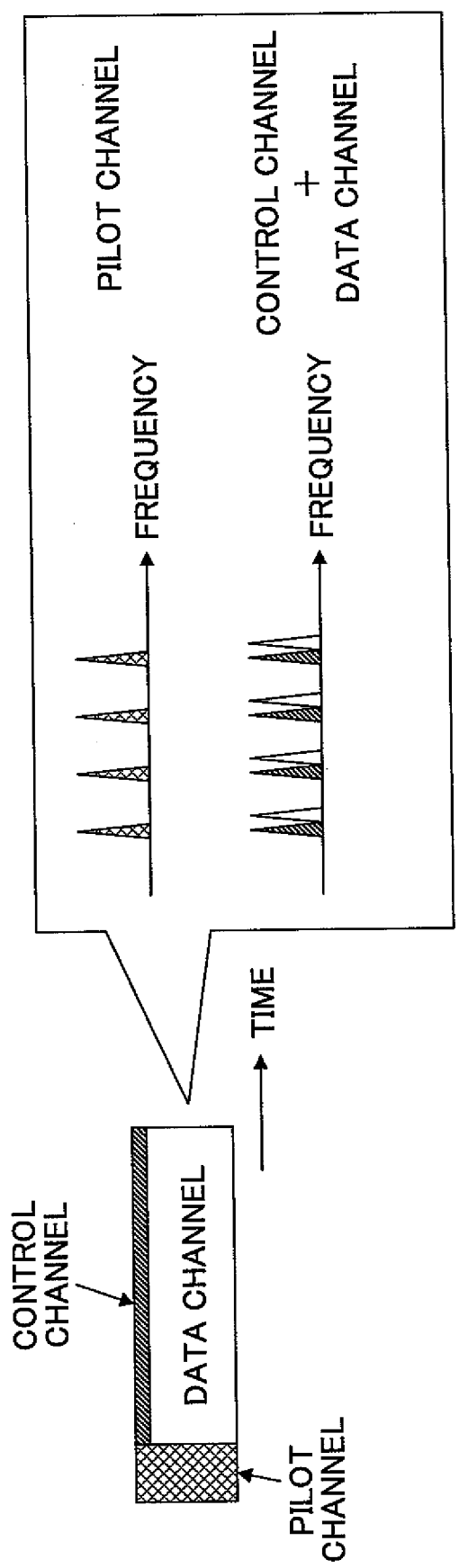
FIG. 10C is a schematic diagram showing multiplexing of a pilot channel, a control channel and a data channel.

As shown in FIG. 10C, when chip repetition is performed for the pilot channel and the control channel, a comb-shaped frequency spectrum is formed for the pilot channel, and comb-shaped frequency spectrums in which sub-carrier sets different with each other are assigned are formed for the control channel and the data channel.

Next, cases in which the pilot channel is time-multiplexed and the control channel is time-multiplexed, to the data channel to which chip repetition is applied are described with reference to FIGS. 11A and 11B.

Figure 11A:
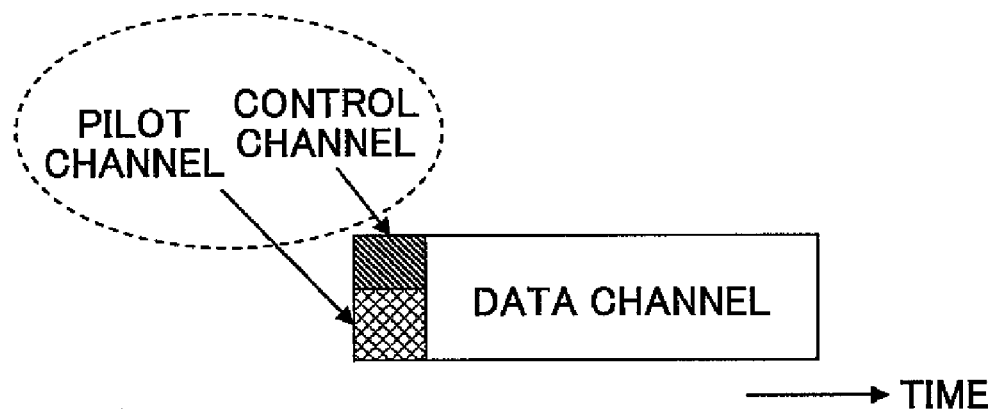
FIG. 11A is a schematic diagram showing multiplexing of a pilot channel, a control channel and a data channel.

As shown in FIG. 11A, in this case, the pilot channel and the control channel are frequency-multiplexed.

Also in this multiplexing method, because of chip repetition, as shown in FIG. 11B, comb-shaped frequency spectrums in which sub-carrier sets different with each other are assigned are formed for the pilot channel and the control channel, and a comb-shaped frequency spectrum is formed for the data channel.

Next, cases are described with reference to FIGS. 12A-12C in which, to the data channel to which chip repetition is applied, the pilot channel is frequency-multiplexed, that is, a sub-carrier different from the data channel is assigned, and the control channel is time-multiplexed.

Figure 12A:
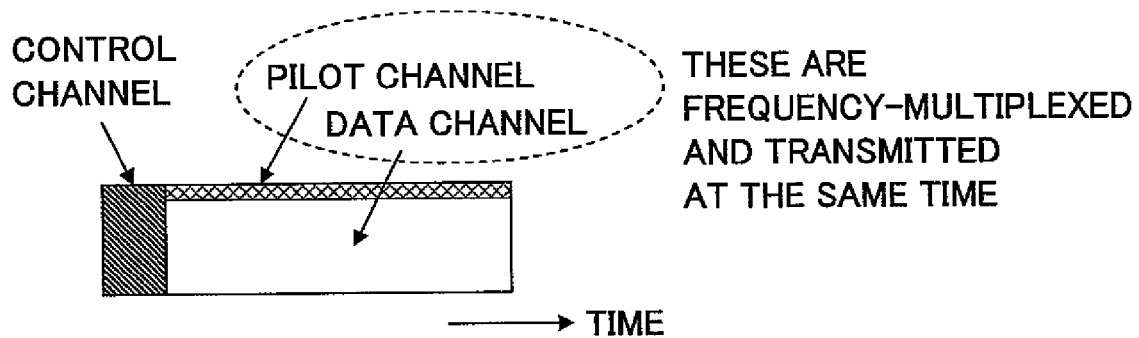
FIG. 12A is a schematic diagram showing multiplexing of a pilot channel, a control channel and a data channel.

As shown in FIG. 12A, the pilot channel and the control channel are time-multiplexed. The pilot channel and the data channel are frequency-multiplexed and are transmitted at the same time. In addition, as to this multiplexing method, there are two types of multiplexing method according to whether chip repetition is performed. In the following, these two types of multiplexing methods are described.

Figure 12B:
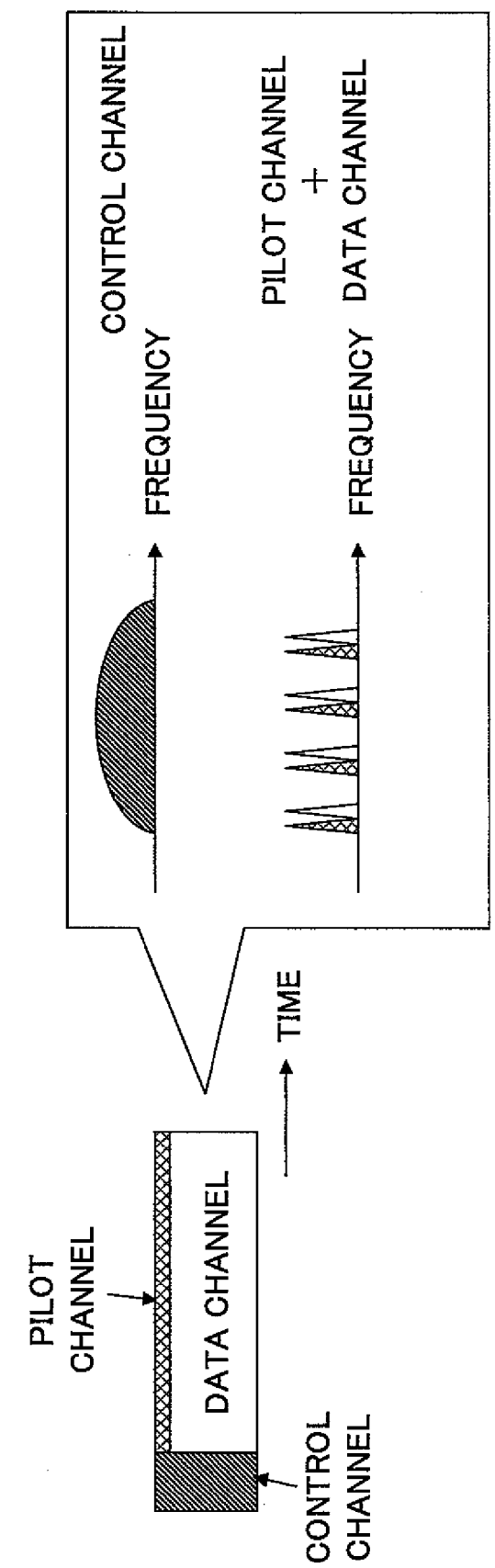
FIG. 12B is a schematic diagram showing multiplexing of a pilot channel, a control channel and a data channel.

As shown in FIG. 12B, when chip repetition is performed for the pilot channel and chip repetition is not performed for the control channel, a frequency spectrum indicating a chip sequence after spreading is formed for the control channel, and comb-shaped frequency spectrums in which sub-carrier sets different with each other are assigned are formed for the pilot channel and the data channel.

Figure 12C:
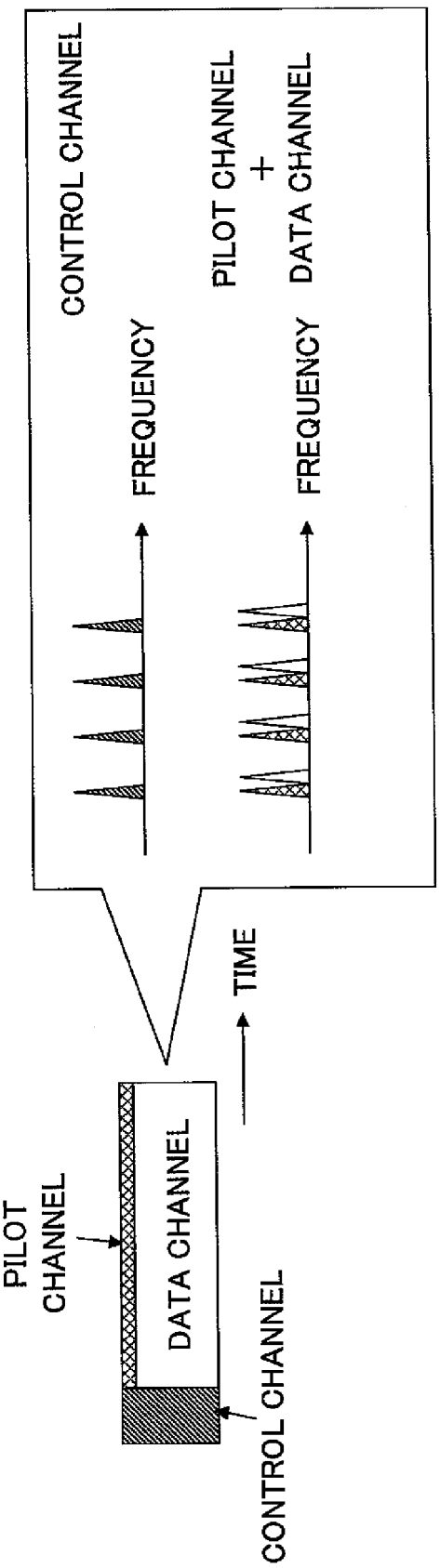
FIG. 12C is a schematic diagram showing multiplexing of a pilot channel, a control channel and a data channel.

As shown in FIG. 12C, when chip repetition is performed for the pilot channel and the control channel, a comb-shaped frequency spectrum is formed for the control channel, and comb-shaped frequency spectrums in which sub-carrier sets different with each other are assigned are formed for the pilot channel and the data channel.

Accordingly, by using time-multiplexing, since time-multiplexed channels become completely orthogonal to each other, influence of interference between channels can be decreased.

Figure 13:
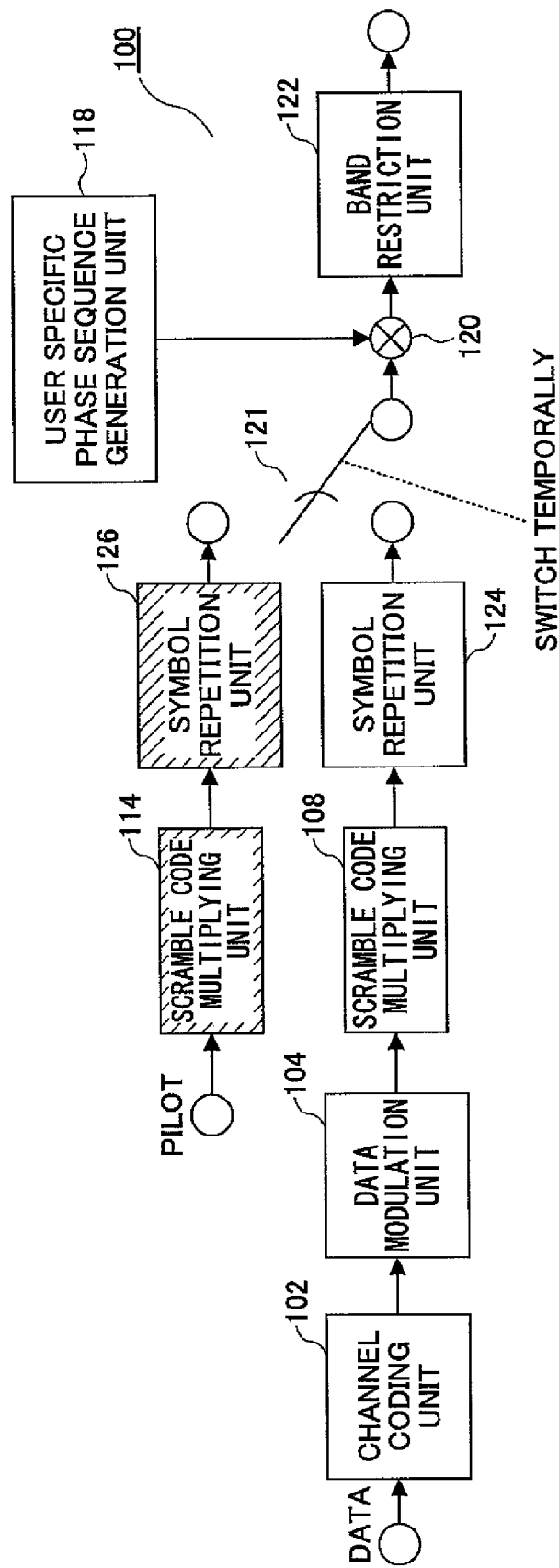
FIG. 13 is a block diagram showing a configuration of a transmitter according to an embodiment of the present invention.

Next, a transmitter of a second embodiment of the present invention is described with reference to FIG. 13.

The transmitter 100 in the present embodiment time-multiplexes a pilot channel to which symbol repetition is applied in the IFDMA using symbol repetition.

The transmitter 100 includes a channel coding unit 102 to which a data symbol sequence is supplied, a data modulation unit 104 connected to the channel coding unit 102, a scramble code multiplying unit 108 connected to the data modulation unit 104, a symbol repetition unit 124 connected to the scramble code multiplying unit 108, a scramble code multiplying unit 114 to which pilot symbol sequence forming a reference signal that is, for example, a pilot signal or a pilot channel is supplied, a symbol repetition unit 126 as a symbol pattern generation means connected to the scramble code multiplying unit 114, a multiplying unit 120 switchably connected to the symbol repetition unit 124 or the symbol repetition unit 126 by a switch 121 as a switch means, and a user specific phase sequence generation unit 118 and a band restriction unit 122 each connected to the multiplying unit 120.

Channel coding is performed in the channel coding unit 102 on the data symbol sequence for which error correction code such as turbo code and convolution code are applied, so that it is supplied to the data modulation unit 104. In the data modulation unit 104, modulation processing is performed on the channel coded data and it is supplied to the scramble code multiplying unit 108.

In the scramble code multiplying unit 108, the modulated data are multiplied by scramble code so that a symbol sequence is generated and it is supplied to the symbol repetition unit 124. In the symbol repetition unit 124, symbol repetition is performed every predetermined symbols on the symbol sequence which is multiplied by the scramble code, so that a symbol pattern is generated and it is supplied to the multiplying unit 120. In the multiplying unit 120, the symbol pattern is multiplied by a user specific phase vector that is supplied by the user specific phase series generation unit 118, and it is supplied to the band restriction unit 122. In the band restriction unit 122, band restriction is performed on the symbol pattern multiplied by the phase.

On the other hand, the pilot symbol sequence that forms a reference signal that is a pilot signal or a pilot channel, for example, is multiplied by scramble code in the scramble code multiplying unit 114, so that a symbol sequence is generated and it is supplied to the symbol repetition unit 126.

In the symbol repetition unit 126, symbol repetition is performed every predetermined symbols on the symbol sequence, so that a symbol pattern is generated and it is supplied to the multiplying unit 120. In the multiplying unit 120, the symbol pattern is multiplied by a user specific phase vector that is supplied by the user specific phase series generation unit 118, and it is supplied to the band restriction unit 122. In the band restriction unit 122, band restriction is performed on the symbol pattern multiplied by the phase.

The switch 121 temporally switches between the symbol repetition unit 124 and the symbol repetition unit 126. By configuring in this way, since transmission of the pilot channel to which symbol repetition is applied is made independent from transmission of other channels with respect to time, influence of interference from other channel such as a data channel and a control channel to the pilot channel can be eliminated.

Figure 14A:
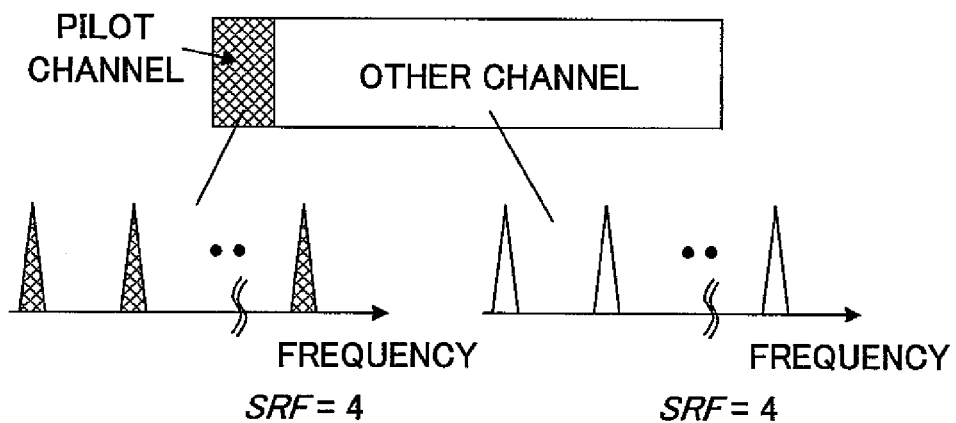
FIG. 14A is a schematic diagram showing application of chip repetition and spreading to a pilot channel.

Next, methods for applying symbol repetition to the pilot channel in the transmitter 100 in the present embodiment are described with reference to FIGS. 14A, 14B and 14C.

By changing symbol repetition factors, suppression effect for each interference can be changed.

First, a configuration in which symbol repetition factors are the same between the pilot channel and other channel is described with reference to FIG. 14A. In this case, the symbol repetition units 124 and 126 perform symbol repetition using the same symbol repetition factor.

For example, for a pilot channel, the symbol repetition unit 126 performs symbol repetition of a symbol repetition factor SRF=4 times. On the other hand, for the other channels, the symbol repetition unit 124 performs symbol repetition of a symbol repetition factor SRF=4 times. Accordingly, by using the same symbol repetition factor, since the pilot channel can be made orthogonal to signals of other users, interference received by a reference signal that is a pilot channel, for example, can be decreased. Accordingly, in the receiver, estimation can be performed with small influence of multiple access interference.

Next, a configuration in which a symbol repetition factor for the pilot channel is smaller than a symbol repetition factor for other channels is described with reference to FIG. 14B. In this case, the symbol repetition unit 126 performs symbol repetition using a factor smaller than a symbol repetition factor that is used in symbol repetition performed by the symbol repetition unit 124.

Figure 14B:
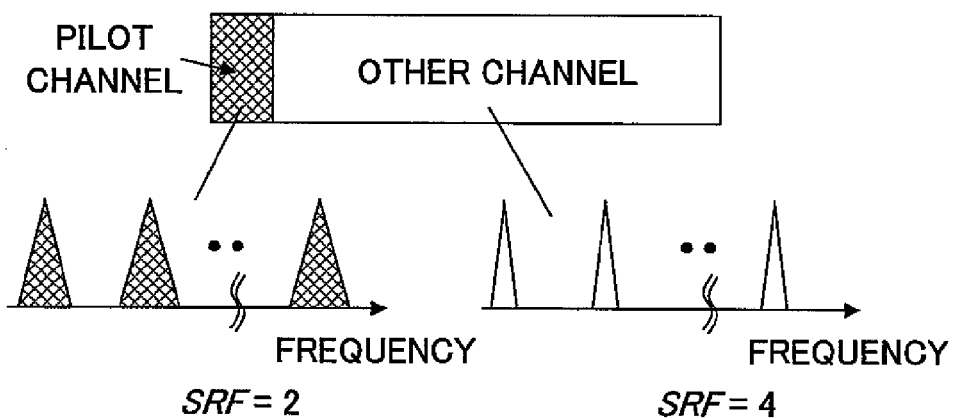
FIG. 14B is a schematic diagram showing application of chip repetition and spreading to a pilot channel.

For example, as shown in FIG. 14B, for a pilot channel, the symbol repetition unit 126 performs symbol repetition of a symbol repetition factor SRF=2 times. On the other hand, for the other channels, the symbol repetition unit 124 performs symbol repetition of a symbol repetition factor SF=4 times.

Accordingly, by using a symbol repetition factor, for a pilot channel, that is smaller than the symbol repetition factor of other channels, tolerance to multipath interference can be improved so that interference received by a reference signal that is a pilot channel, for example, can be decreased. Accordingly, estimation accuracy in the receiver can be improved.

Although a case where the symbol repetition factor of the pilot channel is 2 is described in this example, only spreading may be performed without applying symbol repetition.

Next, a configuration in which a symbol repetition factor for the pilot channel is greater than a symbol repetition factor of other channels is described with reference to FIG. 14C. In this case, the symbol repetition unit 126 performs symbol repetition using a factor greater than a symbol repetition factor that is used in symbol repetition performed by the symbol repetition unit 124.

Figure 14C:
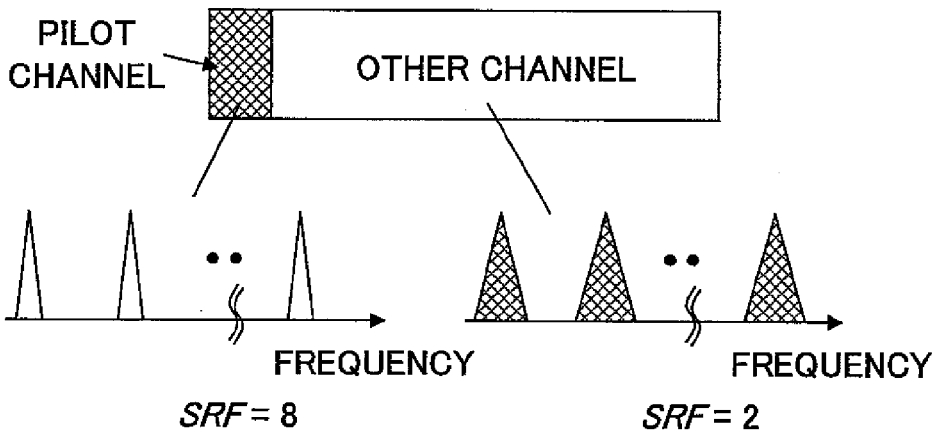
FIG. 14C is a schematic diagram showing application of chip repetition and spreading to a pilot channel.

For example, as shown in FIG. 14C, for a pilot channel, the symbol repetition unit 126 performs symbol repetition of a symbol repetition factor SF=8 times. On the other hand, for the other channels, the symbol repetition unit 124 performs symbol repetition of a symbol repetition factor SRF=2 times. Accordingly, by using a symbol repetition factor, for a pilot channel, that is greater than the symbol repetition factor of other channels, more pilot channels can be multiplexed.

By changing the symbol repetition factor in this way, suppression effect for each interference can be changed. That is, the symbol repetition unit 126 changes suppression effect for each interference by changing the symbol repetition factor. In other words, the symbol repetition unit 126 changes the value of the symbol repetition factor according to desired suppression effect for each interference.

Next, in a case when the above-mentioned "other channel" is formed by "control channel" or "data channel", multiplexing of the channel and the "pilot channel" is described.

First, cases are described with reference to FIGS. 15A-15E in which, to a data channel to which symbol repetition is applied, a pilot channel is time-multiplexed and a control channel is time-multiplexed.

Figure 15A:
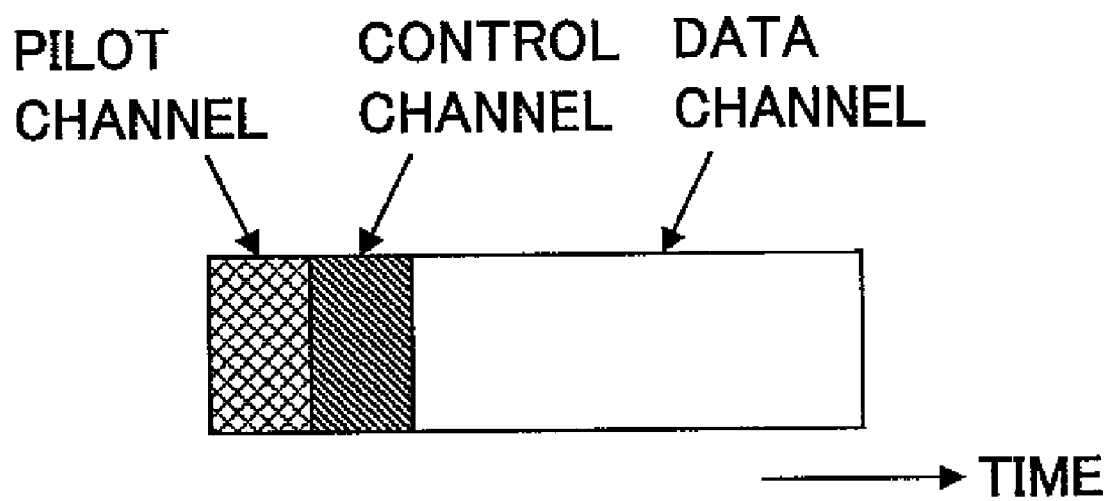
FIG. 15A is a schematic diagram showing multiplexing of a pilot channel, a control channel and a data channel.

As shown in FIG. 15A, in this case, the pilot channel and the control channel are time-multiplexed. Further, as to this multiplexing method, there are four types of multiplexing methods according to whether symbol repetition is performed. In the following, these four types of multiplexing methods are described.

Figure 15B:
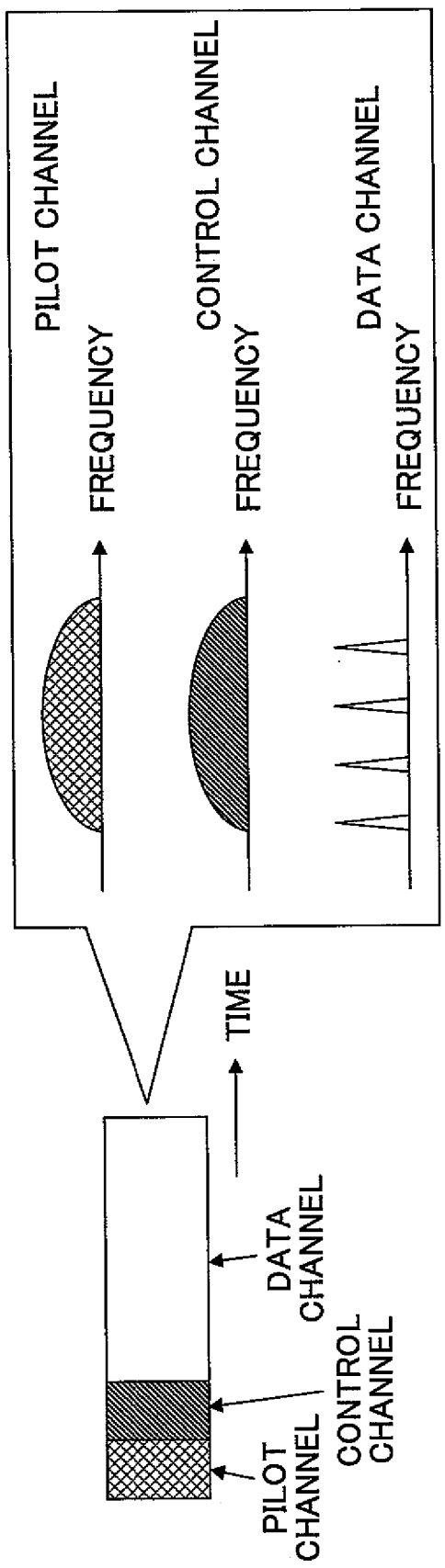
FIG. 15B is a schematic diagram showing multiplexing of a pilot channel, a control channel and a data channel.

As shown in FIG. 15B, when symbol repetition is not performed for either of the pilot channel or the control channel, a frequency spectrum indicating a symbol sequence after scramble code multiplication is formed for each of the pilot channel and the control channel, and a comb-shaped frequency spectrum is formed for the data channel.

Figure 15C:
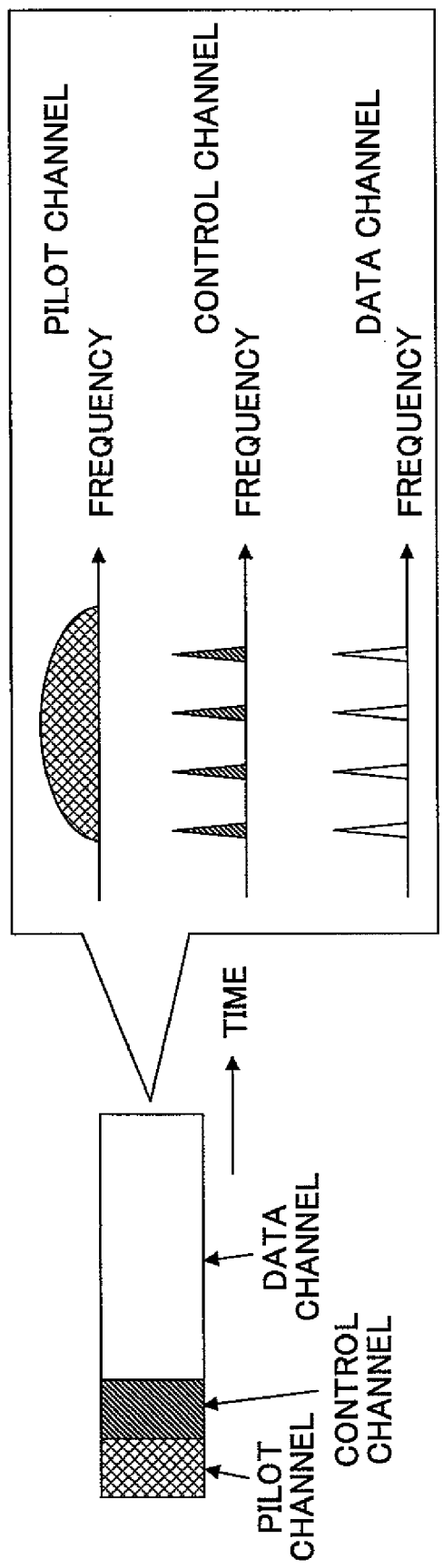
FIG. 15C is a schematic diagram showing multiplexing of a pilot channel, a control channel and a data channel.

When symbol repetition is not performed for the pilot channel and symbol repetition is performed for the control channel, as shown in FIG. 15C, a frequency spectrum indicating a symbol sequence after scramble code multiplication is formed for the pilot channel, and a comb-shaped frequency spectrum is formed for each of the control channel and the data channel.

As shown in FIG. 15D, when symbol repetition is performed for the pilot channel and symbol repetition is not performed for the control channel, a frequency spectrum indicating a symbol sequence after scramble code multiplication is formed for the control channel, and a comb-shaped frequency spectrum is formed for each of the pilot channel and the data channel.

As shown in FIG. 15E, when symbol repetition is performed for the pilot channel and the control channel, a comb-shaped frequency spectrum is formed for each of the pilot channel, the control channel and the data channel.

Next, cases are described with reference to FIGS. 16A-16C in which, to a data channel to which symbol repetition is applied, a pilot channel is time-multiplexed and a control channel is frequency-multiplexed, that is, a sub-carrier different from the data channel is assigned.

Figure 16A:
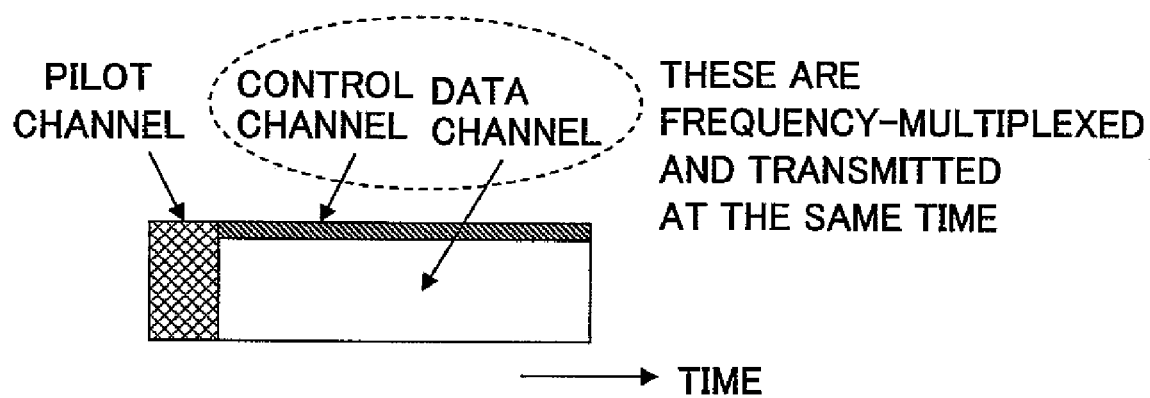
FIG. 16A is a schematic diagram showing multiplexing of a pilot channel, a control channel and a data channel.

In this case, as shown in FIG. 16A, the pilot channel and the control channel are time-multiplexed. The control channel and the data channel are frequency-multiplexed so as to be transmitted at the same time. In addition, as to this multiplexing method, there are two types of multiplexing methods according to whether symbol repetition is performed. In the following, these two types of multiplexing methods are described.

Figure 16B:
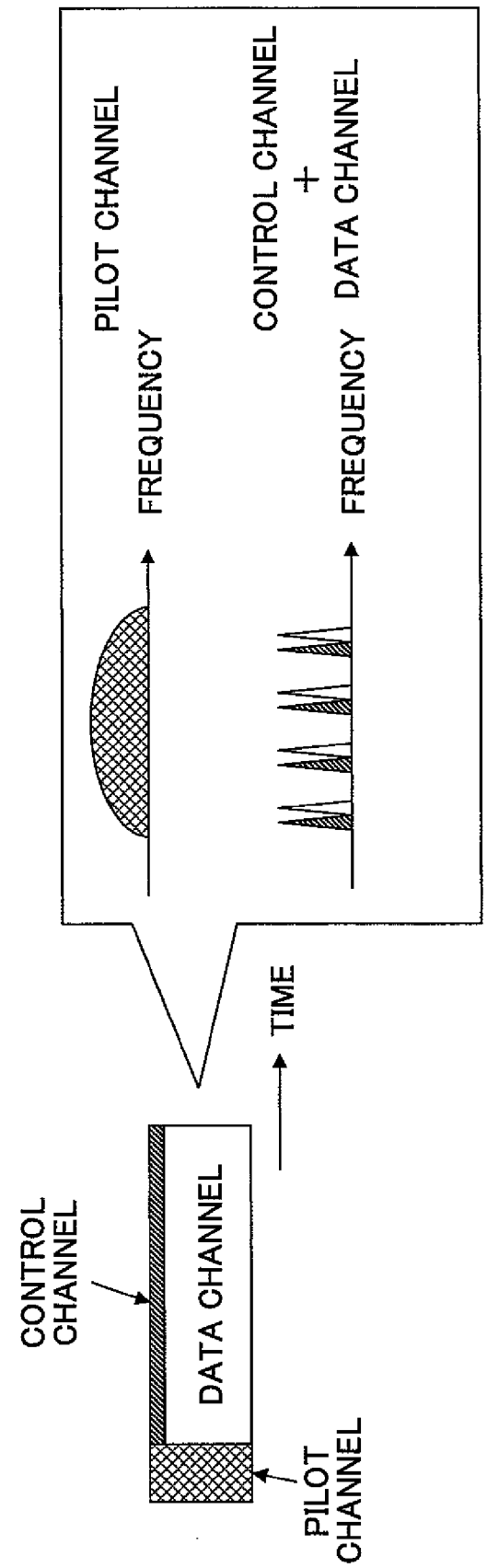
FIG. 16B is a schematic diagram showing multiplexing of a pilot channel, a control channel and a data channel.

As shown in FIG. 16B, when symbol repetition is not performed for the pilot channel and symbol repetition is performed for the control channel, a frequency spectrum indicating a symbol sequence after scramble code multiplication is formed for the pilot channel, and comb-shaped frequency spectrums in which sub-carrier sets different with each other are assigned are formed for the control channel and the data channel.

Figure 16C:
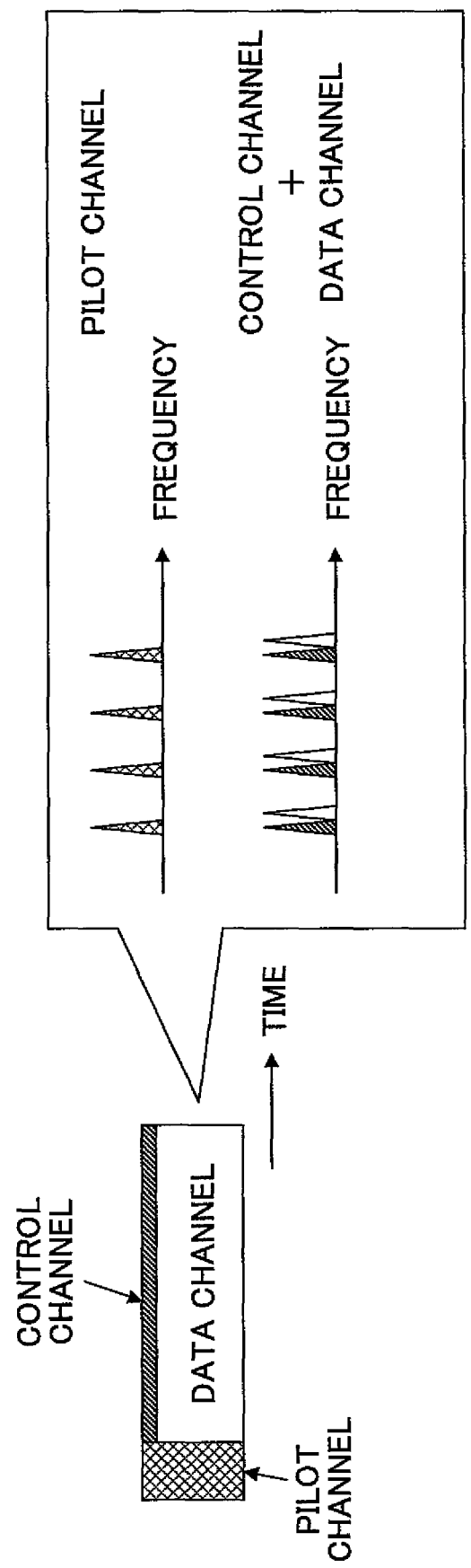
FIG. 16C is a schematic diagram showing multiplexing of a pilot channel, a control channel and a data channel.

As shown in FIG. 16C, when symbol repetition is performed for the pilot channel and the control channel, a comb-shaped frequency spectrum is formed for the pilot channel, and comb-shaped frequency spectrums in which sub-carrier sets different with each other are assigned are formed for the control channel and the data channel.

Next, cases in which the pilot channel is time-multiplexed and the control channel is time-multiplexed, to the data channel to which symbol repetition is applied are described with reference to FIGS. 17A and 17B.

Figure 17A:
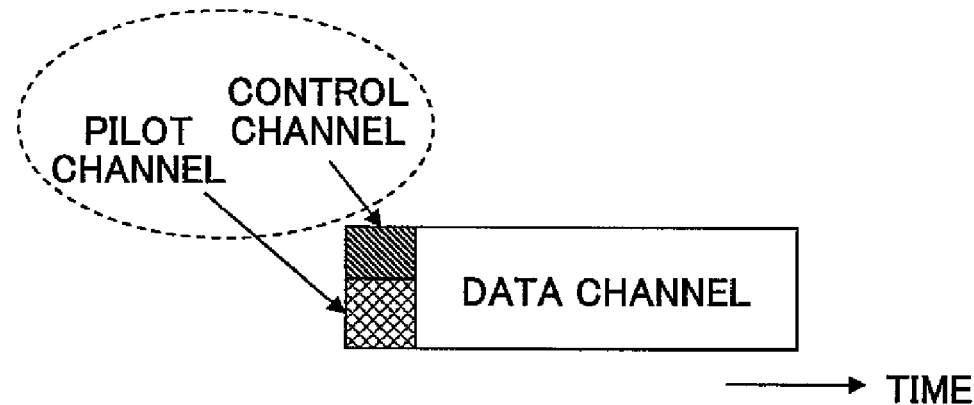
FIG. 17A is a schematic diagram showing multiplexing of a pilot channel, a control channel and a data channel.

As shown in FIG. 17A, in this case, the pilot channel and the control channel are frequency-multiplexed.

Figure 17B:
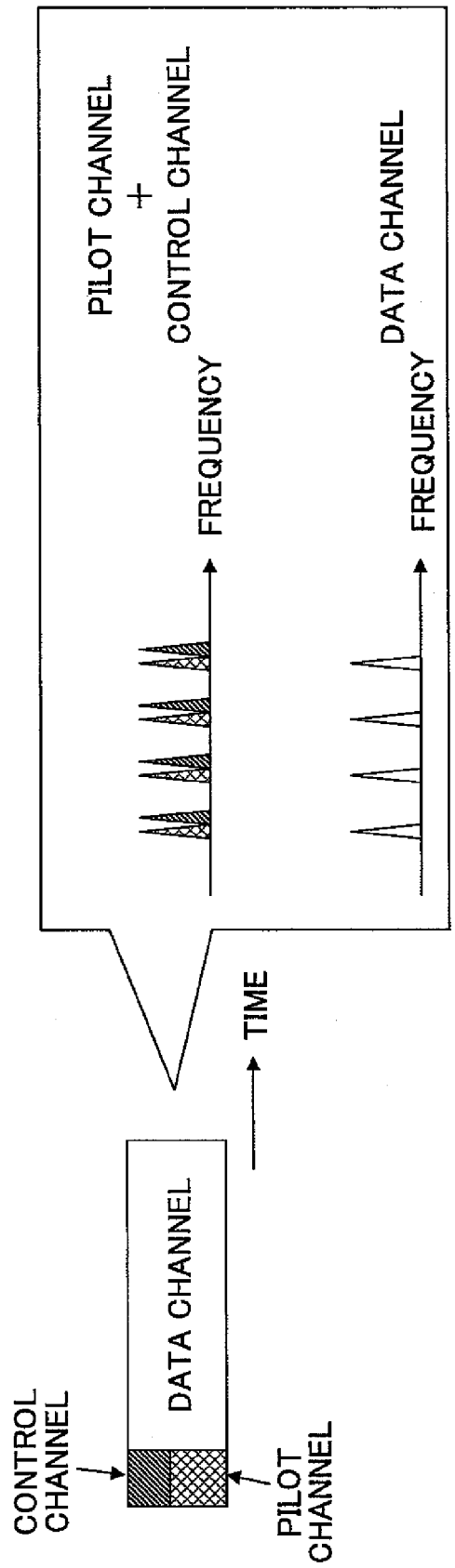
FIG. 17B is a schematic diagram showing multiplexing of a pilot channel, a control channel and a data channel.

In this multiplexing method, because of symbol repetition, as shown in FIG. 17B, comb-shaped frequency spectrums in which sub-carrier sets different with each other are assigned are formed for the pilot channel and the control channel, and a comb-shaped frequency spectrum is formed for the data channel.

Next, cases are described with reference to FIGS. 18A-18C in which, to the data channel to which symbol repetition is applied, the pilot channel is frequency-multiplexed, that is, a sub-carrier different from the data channel is assigned, and the control channel is time-multiplexed.

Figure 18A:
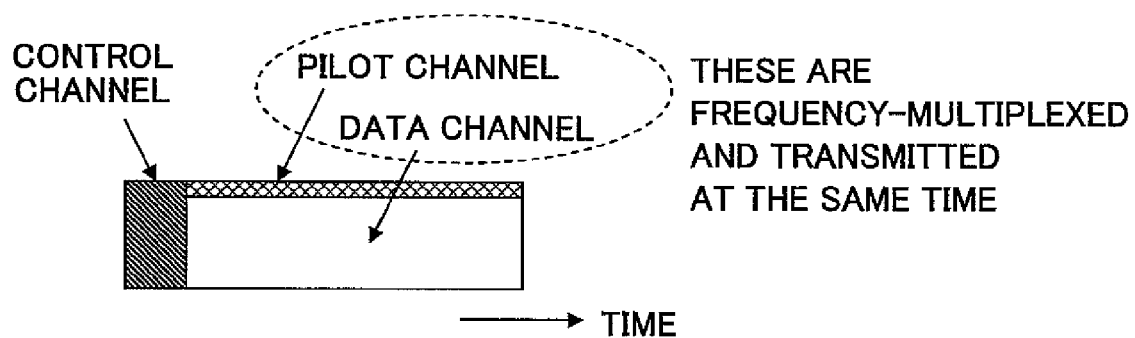
FIG. 18A is a schematic diagram showing multiplexing of a pilot channel, a control channel and a data channel.

As shown in FIG. 18A, in this case, the pilot channel and the control channel are time-multiplexed. The pilot channel and the data channel are frequency-multiplexed and are transmitted at the same time. In addition, as to this multiplexing method, there are two types of multiplexing methods according to whether symbol repetition is performed. In the following, these two types of multiplexing methods are described.

Figure 18B:
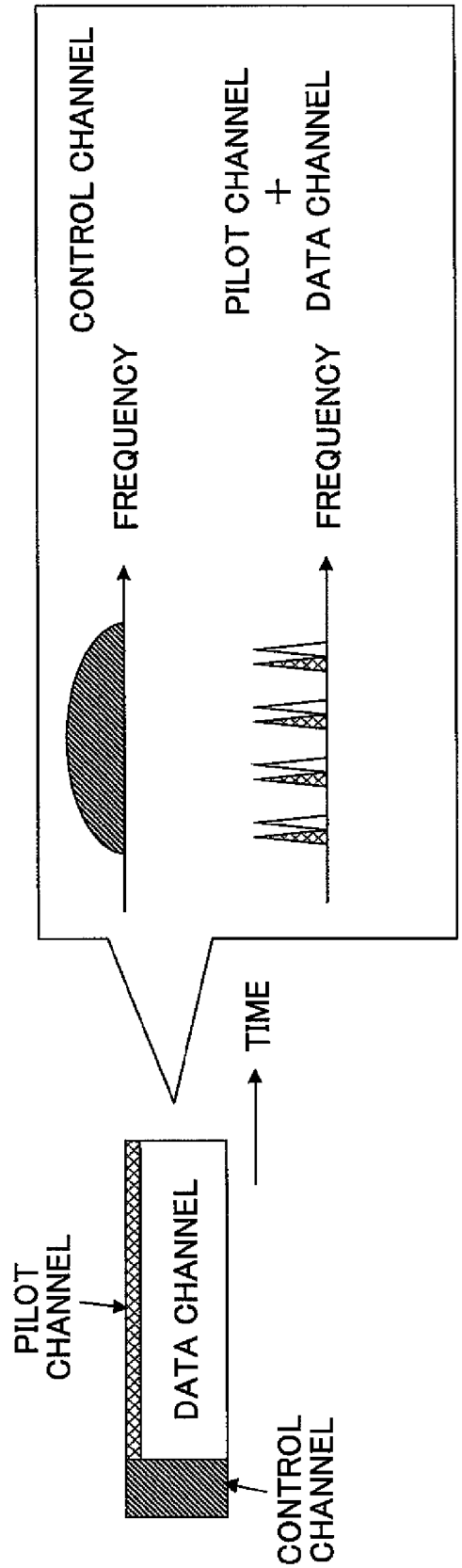
FIG. 18B is a schematic diagram showing multiplexing of a pilot channel, a control channel and a data channel.

As shown in FIG. 18B, when symbol repetition is performed for the pilot channel and symbol repetition is not performed for the control channel, a frequency spectrum indicating a symbol sequence after scramble code multiplication is formed for the control channel, and comb-shaped frequency spectrums in which sub-carrier sets different with each other are assigned are formed for the pilot channel and the data channel.

Figure 18C:
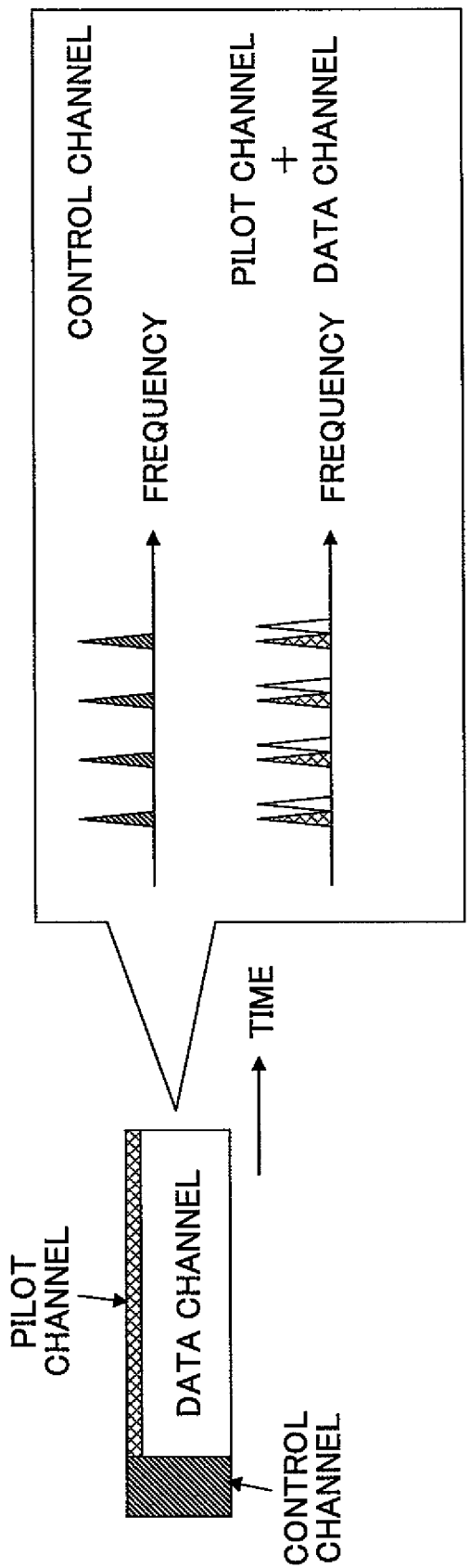
FIG. 18C is a schematic diagram showing multiplexing of a pilot channel, a control channel and a data channel.

As shown in FIG. 18C, when symbol repetition is performed for the pilot channel and the control channel, a comb-shaped frequency spectrum is formed for the control channel, and comb-shaped frequency spectrums in which sub-carrier sets different with each other are assigned are formed for the pilot channel and the data channel.

Accordingly, by using time-multiplexing, since time-multiplexed channels become completely orthogonal to each other, influence of interference between channels can be decreased.

Figure 19:
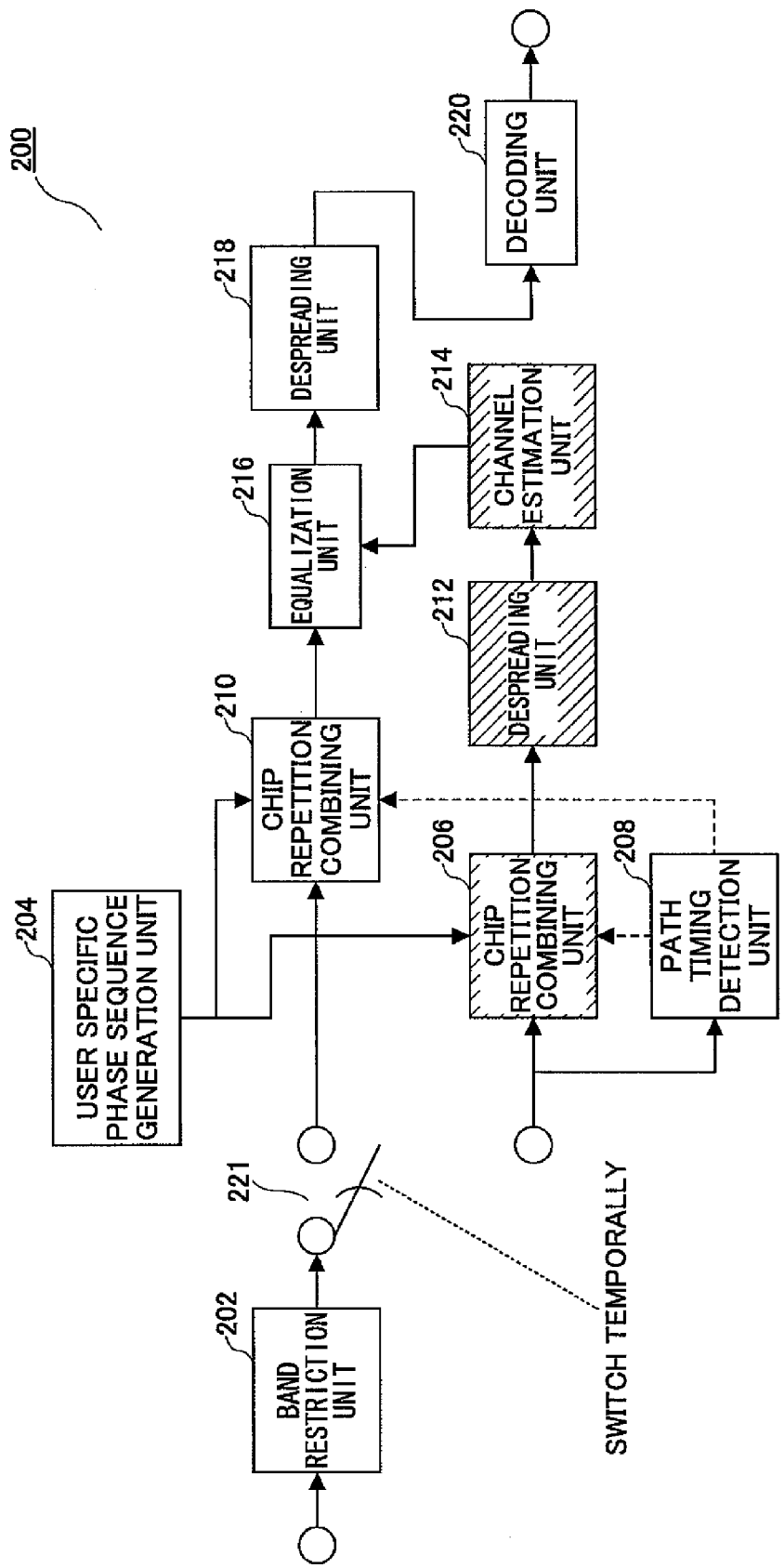
FIG. 19 is a block diagram showing a configuration of a receiver according to an embodiment of the present invention.

Next, a receiver of a third embodiment of the present invention is described with reference to FIG. 19.

The receiver 200 of the present embodiment receives a pilot channel, to which chip repetition is applied, that is time-multiplexed and transmitted in the VSCRF-CDMA using spreading and chip repetition.

The receiver includes a band restriction unit 202, a chip repetition combining unit 206, despreading unit 212 connected to the chip repetition combining unit 206, a channel estimation unit 214 connected to the despreading unit 212, a chip repetition combining unit 210, an equalization unit 216 connected to the chip repetition combining unit 210, a despreading unit 218 connected to the equalization unit 216, a decoding unit 220 connected to the despreading unit 218, a user specific phase sequence generation unit 204 connected to the chip repetition combining unit 206 and the chip repetition combining unit 210, a path timing detection unit 208, and a switch unit 221 as a switching means. The switch unit 221 is connected to the band restriction unit 202, and temporally switches between the chip repetition combining unit 206 and the path timing detection unit 208, and the chip repetition combining unit 210. The path timing detection unit 208 supplies detected path timing to the chip repetition combining unit 206 and the chip repetition combining unit 210.

A received signal multiplied by a carrier frequency and converted to a digital baseband signal is multiplied by a corresponding sub-carrier frequency in the band restriction unit 202 so that band restriction is performed, and the received signal is supplied to the chip repetition combining unit 206 and the path timing detection unit 208 or the path repetition combining unit 210.

In the chip repetition combining unit 206, the received signal to which band restriction is provided is multiplied by a user specific phase vector supplied from the user specific phase sequence generation unit 204 so that the phase of the signal multiplied in the transmitter is restored to an original phase and a signal having a chip pattern is generated. After that, a spread chip sequence is generated by recombining signals on which chip repetition is performed using a chip repetition number the same as that of the transmitter, and the spread chip sequence is supplied to the despreading unit 212.

The despreading unit 212 multiplies the chip sequence by spread code of a spreading factor the same as that of the transmitter to convert the received signal back to the pilot symbol sequence before spreading, and it is supplied to the channel estimation unit 214. In the channel estimation unit 214, channel estimation is performed based on the supplied signal, and the result is supplied to the equalization unit 216. For example, the channel estimation unit 214 estimates variation of amplitude and phase due to fading variation in the radio propagation path to realize synchronous detection modulation, and estimates link status of the radio propagation path such as SINR (Signal-to-Interference plus noise power ratio), a number of paths, delay spread, Doppler frequency and the like.

On the other hand, the chip repetition combining unit 210 multiplies the received signal, to which band restriction is provided, by a user specific phase vector supplied from the user specific phase sequence generation unit 204 so that the phase of the signal multiplied in the transmitter is restored to an original phase and a signal having a chip pattern is generated. After that, a spread chip sequence is generated by recombining signals on which chip repetition is performed using a chip repetition number the same as that of the transmitter, and the chip sequence is supplied to the equalization unit 212.

The equalization unit 216 derives a weight coefficient for reducing multipath interference using a channel matrix representing a variation amount by which the received signal supplied from the channel estimation unit 214 is affected on the propagation path, and the received signal is multiplied by the weight coefficient (this operation is called chip equalization), and the result is supplied to the despreading unit 218. Accordingly, influence of multipath interference is decreased.

The despreading unit 218 multiplies the chip sequence by spread code of a spreading factor the same as that of the transmitter to convert the received signal back to modulation data before spreading, and it is supplied to the decoding unit 220.

The decoding unit 220 decodes the modulation data before spreading to restore data.

By configuring in the above-mentioned way, influence of interference to the pilot channel from other channels such as a data channel and a control channel, for example, can be eliminated, and the pilot channel and other channels, to which chip repetition is applied, that are temporally independently transmitted can be received. Therefore, estimation accuracy of variation of amplitude and phase due to fading variation on a radio propagation path, and estimation accuracy of link status of a radio propagation path such as signal-to-interference plus noise power ratio, a number of paths, delay spread, Doppler frequency and the like can be improved.

Figure 20:
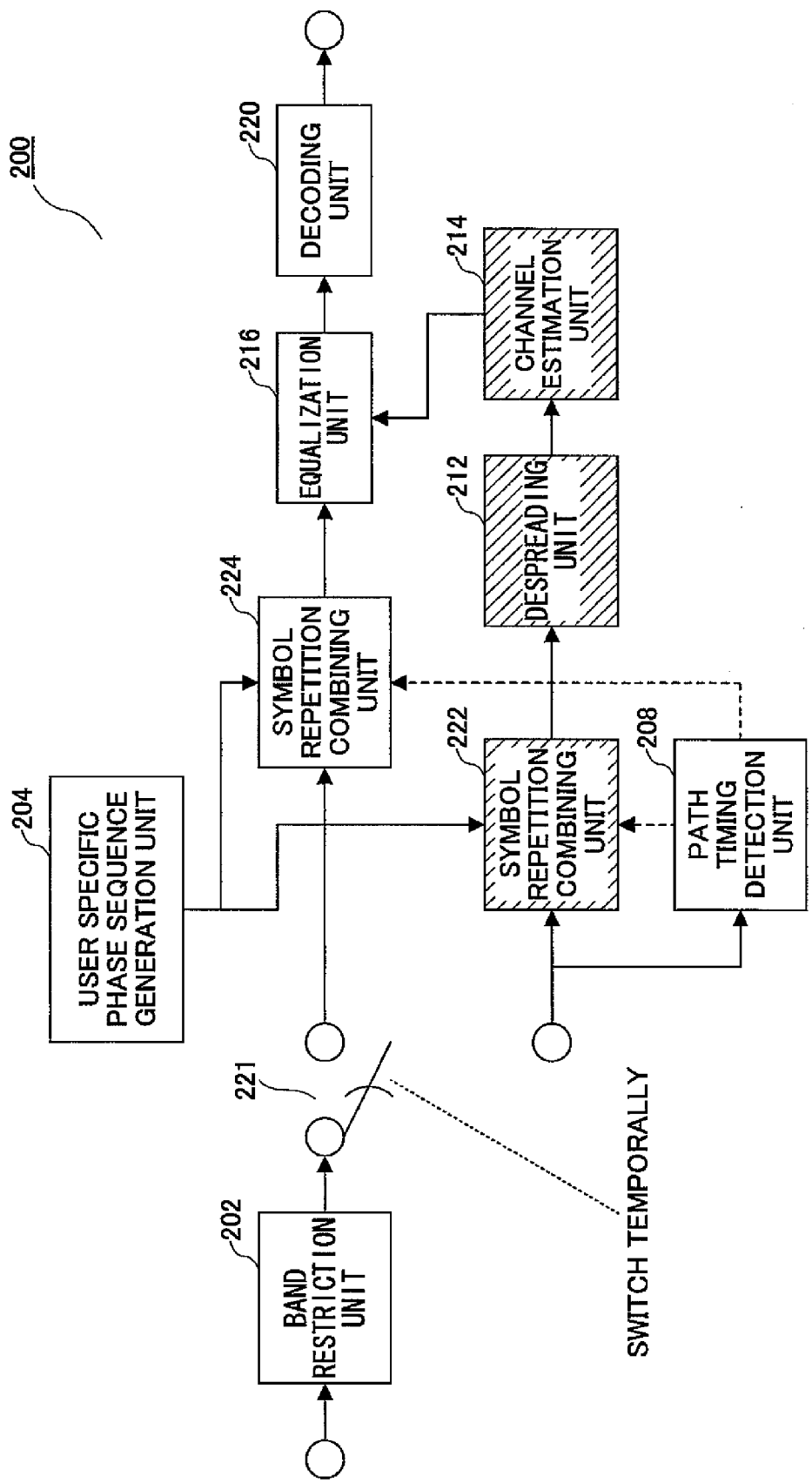
FIG. 20 is a block diagram showing a configuration of a receiver according to an embodiment of the present invention.

Next, a receiver of a fourth embodiment of the present invention is described with reference to FIG. 20.

The receiver 200 of the present embodiment receives a pilot channel, to which symbol repetition is applied, that is time-multiplexed and transmitted in the IFDMA using symbol repetition.

The receiver 200 includes a band restriction unit 202, a symbol repetition combining unit 222, a despreading unit 212 connected to the symbol repetition combining unit 222, a channel estimation unit 214 connected to the despreading unit 212, a symbol repetition combining unit 224, an equalization unit 216 connected to the symbol repetition combining unit 224, a decoding unit 220 connected to the equalization unit 216, a user specific phase sequence generation unit 204 connected to the symbol repetition combining unit 222 and the symbol repetition combining unit 224, a path timing detection unit 208, and a switch 221 as a switching means.

The switch 221 is connected to the band restriction unit 202, and temporally switches between the symbol repetition combining unit 222 and the path timing detection unit 208, and the symbol repetition combining unit 224. The path timing detection unit 208 supplies detected path timing to the symbol repetition combining unit 222 and the symbol repetition combining unit 224.

A received signal multiplied by a carrier frequency and converted to a digital baseband signal is multiplied by a corresponding sub-carrier frequency in the band restriction unit 202 so that band restriction is performed, and the received signal is supplied to the symbol repetition combining unit 222 and the path timing detection unit 208 or the symbol repetition combining unit 224.

In the symbol repetition combining unit 222, the received signal to which band restriction is provided is multiplied by a user specific phase vector supplied from the user specific phase sequence generation unit 204 so that the phase of the signal multiplied in the transmitter is restored to an original phase and a signal having a symbol pattern is generated. After that, a symbol sequence is generated by recombining signals on which symbol repetition is performed using a symbol repetition number the same as that of the transmitter, and the symbol sequence is supplied to the despreading unit 212.

The despreading unit 212 performs reverse scrambling process on the symbol sequence to convert the received signal back to the pilot symbol sequence before scramble code multiplication, and it is supplied to the channel estimation unit 214. In the channel estimation unit 214, channel estimation is performed based on the supplied signal, and the result is supplied to the equalization unit 216.

For example, the channel estimation unit 214 estimates variation of amplitude and phase due to fading variation in the radio propagation path to realize synchronous detection modulation, and estimates link status of the radio propagation path such as SINR (Signal-to-Interference plus noise power ratio), a number of paths, delay spread, Doppler frequency and the like.

On the other hand, the symbol repetition combining unit 224 multiplies the received signal to which band restriction is provided by a user specific phase vector supplied from the user specific phase sequence generation unit 204 so that the phase of the signal multiplied in the transmitter is restored to an original phase and a signal having a symbol pattern is generated. After that, a symbol sequence to which scramble code is multiplied is generated by recombining signals on which symbol repetition is performed using a symbol repetition number the same as that of the transmitter, and the symbol sequence is supplied to the equalization unit 216.

The equalization unit 216 derives a weight coefficient for reducing multipath interference using a channel matrix representing a variation amount by which the received signal supplied from the channel estimation unit 214 is affected on the propagation path, and the received signal is multiplied by the weight coefficient, reverse scramble process is performed, and the result is supplied to the decoding unit 220. Accordingly, influence of multipath interference is decreased.

The decoding unit 220 decodes the modulated data before scramble code multiplication to recover data.

By configuring in the above-mentioned way, influence of interference to the pilot channel from other channels such as a data channel and a control channel can be eliminated, and the pilot channel and other channel, on which chip repetition is applied, that are temporally independently transmitted can be received. Therefore, estimation accuracy of variation of amplitude and phase due to fading variation in a radio propagation path, and estimation accuracy of link status of the radio propagation path such as signal-to-interference plus noise power ratio, a number of paths, delay spread, Doppler frequency and the like can be improved.

Figure 21:
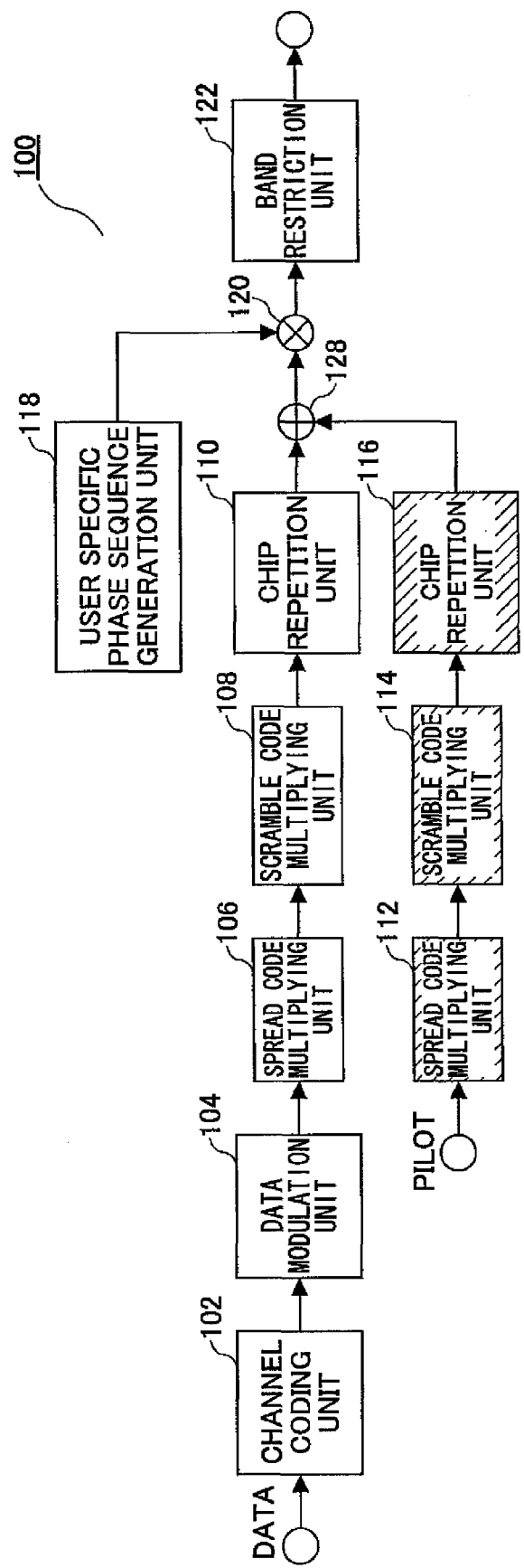
FIG. 21 is a block diagram showing a configuration of a transmitter according to an embodiment of the present invention.

A transmitter of a fifth embodiment of the present invention is described with reference to FIG. 21.

The transmitter 100 in the present embodiment code-multiplexes a pilot channel, to which chip repetition is applied, into other channel by assigning different orthogonal code to each channel in the VSCRF-CDMA using spreading and chip repetition.

The transmitter 100 includes a channel coding unit 102 to which a data symbol sequence is supplied, a data modulation unit 104 connected to the channel coding unit 102, a spread code multiplying unit 106 connected to the data modulation unit 104, a scramble code multiplying unit 108 connected to the spread code multiplying unit 106, a chip repetition unit 110 connected to the scramble code multiplying unit 108, a spread code multiplying unit 112 receiving a pilot symbol sequence forming a reference signal that is a pilot signal or a pilot channel, for example, a scramble code multiplying unit 114 connected to the spread code multiplying unit 112, a chip repetition unit 116 as a chip pattern generation means connected to the scramble code multiplying unit 114, an adding unit 128 connected to the chip repetition unit 110 and the chip repetition unit 116, a multiplying unit 120 connected to the adding unit 128, and a user specific phase sequence generation unit 118 and a band restriction unit 122 each connected to the multiplying unit 120.

Channel coding is performed in the channel coding unit 102 on the data symbol sequence in which error correction code such as turbo code and convolution code are applied, so that it is supplied to the data modulation unit 104. In the data modulation unit 104, modulation processing is performed on the channel coded data and it is supplied to the spread code multiplying unit 106. In the spread code multiplying unit 106, the modulated data is multiplied by spread code so that a spread chip sequence is generated and is supplied to the scramble code multiplying unit 108. In the scramble code multiplying unit 108, the spread chip sequence is multiplied by scramble code and is supplied to the chip repetition unit 110. In the chip repetition unit 110, chip repetition is performed every predetermined chips for the chip sequence multiplied by the scramble code, so that a chip pattern is generated and it is supplied to the adding unit 128.

On the other hand, the pilot symbol sequence that forms a reference signal that is a pilot signal or a pilot channel, for example, is multiplied by spread code in the spread code multiplying unit 112, so that a spread chip sequence is generated and it is supplied to the scramble code multiplying unit 114. In the scramble code multiplying unit 114, the spread chip sequence is multiplied by the scramble code and it is supplied to the chip repetition unit 116.

In the chip repetition unit 116, chip repetition is performed every predetermined chips for the chip sequence which has been multiplied by the scramble code, and the result is supplied to the adding unit 128.

The adding unit 128 adds a chip pattern of the data that is a chip pattern generated based on the symbol sequence after data modulation and a chip pattern of the reference signal that is a chip pattern generated based on the symbol sequence forming the reference signal, and the added result is supplied to the multiplying unit. In the multiplying unit 120, the chip pattern that is the sum of the chip pattern of the data and the chip pattern of the reference signal is multiplied by a user specific phase vector that is supplied by the user specific phase sequence generation unit 118, and it is supplied to the band restriction unit 122. In the band restriction unit 122, band restriction is performed on the chip pattern which has been multiplied by the phase.

By configuring in the above-mentioned way, the orthogonal code assigned to the pilot channel can be made to be different from orthogonal code assigned to other channels other than the pilot channel. In addition, since the reference signal can be spread over time and frequency, averaging effect for interference and noise can be increased.

Next, in a case when the above-mentioned "other channel" is formed by "control channel" or "data channel", multiplexing of the channel and the "pilot channel" is described.

First, cases in which a pilot channel is code-multiplexed and a control channel is frequency-multiplexed to a data channel to which chip repetition is applied are described with reference to FIGS. 22A-22C.

As shown in FIG. 22A, in this case, the pilot channel and the control channel are code-multiplexed, and are transmitted at the same time. Further, as to this multiplexing method, there are two types of multiplexing methods according to whether chip repetition is performed. In the following, these two types of multiplexing methods are described.

Figure 22B:
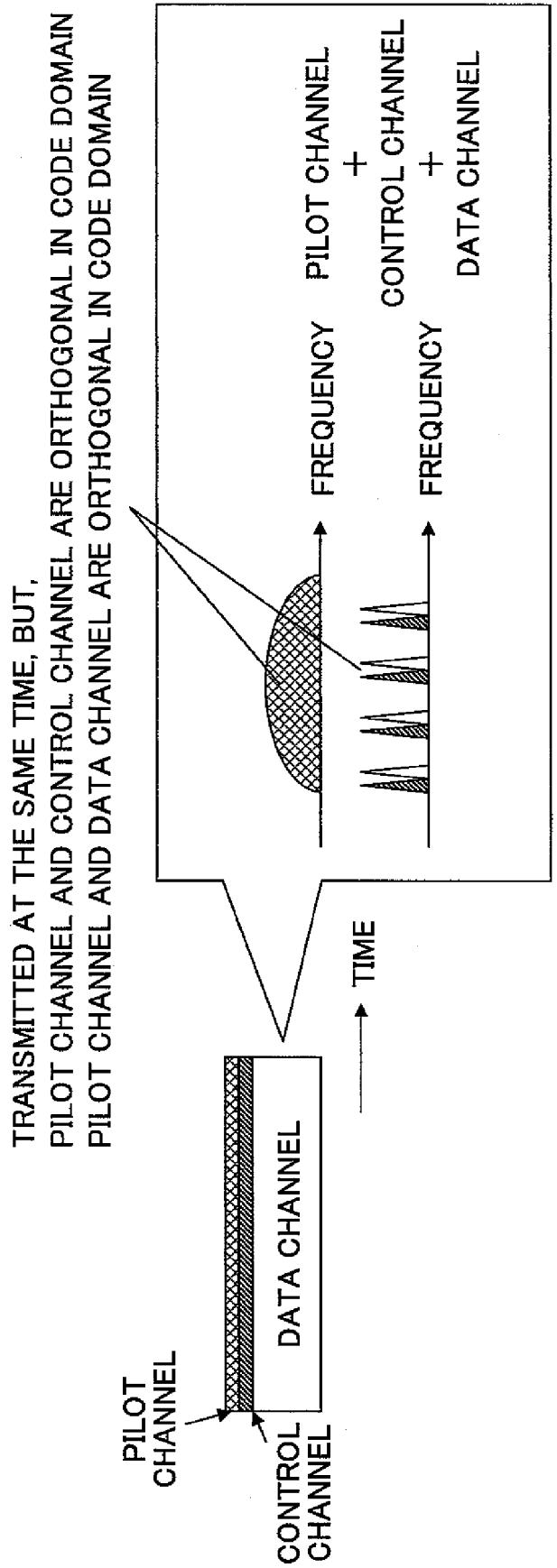
FIG. 22B is a schematic diagram showing multiplexing of a pilot channel, a control channel and a data channel.

As shown in FIG. 22B, when chip repetition is not performed for the pilot channel and the chip repetition is performed for the control channel, a frequency spectrum indicating a spread chip sequence is formed for the pilot channel, and comb-shaped frequency spectrums in which different sub-carrier sets are assigned are formed for the control channel and the data channel. In this case, the pilot channel, the control channel and the data channel are transmitted at the same time, but the pilot channel and the code channel are orthogonal in the code domain, and the pilot channel and the data channel are orthogonal in the code domain.

Figure 22C:
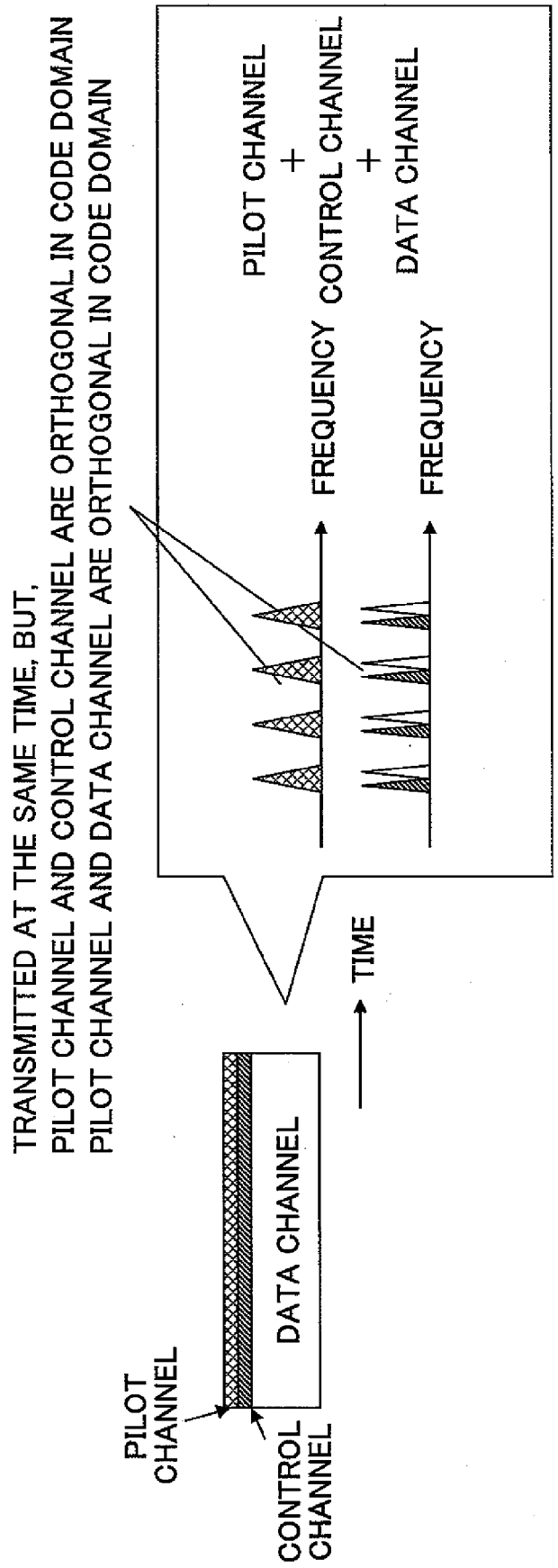
FIG. 22C is a schematic diagram showing multiplexing of a pilot channel, a control channel and a data channel.

When chip repetition is performed for the pilot channel and the control channel, as shown in FIG. 22C, a comb-shaped frequency spectrum is formed for the pilot channel, and comb-shaped frequency spectrums in which different sub-carrier sets are assigned are formed for the control channel and the data channel. In this case, the pilot channel, the control channel and the data channel are transmitted at the same time, but the pilot channel and the control channel are orthogonal in the code domain, and the pilot channel and the data channel are orthogonal in the code domain.

Next, cases in which a pilot channel is code-multiplexed and a control channel is code-multiplexed, to a data channel to which chip repetition is applied are described with reference to FIG. 23A and FIG. 23C.

As shown in FIG. 23A, in this case, the pilot channel and the control channel are code-multiplexed.

In this multiplexing method, because of chip repetition, as shown in FIG. 23B, a comb-shaped frequency spectrum is formed for each of the pilot channel, the control channel and the data channel. In this case, the pilot channel, the control channel and the data channel are transmitted at the same time, but the pilot channel, the control channel and the data channel are orthogonal with each other.

Accordingly, by using code multiplexing, since the reference signal is spread over time and frequency, averaging effect for interference and noise can be expected. In addition, a plurality of channels can be flexibly accommodated at the same time.

Figure 24:
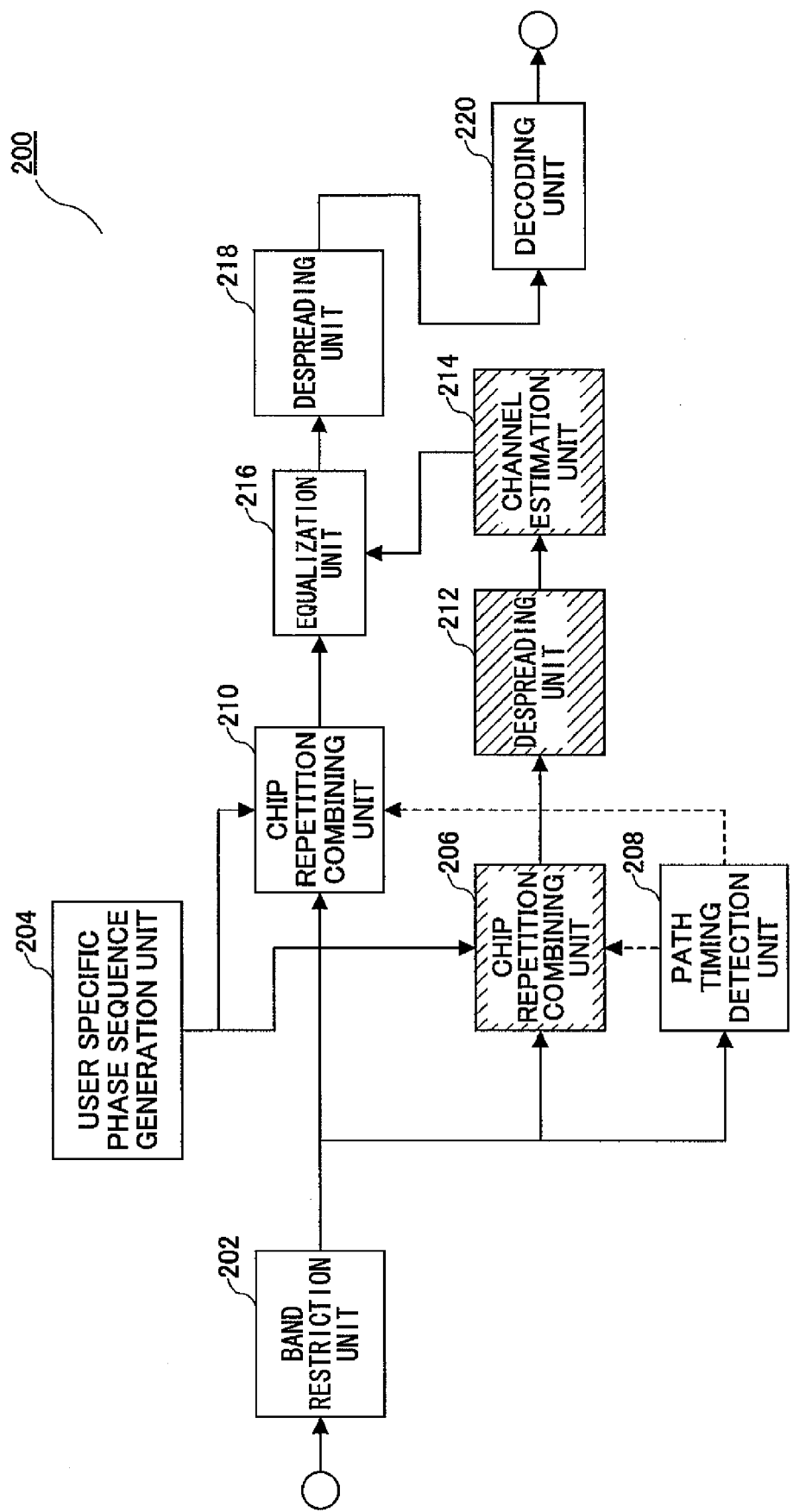
FIG. 24 is a block diagram showing a configuration of a receiver according to an embodiment of the present invention.

Next, a receiver of a sixth embodiment of the present invention is described with reference to FIG. 24.

The receiver 200 of the present embodiment receives a pilot channel, to which chip repetition is applied, that is code-multiplexed and transmitted in which different orthogonal code is assigned in the VSCRF-CDMA using spreading and chip repetition.

The receiver 200 includes a band restriction unit 202, a chip repetition combining unit 206 connected to the band restriction unit 202, a chip repetition combining unit 210 and a path timing detection unit 208, a despreading unit 212 connected to the chip repetition combining unit 206, a channel estimation unit 214 connected to the despreading unit 212, an equalization unit 216 connected to the chip repetition combining unit 210, a despreading unit 218 connected to the equalization unit 216, a decoding unit 220 connected to the despreading unit 218, a user specific phase sequence generation unit 204 connected to the chip repetition combining unit 206 and the chip repetition combining unit 210. The channel estimation unit 214 is connected to the equalization unit 216. The path timing detection unit 208 supplies detected path timing to the chip repetition combining unit 206 and the chip repetition combining unit 210.

A received signal multiplied by a carrier frequency and converted to a digital baseband signal is multiplied by a corresponding sub-carrier frequency in the band restriction unit 202 so that band restriction is performed, and it is supplied to the chip repetition combining unit 206, the path timing detection unit 208 and the path repetition combining unit 210.

In the chip repetition combining unit 206, the received signal to which band restriction is provided is multiplied by a user specific phase vector supplied from the user specific phase sequence generation unit 204 so that the phase of the signal multiplied in the transmitter is restored to an original phase and a signal having a chip pattern is generated. After that, a spread chip sequence is generated by recombining signals on which chip repetition is performed using a chip repetition number the same as that of the transmitter, and the chip sequence is supplied to the despreading unit 212.

The despreading unit 212 multiplies the chip sequence by spread code of a spreading factor the same as that of the transmitter to convert the received signal back to the pilot symbol sequence before spreading, and it is supplied to the channel estimation unit 214. In the channel estimation unit 214, channel estimation is performed based on the supplied signal, and the result is supplied to the equalization unit 216. For example, the channel estimation unit 214 estimates variation of amplitude and phase due to fading variation on the radio propagation path to realize synchronous detection modulation, and estimates link status of the radio propagation path such as SINR (Signal-to-Interference plus noise power ratio), a number of paths, delay spread, Doppler frequency and the like.

On the other hand, the chip repetition combining unit 210 multiplies the received signal to which band restriction is provided by a user specific phase vector supplied from the user specific phase sequence generation unit 204 so that the phase of the signal multiplied in the transmitter is restored to an original phase and a signal having a chip pattern is generated. After that, a spread chip sequence is generated by recombining signals on which chip repetition is performed using a chip repetition number the same as that of the transmitter, and the chip sequence is supplied to the equalization unit 216.

The equalization unit 216 derives a weight coefficient for reducing multipath interference using a channel matrix representing a variation amount by which the received signal supplied from the channel estimation unit 214 is affected on the propagation path, and the received signal is multiplied by the weight coefficient (this operation is called chip equalization), and the result is supplied to the despreading unit 218. Accordingly, influence of multipath interference is decreased.

The despreading unit 218 multiplies the chip sequence by spread code of a spreading factor the same as that of the transmitter to convert the received signal back to modulated data before spreading, and it is supplied to the decoding unit 220.

The decoding unit 220 decodes the modulated data before spreading to recover data.

By configuring in the above-mentioned way, A pilot channel, to which chip repetition is applied, that is code-multiplexed by being assigned orthogonal code different from that of other channels can be received. Therefore, estimation accuracy of variation of amplitude and phase due to fading variation in a radio propagation path, and estimation accuracy of link status of the radio propagation path such as signal-to-interference plus noise power ratio, a number of paths, delay spread, Doppler frequency and the like can be improved.

A transmitter of a seventh embodiment of the present invention is described with reference to FIG. 25.

The transmitter 100 in the present embodiment frequency-multiplexes a pilot channel to which chip repetition is applied in the VSCRF-CDMA using spreading and chip repetition.

The transmitter 100 includes a channel coding unit 102 to which a data symbol sequence is supplied, a data modulation unit 104 connected to the channel coding unit 102, a spread code multiplying unit 106 connected to the data modulation unit 104, a scramble code multiplying unit 108 connected to the spread code multiplying unit 106, a chip repetition unit 110 connected to the scramble code multiplying unit 108, a multiplying unit 120 connected to the chip repetition unit 110, a user specific phase sequence generation unit 116 and an adding unit 128 each connected to the multiplying unit 120, a spread code multiplying unit 112 receiving a pilot symbol sequence forming a reference signal such as a pilot signal and a pilot channel, a scramble code multiplying unit 114 connected to the spread code multiplying unit 112, a chip repetition unit 116 as a chip pattern generation means connected to the scramble code multiplying unit 114, a multiplying unit 132 connected to the chop repetition unit 116, a user specific phase sequence generation unit 130 connected to the multiplying unit 132, and a band restriction unit 122 connected to the adding unit 128. The multiplying unit 132 is connected to the adding unit 128.

Channel coding is performed in the channel coding unit 102 on the data symbol sequence in which error correction code such as turbo code and convolution code are applied, so that it is supplied to the data modulation unit 104. In the data modulation unit 104, modulation processing is performed on the channel coded data and it is supplied to the spread code multiplying unit 106. In the spread code multiplying unit 106, the modulated data is multiplied by spread code so that a spread chip sequence is generated and is supplied to the scramble code multiplying unit 108.

In the scramble code multiplying unit 108, the spread chip sequence is multiplied by scramble code and is supplied to the chip repetition unit 110. In the chip repetition unit 110, chip repetition is performed every predetermined chips for the chip sequence multiplied by the scramble coder and the result is supplied to the multiplying unit 120. In the multiplying unit 120, the supplied signal is multiplied by a user specific phase vector supplied from the user specific phase sequence generation unit 116, and the result is supplied to the adding unit 128.

On the other hand, the pilot symbol sequence that forms a reference signal that is a pilot signal or a pilot channel, for example, is multiplied by spread code in the spread code multiplying unit 112, so that a spread chip sequence is generated and it is supplied to the scramble code multiplying unit 114. In the scramble code multiplying unit 114, the spread chip sequence is multiplied by the scramble code and it is supplied to the chip repetition unit 116.

In the chip repetition unit 116, chip repetition is performed every predetermined chips for the chip sequence which has been multiplied by the scramble code, and the result is supplied to the multiplying unit 132.

In the multiplying unit 132, the chip pattern is multiplied by the user specific phase vector supplied from the user specific phase sequence generation unit 130, and the result is supplied to the adding unit 128.

The adding unit 128 adds a chip pattern of the data that is a chip pattern generated based on the symbol sequence after data modulation and a chip pattern of the reference signal multiplied by the phase that is a chip pattern generated based on the symbol sequence forming the reference signal, and the added result is supplied to the band restriction unit 122. In the band restriction unit 122, band restriction is performed on the chip pattern, of the data, which has been multiplied by the phase and the chip pattern, of the reference signal, which has been multiplied by the phase, that are added.

By configuring in the above-mentioned way, the pilot channel on which chip repetition is applied can be made to be independent from other channels with respect to frequency. Therefore, influence of interference to the pilot channel from other channel such as the data channel and the control channel, for example, can be eliminated.

Next, in a case when the above-mentioned "other channel" is formed by "control channel" or "data channel", multiplexing of the channel and the "pilot channel" is described.

First, cases in which a pilot channel is frequency-multiplexed and a control channel is code-multiplexed, to a data channel to which chip repetition is applied are described with reference to FIGS. 26A-26C.

Figure 26A:
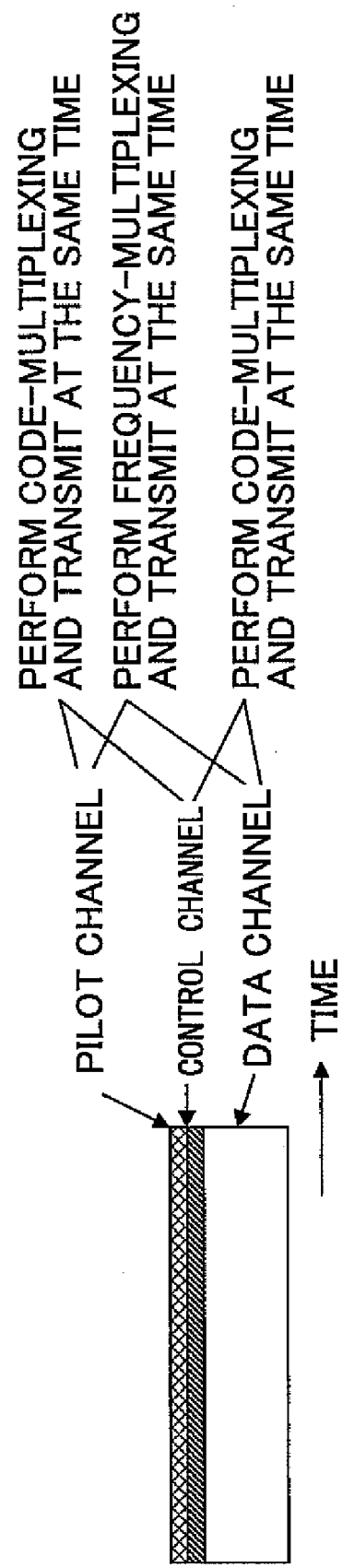
FIG. 26A is a schematic diagram showing multiplexing of a pilot channel, a control channel and a data channel.

As shown in FIG. 26A, in this case, the pilot channel and the control channel are code-multiplexed, and are transmitted at the same time. Further, as to this multiplexing method, there are two types of multiplexing methods according to whether chip repetition is performed. In the following, these two types of multiplexing methods are described.

Figure 26B:
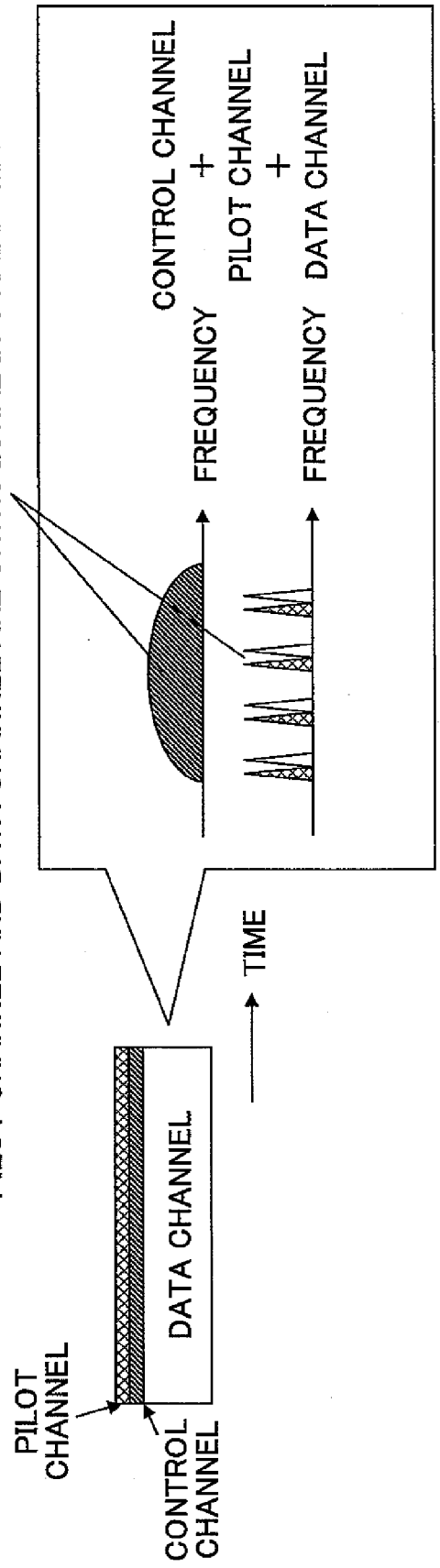
FIG. 26B is a schematic diagram showing multiplexing of a pilot channel, a control channel and a data channel.

As shown in FIG. 26B, when chip repetition is performed for the pilot channel and the chip repetition is not performed for the control channel, a frequency spectrum indicating a spread chip sequence is formed for the control channel, and comb-shaped frequency spectrums in which sub-carrier sets different with each other are assigned are formed for the pilot channel and the data channel. In this case, the control channel, the pilot channel, and the data channel are transmitted at the same time, but the pilot channel and the control channel are orthogonal in the code domain, and the pilot channel and the data channel are orthogonal in the code domain.

Figure 26C:
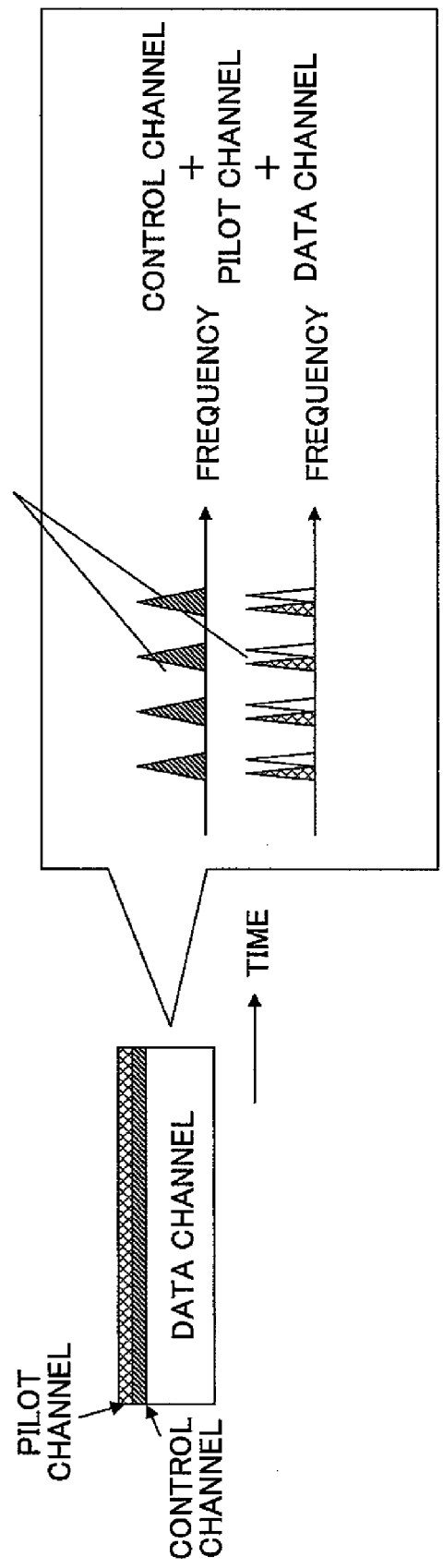
FIG. 26C is a schematic diagram showing multiplexing of a pilot channel, a control channel and a data channel.

When chip repetition is performed for the pilot channel and the control channel, as shown in FIG. 26C, a comb-shaped frequency spectrum is formed for the control channel, and comb-shaped frequency spectrums in which sub-carrier sets different with each other are assigned are formed for the pilot channel and the data channel. In this case, the control channel, the pilot channel, and the data channel are transmitted at the same time, but the pilot channel and the control channel are orthogonal in the code domain, and the pilot channel and the data channel are orthogonal in the code domain.

Next, cases in which a pilot channel is frequency-multiplexed and a control channel is frequency-multiplexed, to a data channel to which chip repetition is applied are described with reference to FIG. 27A and FIG. 27C.

Figure 27A:
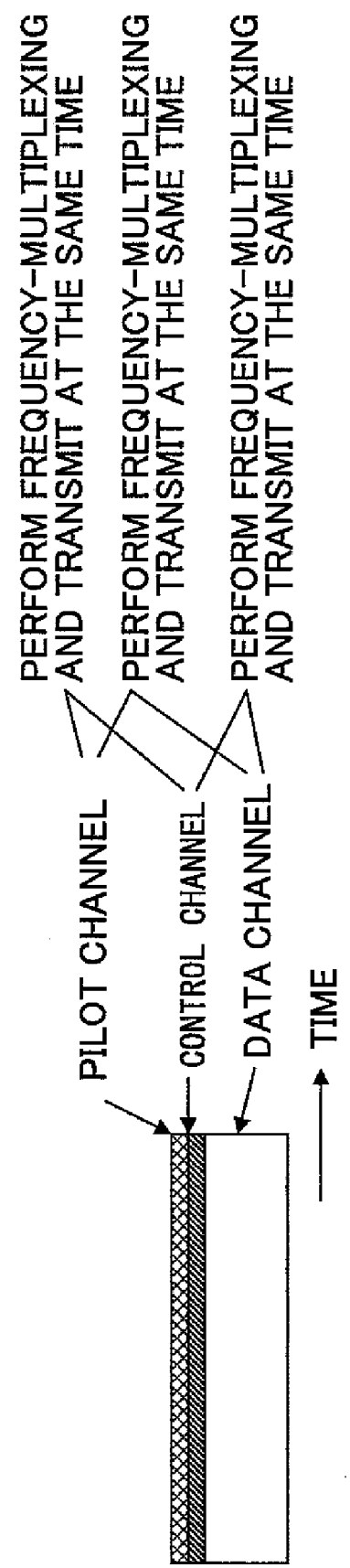
FIG. 27A is a schematic diagram showing multiplexing of a pilot channel, a control channel and a data channel.

As shown in FIG. 27A, in this case, the pilot channel and the control channel are frequency-multiplexed, and are transmitted at the same time.

Figure 27B:
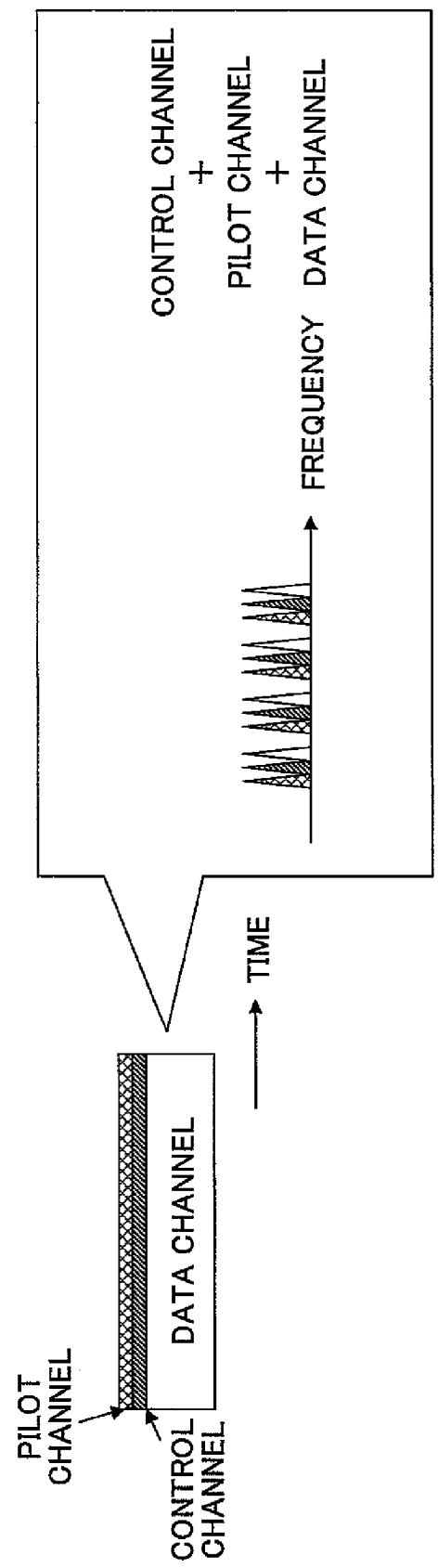
FIG. 27B is a schematic diagram showing multiplexing of a pilot channel, a control channel and a data channel.

In this multiplexing method, because of chip repetition, as shown in FIG. 27B, a comb-shaped frequency spectrum is formed for each of the pilot channel, the control channel and the data channel in which sub-carrier sets different with each other are assigned.

Accordingly, by using frequency multiplexing, since frequency-multiplexed channels are orthogonal with each other, influence of interference among channels can be decreased. In addition, a plurality of channels can be flexibly accommodated at the same time.

Figure 28:
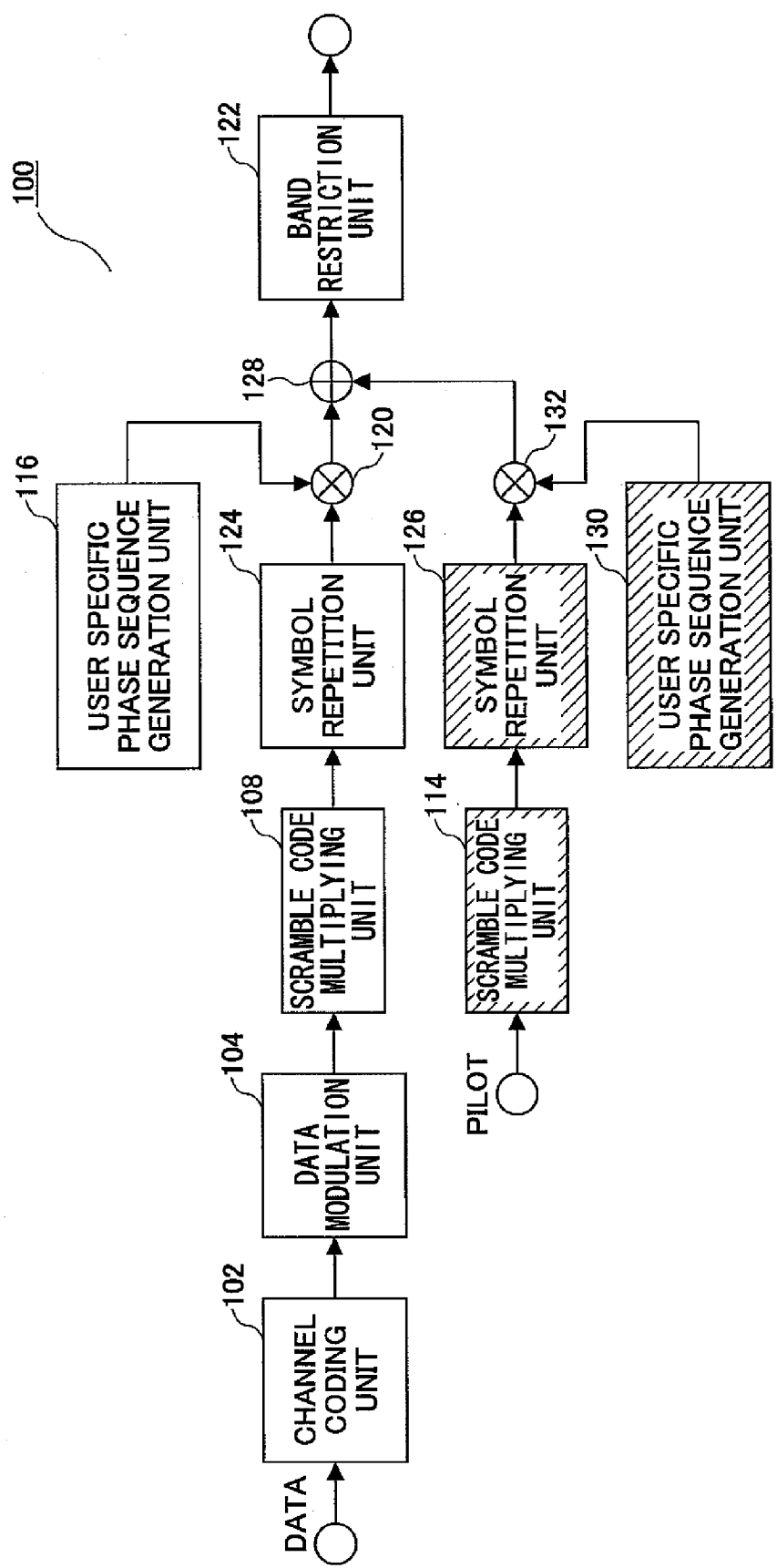
FIG. 28 is a block diagram showing a configuration of a transmitter according to an embodiment of the present invention.

Next, a transmitter of an eighth embodiment of the present invention is described with reference to FIG. 28.

The transmitter 100 in the present embodiment frequency-multiplexes a pilot channel to which symbol repetition is applied in the IFDMA using symbol repetition.

The transmitter 100 includes a channel coding unit 102 to which a data symbol sequence is supplied, a data modulation unit 104 connected to the channel coding unit 102, a scramble code multiplying unit 108 connected to the data modulation unit 104, a symbol repetition unit 124 connected to the scramble code multiplying unit 108, a multiplying unit 120 connected to the symbol repetition unit 124, a user specific phase sequence generation unit 116 and an adding unit 128 each connected to the multiplying unit 120, a scramble code multiplying unit 114 receiving a pilot symbol sequence forming a reference signal that is a pilot signal or a pilot channel, for example, a symbol repetition unit 126 as a symbol pattern generation means connected to the scramble code multiplying unit 114, a multiplying unit 132 connected to the symbol repetition unit 126, a user specific phase sequence generation unit 130 connected to the multiplying unit 132, and a band restriction unit 122 connected to the adding unit 128. The multiplying unit 132 is connected to the adding unit 128.

Channel coding is performed in the channel coding unit 102 on the data symbol sequence in which error correction code such as turbo code and convolution code are applied, so that it is supplied to the data modulation unit 104. In the data modulation unit 104, modulation processing is performed on the channel coded data and it is supplied to the scramble code multiplying unit 108. In the scramble code multiplying unit 108, the modulated data is multiplied by scramble code so that the symbol sequence is generated which is supplied to the symbol repetition unit 124. In the symbol repetition unit 124, symbol repetition is performed every predetermined symbols for the symbol sequence multiplied by the scramble code, so that a symbol pattern is generated and it is supplied to the multiplying unit 120. In the multiplying unit 120, the symbol pattern is multiplied by a user specific phase vector supplied from the user specific phase sequence generation unit 116, and the result is supplied to the adding unit 128.

On the other hand, the pilot symbol sequence that forms a reference signal that is a pilot signal or a pilot channel, for example, is multiplied by scramble code in the scramble code multiplying unit 114 so that a symbol sequence is generated, and it is supplied to the symbol repetition unit 126.

In the symbol repetition unit 126, symbol repetition is performed every predetermined symbols for the symbol sequence, so that a symbol pattern is generated and it is supplied to the multiplying unit 132. In the multiplying unit 132, the symbol pattern is multiplied by the user specific phase vector supplied from the user specific phase sequence generation unit 130, and the result is supplied to the adding unit 128.

The adding unit 128 adds a symbol pattern, of the data, multiplied by the phase, that is a symbol pattern generated based on the symbol sequence after data modulation and a symbol pattern, of the reference signal, multiplied by the phase, that is a symbol pattern generated based on the symbol sequence of the reference signal, and the added result is supplied to the band restriction unit 122. In the band restriction unit 122, band restriction is performed on the symbol pattern of the data and the symbol pattern, of the reference signal, which has been multiplied by the phase, that are added.

By configuring in the above-mentioned way, the pilot channel to which symbol repetition is applied can be made to be independent from other channels with respect to frequency. Therefore, influence of interference to the pilot channel from other channel such as the data channel and the control channel, for example, can be eliminated.

Next, in a case when the above-mentioned "other channel" is formed by "control channel" or "data channel", multiplexing of the channel and the "pilot channel" is described.

First, cases in which a pilot channel is frequency-multiplexed and a control channel is code-multiplexed, to a data channel to which chip repetition is applied are described with reference to FIGS. 29A and 29B.

Figure 29A:
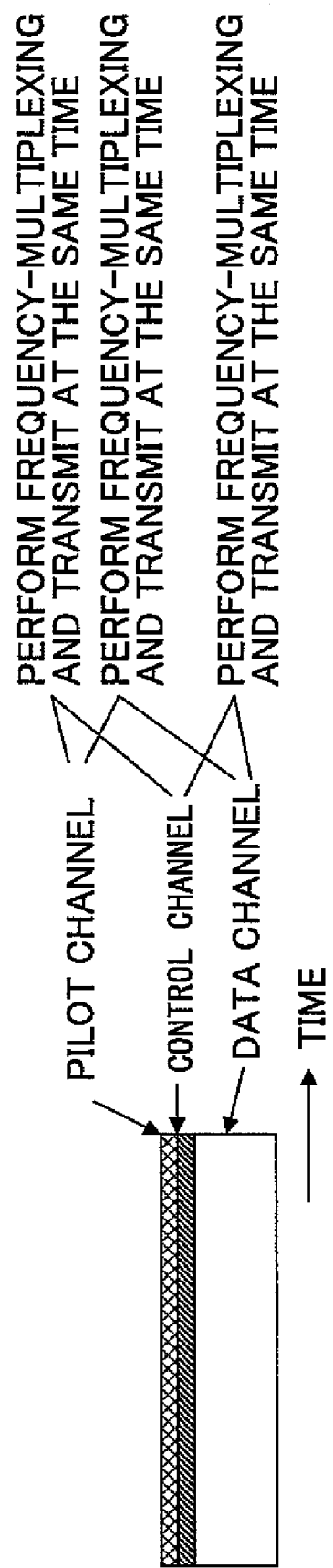
FIG. 29A is a schematic diagram showing multiplexing of a pilot channel, a control channel and a data channel.

As shown in FIG. 29A, in this case, the pilot channel and the control channel are frequency-multiplexed, and are transmitted at the same time.

In addition, in the multiplexing method, because of the chip repetition, as shown in FIG. 29B, a comb-shaped frequency spectrum is formed for each of the control channel, the pilot channel and the data channel in which sub-carrier sets different with each other are assigned.

Accordingly, by using frequency multiplexing, since frequency-multiplexed signals are orthogonal with each other, influence of interference among channels can be decreased. In addition, a plurality of channels can be flexibly accommodated at the same time.

Next, a receiver of a ninth embodiment of the present invention is described with reference to FIG. 30.

The receiver 200 of the present embodiment receives a pilot channel, to which chip repetition is applied, that is frequency-multiplexed and transmitted in the VSCRF-CDMA using spreading and chip repetition.

The receiver 200 includes a band restriction unit 202, a chip repetition combining unit 206 connected to the band restriction unit 202, a chip repetition combining unit 210 and a path timing detection unit 208, a despreading unit 212 connected to the chip repetition combining unit 206, a channel estimation unit 214 connected to the despreading unit 212, an equalization unit 216 connected to the chip repetition combining unit 210, a despreading unit 218 connected to the equalization unit 216, a decoding unit 220 connected to the despreading unit 218, a user specific phase sequence generation unit 226 connected to the chip repetition combining unit 210, a user specific phase sequence generation unit 228 connected to the chip repetition combining unit 206. The channel estimation unit 214 is connected to the equalization unit 216. The path timing detection unit 208 supplies detected path timing to the chip repetition combining unit 206 and the chip repetition combining unit 210.

A received signal multiplied by a carrier frequency and converted to a digital baseband signal is multiplied by a corresponding sub-carrier frequency in the band restriction unit 202 so that band restriction is performed, and the received signal is supplied to the chip repetition combining unit 206, the path timing detection unit 208 and the path repetition combining unit 210.

In the chip repetition combining unit 206, the received signal to which band restriction is provided is multiplied by a user specific phase vector supplied from the user specific phase sequence generation unit 228 so that the phase of the signal multiplied in the transmitter is restored to an original phase and a signal having a chip pattern is generated. After that, a spread chip sequence is generated by recombining signals on which chip repetition is performed using a chip repetition number the same as that of the transmitter, and the chip sequence is supplied to the despreading unit 212.

The despreading unit 212 multiplies the chip sequence by spread code of a spreading factor the same as that of the transmitter to convert the received signal back to the pilot symbol sequence before spreading, and it is supplied to the channel estimation unit 214. In the channel estimation unit 214, channel estimation is performed based on the supplied signal, and the result is supplied to the equalization unit 216. For example, the channel estimation unit 214 estimates variation of amplitude and phase due to fading variation in the radio propagation path to realize synchronous detection modulation, and estimates link status of the radio propagation path such as the SINR (Signal-to-Interference plus noise power ratio), a number of paths, delay spread, Doppler frequency and the like.

On the other hand, the chip repetition combining unit 210 multiplies the received signal to which band restriction is provided by a user specific phase vector supplied from the user specific phase sequence generation unit 226 so that the phase of the signal multiplied in the transmitter is restored to an original phase and a signal having a chip pattern is generated. After that, a spread chip sequence is generated by recombining signals on which chip repetition is performed using a chip repetition number the same as that of the transmitter, and the chip sequence is supplied to the equalization unit 216.

The equalization unit 216 derives a weight coefficient for reducing multipath interference using a channel matrix representing a variation amount by which the received signal supplied from the channel estimation unit 214 is affected on the propagation path, and the received signal is multiplied by the weight coefficient (this operation is called chip equalization), and the result is supplied to the despreading unit 218. Accordingly, influence of multipath interference is decreased.

The despreading unit 218 multiplies the chip sequence by spread code of a spreading factor the same as that of the transmitter to convert the received signal back to modulated data before spreading, and it is supplied to the decoding unit 220.

The decoding unit 220 decodes the modulated data before spreading to recover data.

By configuring in the above-mentioned way, influence of interference to the pilot channel from other channels such as a data channel and a control channel, for example, can be eliminated, and the pilot channel and other channel, on which chip repetition is applied, that are independently transmitted with respect to frequency can be received. Therefore, estimation accuracy of variation of amplitude and phase due to fading variation in a radio propagation path, and estimation accuracy of link status of the radio propagation path such as signal-to-interference plus noise power ratio, a number of paths, delay spread, Doppler frequency and the like can be improved.

Next, a receiver of a tenth embodiment of the present invention is described with reference to FIG. 31.

The receiver 200 of the present embodiment receives a pilot channel, to which symbol repetition is applied, that is frequency-multiplexed and transmitted in the IFDMA using spreading and symbol repetition.

The receiver 200 includes a band restriction unit 202, a symbol repetition combining unit 224 connected to the band restriction unit 202, a symbol repetition combining unit 222 and a path timing detection unit 208, a channel estimation unit 214 connected to the symbol repetition combining unit 222, an equalization unit 216 connected to the symbol repetition combining unit 224, a decoding unit 220 connected to the equalization unit 216, a user specific phase sequence generation unit 226 connected to the symbol repetition combining unit 224, a user specific phase sequence generation unit 228 connected to the symbol repetition combining unit 222. The channel estimation unit 214 is connected to the equalization unit 216. The path timing detection unit 208 supplies detected path timing to the symbol repetition combining unit 222 and the symbol repetition combining unit 224.

A received signal multiplied by a carrier frequency and converted to a digital baseband signal is multiplied by a corresponding sub-carrier frequency in the band restriction unit 202 so that band restriction is performed, and it is supplied to the symbol repetition combining unit 222, the path timing detection unit 208, and the symbol repetition combining unit 224.

In the symbol repetition combining unit 222, the received signal to which band restriction is provided is multiplied by a user specific phase vector supplied from the user specific phase sequence generation unit 228 so that the phase of the signal multiplied in the transmitter is restored to an original phase and a signal having a symbol pattern is generated. After that, a spread symbol sequence is generated by recombining signals on which symbol repetition is performed using a symbol repetition number the same as that of the transmitter, and reverse scrambling process is performed on the generated symbol sequence, so that the pilot symbol sequence before scramble code multiplication is obtained, and it is supplied to the channel estimation unit 214. In the channel estimation unit 214, channel estimation is performed based on the supplied signal, and the result is supplied to the equalization unit 216. For example, the channel estimation unit 214 estimates variation of amplitude and phase due to fading variation in the radio propagation path to realize synchronous detection modulation, and estimates link status of the radio propagation path such as SINR (Signal-to-Interference plus noise power ratio), a number of paths, delay spread, Doppler frequency and the like.

On the other hand, the symbol repetition combining unit 224 multiplies the received signal to which band restriction is provided by a user specific phase vector supplied from the user specific phase sequence generation unit 226 so that the phase of the signal multiplied in the transmitter is restored to an original phase and a signal having a symbol pattern is generated. After that, a symbol sequence multiplied by scramble code is generated by recombining signals on which symbol repetition is performed using a symbol repetition number the same as that of the transmitter, and the symbol sequence is supplied to the equalization unit 216.

The equalization unit 216 derives a weight coefficient for reducing multipath interference using a channel matrix representing a variation amount by which the received signal supplied from the channel estimation unit 214 is affected on the propagation path, and the received signal is multiplied by the weight coefficient, reverse scramble processing is performed, and the result is supplied to the decoding unit 220. Accordingly, influence of multipath interference is decreased.

The decoding unit 220 decodes the modulated data before scramble code multiplication to recover data.

By configuring in the above-mentioned way, influence of interference to the pilot channel from other channels such as a data channel and a control channel, for example, can be eliminated, and the pilot channel and other channel, to which symbol repetition is applied, that are temporally independently transmitted can be received. Therefore, estimation accuracy of variation of amplitude and phase due to fading variation in a radio propagation path, and estimation accuracy of link status of the radio propagation path such as signal-to-interference plus noise power ratio, a number of paths, delay spread, Doppler frequency and the like can be improved.

The present international application claims priority based on Japanese patent application No. 2005-106914, filed in the JPO on Apr. 1, 2005, the entire contents of which are incorporated herein by reference.

INDUSTRIAL APPLICABILITY

The transmitter, the receiver and the mobile communication system of the present invention can be applied to a communication system.

The invention claimed is:
1. A transmitter comprising:
a first scramble code multiplying unit configured to multiply a symbol sequence forming a pilot signal by a scramble code, wherein the symbol sequence of the pilot signal is to be used by a receiver that receives the pilot signal for performing channel estimation;
a first generation unit configured to generate a symbol pattern by performing symbol repetition a predetermined repetition number of times on the symbol sequence of the pilot signal multiplied by the scramble code by the first scramble code multiplying unit;

a second scramble code multiplying unit configured to multiply a symbol sequence faulting a channel different from the pilot signal by a scramble code;

a second generation unit configured to generate a symbol pattern by performing symbol repetition a predetermined repetition number of times on the symbol sequence multiplied by the scramble code by the second scramble code multiplying unit;

a switching unit configured to temporally switch between output of an output signal from the first generation unit and output of an output signal from the second generation unit; and a multiplying unit configured to multiply an output signal from the switching unit by a phase specific to the transmitter, wherein the repetition number of times in the first generation unit is different from the repetition number of times in the second generation unit.

2. The transmitter as claimed in claim 1, wherein each of the first and the second generation units changes a repetition factor indicating the repetition number according to a desired suppression effect against interference.

3. The receiver, configured to receive a radio signal transmitted from the transmitter as claimed in claim 1, comprising:

a first phase multiplying unit configured to multiply a pilot signal from the transmitter by the phase specific to the transmitter;

a first symbol sequence generation unit configured to generate a symbol sequence from a pilot signal transmitted from the transmitter, multiplied by the phase by the first phase multiplying unit, based on a symbol repetition number used in the transmitter;

a first despreading unit configured to perform despread processing on the symbol sequence generated by the first symbol sequence generation unit;

a channel estimation unit configured to perform the channel estimation based on a signal despread by the first despreading unit;

a second phase multiplying unit configured to multiply a channel different from the pilot signal from the transmitter by the phase specific to the transmitter;

a second symbol sequence generation unit configured to generate a symbol sequence from the channel, multiplied by the phase by the second phase multiplying unit, based on a symbol repetition number used in the transmitter;

an equalization unit configured to perform reverse scramble processing on the symbol sequence generated by the second symbol sequence generation unit based on a channel estimation result by the channel estimation unit;

a decoding unit configured to decode the symbol sequence reverse-scrambled by the equalization unit; and a switching unit configured to temporally switch received signals from the transmitter so as to input the pilot signal into the first phase multiplying unit and to input the channel different from the pilot signal into the second phase, multiplying unit.

4. A mobile communication system comprising:
a transmitter comprising:
a first scramble code multiplying unit configured to multiply a symbol sequence forming a pilot signal by a scramble code, wherein the symbol sequence of the pilot signal is to be used by a receiver that receives the pilot signal for performing channel estimation, a first generation unit configured to generate a symbol pattern by performing symbol repetition a predetermined repetition number of times on the symbol sequence multiplied by the scramble code by the first scramble code multiplying unit, a second scramble code multiplying unit configured to multiply a symbol sequence forming a channel different from the pilot signal by a scramble code, a second generation unit configured to generate a symbol pattern by performing symbol repetition a predetermined repetition number of times on the symbol sequence multiplied by the scramble code by the second scramble code multiplying unit, a switching unit configured to temporally switch between output of an output signal from the first generation unit and output of an output signal from the second generation unit, and a multiplying unit configured to multiply an output signal from the switching unit by a phase specific to the transmitter, wherein the repetition number of times in the first generation unit is different from the repetition number of times in the second generation unit; and a receiver, configured to receive a radio signal transmitted from the transmitter, comprising:

a first phase multiplying unit configured to multiply a pilot signal from the transmitter by the phase specific to the transmitter, a first symbol sequence generation unit configured to generate a symbol sequence from a pilot signal transmitted from the transmitter, multiplied by the phase by the first phase multiplying unit, based on a symbol repetition number used in the transmitter, a first despreading unit configured to perform despread processing on the symbol sequence generated by the first symbol sequence generation unit, a channel estimation unit configured to perform channel estimation based on a signal despread by the first despreading unit, a second phase multiplying unit configured to multiply a channel different from the pilot signal from the transmitter by the phase specific to the transmitter, a second symbol sequence generation unit configured to generate a symbol sequence from the channel, multiplied by the phase by the second phase multiplying unit, based on a symbol repetition number used in the transmitter, an equalization unit configured to perform reverse scramble processing on the symbol sequence generated by the second symbol sequence generation unit based on a channel estimation result by the channel estimation unit, a decoding unit configured to decode the symbol sequence reverse-scrambled by the equalization unit, and a switching unit configured to temporally switch received signals from the transmitter so as to input the pilot signal into the first phase multiplying unit and to input the channel different from the pilot signal into the second phase, multiplying unit.

* * * * *